(12) United States Patent
Motta et al.

(10) Patent No.: US 8,752,044 B2
(45) Date of Patent: Jun. 10, 2014

(54) USER EXPERIENCE AND DEPENDENCY MANAGEMENT IN A MOBILE DEVICE

(75) Inventors: Giovanni Motta, Laguna Niguel, CA (US); Sunil Marolia, Laguna Niguel, CA (US); Brian O'Neill, San Juan Capistrano, CA (US); Marko Slyz, Dana Point, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1185 days.

(21) Appl. No.: 11/829,520

(22) Filed: Jul. 27, 2007

(65) Prior Publication Data

US 2008/0028395 A1    Jan. 31, 2008

Related U.S. Application Data

(60) Provisional application No. 60/834,325, filed on Jul. 27, 2006.

(51) Int. Cl.
*G06F 9/445* (2006.01)

(52) U.S. Cl.
CPC ........................................ *G06F 8/61* (2013.01)
USPC ............ 717/178; 717/174; 717/176; 717/177

(58) Field of Classification Search
CPC ....................................................... G06F 8/61
USPC .................................................. 717/168–178
See application file for complete search history.

(56) References Cited

U.S. PATENT DOCUMENTS

| | | | |
|---|---|---|---|
| 4,337,376 A | 6/1982 | Gruenberg | |
| 4,344,091 A | 8/1982 | Gardner et al. | |
| 4,429,387 A | 1/1984 | Kaminski | |
| 4,493,083 A | 1/1985 | Kinoshita | |
| 4,645,916 A | 2/1987 | Raisleger | |
| 4,783,841 A | 11/1988 | Crayson | |
| 4,807,182 A | 2/1989 | Queen | |
| 4,809,170 A | 2/1989 | Leblang et al. | |
| 5,084,816 A | 1/1992 | Boese et al. | |
| 5,155,847 A | 10/1992 | Kirouac et al. | |
| 5,204,960 A | 4/1993 | Smith et al. | |

(Continued)

FOREIGN PATENT DOCUMENTS

| | | |
|---|---|---|
| CA | 2339923 | 3/2000 |
| CA | 2414281 | 5/2002 |

(Continued)

OTHER PUBLICATIONS

PCT International Search Report dated Oct. 24, 2008.

(Continued)

*Primary Examiner* — Qing Chen
(74) *Attorney, Agent, or Firm* — Kilpatrick Townsend & Stockton LLP

(57) ABSTRACT

A method, system, and device supporting installation of updates to software and/or firmware in memory of an electronic device. The updates may be accompanied by advertising, promotional and information content that is dynamically displayed to a user during processing of the update in the electronic device. The update information may be automatically generated based upon a list of all software components or packages already present on the electronic device, and may comprise software components for all dependencies of an application being installed by the update that are not already present on the electronic device.

18 Claims, 4 Drawing Sheets

(56) References Cited

U.S. PATENT DOCUMENTS

| | | |
|---|---|---|
| 5,261,055 A | 11/1993 | Moran et al. |
| 5,274,823 A | 12/1993 | Brenner et al. |
| 5,325,531 A | 6/1994 | McKeeman et al. |
| 5,333,320 A | 7/1994 | Seki |
| 5,392,353 A | 2/1995 | Morales |
| 5,394,534 A | 2/1995 | Kulakowski et al. |
| 5,410,703 A | 4/1995 | Nilsson et al. |
| 5,418,837 A | 5/1995 | Johansson et al. |
| 5,420,616 A | 5/1995 | Suemitsu et al. |
| 5,421,006 A | 5/1995 | Jablon et al. |
| 5,442,771 A | 8/1995 | Filepp et al. |
| 5,444,765 A | 8/1995 | Marui et al. |
| 5,450,589 A | 9/1995 | Maebayashi et al. |
| 5,455,576 A | 10/1995 | Clark, II et al. |
| 5,463,766 A | 10/1995 | Schieve et al. |
| 5,471,592 A | 11/1995 | Gove et al. |
| 5,479,637 A | 12/1995 | Lisimaque et al. |
| 5,479,654 A | 12/1995 | Squibb |
| 5,481,713 A | 1/1996 | Wetmore et al. |
| 5,491,807 A | 2/1996 | Freeman et al. |
| 5,491,821 A | 2/1996 | Kilis |
| 5,535,357 A | 7/1996 | Moran et al. |
| 5,537,483 A | 7/1996 | Stapleton et al. |
| 5,563,931 A | 10/1996 | Bishop et al. |
| 5,579,522 A | 11/1996 | Christeson et al. |
| 5,586,304 A | 12/1996 | Stupek, Jr. et al. |
| 5,586,328 A | 12/1996 | Caron et al. |
| 5,590,277 A | 12/1996 | Fuchs et al. |
| 5,594,903 A | 1/1997 | Bunnell et al. |
| 5,596,738 A | 1/1997 | Pope |
| 5,598,531 A | 1/1997 | Hill |
| 5,598,534 A | 1/1997 | Haas |
| 5,600,844 A | 2/1997 | Shaw et al. |
| 5,606,693 A | 2/1997 | Nilsen et al. |
| 5,608,910 A | 3/1997 | Shimakura |
| 5,623,604 A | 4/1997 | Russell et al. |
| 5,628,016 A | 5/1997 | Kukol |
| 5,638,066 A | 6/1997 | Horiuchi et al. |
| 5,649,112 A | 7/1997 | Yeager et al. |
| 5,649,200 A | 7/1997 | Leblang et al. |
| 5,666,293 A | 9/1997 | Metz et al. |
| 5,666,364 A | 9/1997 | Pierce et al. |
| 5,675,628 A | 10/1997 | Hokkanen |
| 5,677,708 A | 10/1997 | Matthews, III et al. |
| 5,684,944 A | 11/1997 | Lubbers et al. |
| 5,689,712 A | 11/1997 | Heisch |
| 5,694,538 A | 12/1997 | Okazaki et al. |
| 5,699,275 A | 12/1997 | Beasley et al. |
| 5,699,548 A | 12/1997 | Choudhury et al. |
| 5,704,031 A | 12/1997 | Mikami et al. |
| 5,708,709 A | 1/1998 | Rose |
| 5,708,776 A | 1/1998 | Kikinis |
| 5,715,462 A | 2/1998 | Iwamoto et al. |
| 5,717,737 A | 2/1998 | Doviak et al. |
| 5,721,824 A * | 2/1998 | Taylor .................. 709/203 |
| 5,724,526 A | 3/1998 | Kunita |
| 5,727,202 A | 3/1998 | Kucala |
| 5,729,735 A | 3/1998 | Meyering |
| 5,751,231 A | 5/1998 | Iverson |
| 5,752,039 A | 5/1998 | Tanimura |
| 5,752,042 A | 5/1998 | Cole et al. |
| 5,764,658 A | 6/1998 | Sekiguchi et al. |
| 5,765,211 A | 6/1998 | Luck |
| 5,768,382 A | 6/1998 | Schneier et al. |
| 5,774,715 A | 6/1998 | Madany et al. |
| 5,778,440 A | 7/1998 | Yiu et al. |
| 5,781,921 A | 7/1998 | Nichols |
| 5,790,800 A | 8/1998 | Gauvin et al. |
| 5,790,860 A | 8/1998 | Wetmore et al. |
| 5,790,974 A | 8/1998 | Tognazzini |
| 5,794,254 A | 8/1998 | McClain |
| 5,802,338 A | 9/1998 | Rechtschaffen et al. |
| 5,802,554 A | 9/1998 | Caceres et al. |
| 5,805,899 A | 9/1998 | Evans et al. |
| 5,809,251 A * | 9/1998 | May et al. .................. 709/223 |
| 5,812,753 A | 9/1998 | Chiariotti |
| 5,812,768 A | 9/1998 | Page et al. |
| 5,815,722 A | 9/1998 | Kalwitz et al. |
| 5,822,578 A | 10/1998 | Frank et al. |
| 5,822,692 A | 10/1998 | Krishan et al. |
| 5,826,012 A | 10/1998 | Lettvin |
| 5,832,000 A | 11/1998 | Lin et al. |
| 5,832,520 A | 11/1998 | Miller |
| 5,835,777 A * | 11/1998 | Staelin .................. 717/175 |
| 5,835,911 A | 11/1998 | Nakagawa et al. |
| 5,838,981 A | 11/1998 | Gotoh |
| 5,845,077 A | 12/1998 | Fawcett |
| 5,848,064 A | 12/1998 | Cowan |
| 5,864,681 A | 1/1999 | Proctor et al. |
| 5,875,404 A | 2/1999 | Messiet |
| 5,878,124 A | 3/1999 | Griesmer et al. |
| 5,878,256 A | 3/1999 | Bealkowski et al. |
| 5,881,292 A | 3/1999 | Sigal et al. |
| 5,887,253 A | 3/1999 | O'Neil et al. |
| 5,896,566 A | 4/1999 | Averbuch et al. |
| 5,901,310 A | 5/1999 | Rahman et al. |
| 5,901,330 A | 5/1999 | Sun et al. |
| 5,903,669 A | 5/1999 | Hirabayashi |
| 5,909,581 A | 6/1999 | Park |
| 5,913,021 A | 6/1999 | Masubuchi |
| 5,913,027 A | 6/1999 | Matsuda et al. |
| 5,919,247 A | 7/1999 | Van Hoff et al. |
| 5,930,504 A | 7/1999 | Gabel |
| 5,931,909 A | 8/1999 | Taylor |
| 5,933,498 A | 8/1999 | Schneck et al. |
| 5,933,604 A | 8/1999 | Inakoshi |
| 5,937,019 A | 8/1999 | Padovani |
| 5,943,406 A | 8/1999 | Leta et al. |
| 5,944,839 A | 8/1999 | Isenberg |
| 5,946,686 A | 8/1999 | Schmuck et al. |
| 5,950,199 A | 9/1999 | Schmuck et al. |
| 5,953,653 A | 9/1999 | Josenhans et al. |
| 5,954,817 A | 9/1999 | Janssen et al. |
| 5,960,189 A | 9/1999 | Stupek, Jr. et al. |
| 5,960,445 A | 9/1999 | Tamori et al. |
| 5,968,182 A | 10/1999 | Chen et al. |
| 5,973,626 A | 10/1999 | Berger et al. |
| 5,974,179 A | 10/1999 | Caklovic |
| 5,974,250 A | 10/1999 | Angelo et al. |
| 5,974,311 A | 10/1999 | Lipsit |
| 5,974,312 A | 10/1999 | Hayes, Jr. et al. |
| 5,974,454 A | 10/1999 | Apfel et al. |
| 5,974,574 A | 10/1999 | Lennie et al. |
| 5,983,289 A | 11/1999 | Ishikawa et al. |
| 5,987,325 A | 11/1999 | Tayloe |
| 5,987,477 A | 11/1999 | Schmuck et al. |
| 5,987,506 A | 11/1999 | Carter et al. |
| 5,999,740 A | 12/1999 | Rowley |
| 5,999,978 A | 12/1999 | Angal et al. |
| 6,006,034 A | 12/1999 | Heath et al. |
| 6,009,274 A | 12/1999 | Fletcher et al. |
| 6,009,497 A | 12/1999 | Wells et al. |
| 6,011,973 A | 1/2000 | Valentine et al. |
| 6,014,561 A | 1/2000 | Molne |
| 6,018,747 A | 1/2000 | Burns et al. |
| 6,021,275 A | 2/2000 | Horwat |
| 6,021,415 A | 2/2000 | Cannon et al. |
| 6,021,428 A | 2/2000 | Miloslavsky |
| 6,029,004 A | 2/2000 | Bortnikov et al. |
| 6,029,065 A | 2/2000 | Shah |
| 6,029,196 A | 2/2000 | Lenz |
| 6,031,830 A | 2/2000 | Cowan |
| 6,032,044 A | 2/2000 | Shannon et al. |
| 6,032,216 A | 2/2000 | Schmuck et al. |
| 6,038,636 A | 3/2000 | Brown, III et al. |
| 6,040,781 A | 3/2000 | Murray |
| 6,041,333 A | 3/2000 | Bretschneider et al. |
| 6,044,270 A | 3/2000 | Raith |
| 6,044,403 A | 3/2000 | Gerszberg |
| 6,047,071 A | 4/2000 | Shah |
| 6,047,242 A | 4/2000 | Benson |
| 6,047,279 A | 4/2000 | Barrack et al. |
| 6,052,531 A | 4/2000 | Waldin et al. |
| 6,052,600 A | 4/2000 | Fette et al. |

(56) References Cited

U.S. PATENT DOCUMENTS

| | | | |
|---|---|---|---|
| 6,058,435 A | 5/2000 | Sassin et al. |
| 6,064,814 A | 5/2000 | Capriles et al. |
| 6,070,012 A | 5/2000 | Eitner et al. |
| 6,070,142 A | 5/2000 | McDonough et al. |
| 6,073,206 A | 6/2000 | Piwonka et al. |
| 6,073,214 A | 6/2000 | Fawcett |
| 6,077,315 A | 6/2000 | Greenbaum et al. |
| 6,080,207 A | 6/2000 | Kroening et al. |
| 6,081,518 A | 6/2000 | Bowman-Amuah |
| 6,081,731 A | 6/2000 | Boltz et al. |
| 6,088,759 A | 7/2000 | Hasbun et al. |
| 6,097,942 A | 8/2000 | Laiho |
| 6,097,966 A | 8/2000 | Hanley |
| 6,104,506 A | 8/2000 | Hirokawa |
| 6,105,063 A | 8/2000 | Hayes, Jr. |
| 6,106,570 A | 8/2000 | Mizuhara |
| 6,112,024 A | 8/2000 | Almond et al. |
| 6,112,197 A | 8/2000 | Chatterjee et al. |
| 6,115,693 A | 9/2000 | McDonough et al. |
| 6,115,737 A | 9/2000 | Ely et al. |
| 6,117,187 A * | 9/2000 | Staelin ............ 717/169 |
| 6,123,737 A | 9/2000 | Sadowsky |
| 6,126,327 A | 10/2000 | Bi et al. |
| 6,128,695 A | 10/2000 | Estakhri et al. |
| 6,128,713 A | 10/2000 | Eisler et al. |
| 6,131,096 A | 10/2000 | Ng et al. |
| 6,134,530 A | 10/2000 | Bunting et al. |
| 6,138,002 A | 10/2000 | Alperovich et al. |
| 6,138,239 A | 10/2000 | Veil |
| 6,138,249 A | 10/2000 | Nolet |
| 6,141,564 A | 10/2000 | Bruner et al. |
| 6,144,849 A | 11/2000 | Nodoushani et al. |
| 6,145,012 A | 11/2000 | Small |
| 6,148,192 A | 11/2000 | Ahvenainen |
| 6,148,441 A | 11/2000 | Woodward |
| 6,151,643 A | 11/2000 | Cheng et al. |
| 6,157,559 A | 12/2000 | Yoo |
| 6,163,274 A | 12/2000 | Lindgren |
| 6,167,567 A | 12/2000 | Chiles et al. |
| 6,178,452 B1 | 1/2001 | Miyamoto |
| 6,189,096 B1 | 2/2001 | Haverty |
| 6,195,546 B1 | 2/2001 | Leung et al. |
| 6,195,946 B1 | 3/2001 | Lott et al. |
| 6,198,946 B1 | 3/2001 | Shin et al. |
| 6,199,203 B1 | 3/2001 | Saboff |
| 6,199,204 B1 | 3/2001 | Donohue |
| 6,202,207 B1 | 3/2001 | Donohue |
| 6,202,208 B1 | 3/2001 | Holiday |
| 6,209,111 B1 | 3/2001 | Kadyk et al. |
| 6,209,127 B1 | 3/2001 | Mori et al. |
| 6,212,281 B1 | 4/2001 | Vanstone |
| 6,212,489 B1 | 4/2001 | Klein et al. |
| 6,212,557 B1 | 4/2001 | Oran |
| 6,212,659 B1 | 4/2001 | Zehavi |
| 6,223,039 B1 | 4/2001 | Holm et al. |
| 6,223,301 B1 | 4/2001 | Santeler et al. |
| 6,223,343 B1 | 4/2001 | Hopwood et al. |
| 6,230,190 B1 | 5/2001 | Edmonds et al. |
| 6,230,319 B1 | 5/2001 | Britt, Jr. et al. |
| 6,233,332 B1 | 5/2001 | Anderson et al. |
| 6,247,168 B1 | 6/2001 | Green |
| 6,249,817 B1 | 6/2001 | Nakabayashi et al. |
| 6,256,497 B1 | 7/2001 | Chambers |
| 6,260,156 B1 | 7/2001 | Garvin et al. |
| 6,262,973 B1 | 7/2001 | Shiraishi et al. |
| 6,263,214 B1 | 7/2001 | Yazaki et al. |
| 6,266,513 B1 | 7/2001 | Briancon |
| 6,266,809 B1 | 7/2001 | Craig et al. |
| 6,266,810 B1 | 7/2001 | Tanaka et al. |
| 6,272,333 B1 | 8/2001 | Smith |
| 6,272,545 B1 | 8/2001 | Flanagan et al. |
| 6,278,449 B1 | 8/2001 | Sugiarto et al. |
| 6,279,153 B1 | 8/2001 | Bi et al. |
| 6,282,709 B1 | 8/2001 | Reha et al. |
| 6,289,509 B1 | 9/2001 | Kryloff |
| 6,292,492 B1 | 9/2001 | Bonomi et al. |
| 6,292,934 B1 | 9/2001 | Davidson et al. |
| 6,301,710 B1 | 10/2001 | Fujiwara |
| 6,308,061 B1 | 10/2001 | Criss et al. |
| 6,311,322 B1 | 10/2001 | Ikeda et al. |
| 6,314,425 B1 | 11/2001 | Serbinis et al. |
| 6,317,872 B1 | 11/2001 | Gee et al. |
| 6,317,880 B1 | 11/2001 | Chamberlain et al. |
| 6,321,263 B1 | 11/2001 | Luzzi et al. |
| 6,321,348 B1 | 11/2001 | Kobata |
| 6,324,402 B1 | 11/2001 | Waugh et al. |
| 6,324,693 B1 | 11/2001 | Brodersen et al. |
| 6,330,715 B1 | 12/2001 | Razzaghe-Ashrafi |
| 6,333,980 B1 | 12/2001 | Hollatz et al. |
| 6,334,212 B1 | 12/2001 | Nakajima |
| 6,343,379 B1 | 1/2002 | Ozawa et al. |
| 6,345,288 B1 | 2/2002 | Reed et al. |
| 6,347,331 B1 | 2/2002 | Dutcher et al. |
| 6,349,205 B1 | 2/2002 | Fang et al. |
| 6,353,737 B1 | 3/2002 | Herzog |
| 6,357,021 B1 | 3/2002 | Kitagawa et al. |
| 6,360,362 B1 | 3/2002 | Fichtner et al. |
| 6,360,366 B1 | 3/2002 | Heath et al. |
| 6,363,524 B1 | 3/2002 | Loy |
| 6,366,584 B1 | 4/2002 | Gulliford et al. |
| 6,366,777 B1 | 4/2002 | Uusitalo |
| 6,367,072 B1 | 4/2002 | Justice et al. |
| 6,374,250 B2 | 4/2002 | Ajtai et al. |
| 6,381,454 B1 | 4/2002 | Tiedemann, Jr. et al. |
| 6,381,456 B1 | 4/2002 | Ko |
| 6,381,740 B1 | 4/2002 | Miller et al. |
| 6,381,742 B2 * | 4/2002 | Forbes et al. ............ 717/176 |
| 6,389,464 B1 | 5/2002 | Krishnamurthy et al. |
| 6,389,592 B1 | 5/2002 | Ayres et al. |
| 6,393,018 B2 | 5/2002 | Miloslavsky |
| 6,393,585 B1 | 5/2002 | Houha et al. |
| 6,397,385 B1 | 5/2002 | Kravitz |
| 6,400,965 B1 | 6/2002 | Phillips et al. |
| 6,405,364 B1 | 6/2002 | Bowman-Amuah |
| 6,408,175 B1 | 6/2002 | Park |
| 6,408,434 B1 | 6/2002 | Fujiwara |
| 6,412,079 B1 | 6/2002 | Edmonds et al. |
| 6,418,311 B1 | 7/2002 | Chmaytelli et al. |
| 6,421,325 B1 | 7/2002 | Kikinis |
| 6,421,776 B1 | 7/2002 | Hillis et al. |
| 6,424,966 B1 | 7/2002 | Meyerzon et al. |
| 6,425,125 B1 | 7/2002 | Fries et al. |
| 6,426,955 B1 | 7/2002 | Gossett-Dalton, Jr. et al. |
| 6,434,537 B1 | 8/2002 | Grimes |
| 6,434,695 B1 | 8/2002 | Esfahani et al. |
| 6,438,585 B2 | 8/2002 | Mousseau et al. |
| 6,442,358 B1 | 8/2002 | Regelsberger et al. |
| 6,442,660 B1 | 8/2002 | Henerlau et al. |
| 6,442,754 B1 * | 8/2002 | Curtis ............ 717/175 |
| 6,445,914 B1 | 9/2002 | Findikli et al. |
| 6,446,206 B1 | 9/2002 | Feldbaum |
| 6,449,270 B1 | 9/2002 | Miloslavsky |
| 6,452,602 B1 | 9/2002 | Morein |
| 6,456,732 B1 | 9/2002 | Kimbell et al. |
| 6,456,843 B1 | 9/2002 | Daly |
| 6,457,175 B1 | 9/2002 | Lerche |
| 6,463,300 B1 | 10/2002 | Oshima |
| 6,466,999 B1 | 10/2002 | Sliger et al. |
| 6,467,087 B1 | 10/2002 | Yang |
| 6,470,496 B1 | 10/2002 | Kato et al. |
| 6,477,531 B1 | 11/2002 | Sullivan et al. |
| 6,477,703 B1 | 11/2002 | Smith et al. |
| 6,487,403 B2 | 11/2002 | Carroll |
| 6,487,717 B1 | 11/2002 | Brunemann et al. |
| 6,487,723 B1 | 11/2002 | MacInnis |
| 6,493,871 B1 | 12/2002 | McGuire et al. |
| 6,496,875 B2 | 12/2002 | Cheng et al. |
| 6,496,978 B1 | 12/2002 | Ito |
| 6,496,979 B1 | 12/2002 | Chen et al. |
| 6,502,193 B1 | 12/2002 | Barber |
| 6,504,932 B1 | 1/2003 | Vasnier et al. |
| 6,505,228 B1 | 1/2003 | Schoening et al. |
| 6,512,919 B2 | 1/2003 | Ogasawara |
| 6,526,574 B1 | 2/2003 | Jones |

(56) References Cited

U.S. PATENT DOCUMENTS

| | | | |
|---|---|---|---|
| 6,529,729 B1 | 3/2003 | Nodoushani et al. |
| 6,530,036 B1 | 3/2003 | Frey, Jr. |
| 6,535,894 B1 | 3/2003 | Schmidt et al. |
| 6,536,038 B1 | 3/2003 | Ewertz et al. |
| 6,542,504 B1 | 4/2003 | Mahler et al. |
| 6,542,906 B2 | 4/2003 | Korn |
| 6,546,243 B2 | 4/2003 | Tiedemann, Jr. et al. |
| 6,546,419 B1 | 4/2003 | Humpleman et al. |
| 6,546,492 B1 | 4/2003 | Walker et al. |
| 6,546,552 B1 | 4/2003 | Peleg |
| 6,549,770 B1 | 4/2003 | Marran |
| 6,553,113 B1 | 4/2003 | Dhir et al. |
| 6,553,375 B1 | 4/2003 | Huang et al. |
| 6,553,490 B1 | 4/2003 | Kottapurath et al. |
| 6,556,842 B1 | 4/2003 | Ericsson |
| 6,564,055 B1 | 5/2003 | Hronek et al. |
| 6,564,369 B1 | 5/2003 | Hove et al. |
| 6,564,371 B1 | 5/2003 | Goldman et al. |
| 6,571,244 B1 | 5/2003 | Larson |
| 6,574,657 B1 | 6/2003 | Dickenson |
| 6,577,229 B1 | 6/2003 | Bonneau et al. |
| 6,581,105 B2 | 6/2003 | Miloslavsky et al. |
| 6,587,684 B1 | 7/2003 | Hsu et al. |
| 6,587,685 B2 | 7/2003 | Mittal et al. |
| 6,591,095 B1 | 7/2003 | Palaniswamy et al. |
| 6,591,098 B1 | 7/2003 | Shieh et al. |
| 6,594,723 B1 | 7/2003 | Chapman et al. |
| 6,594,822 B1 | 7/2003 | Schweitz et al. |
| 6,595,856 B1 | 7/2003 | Ginsburg et al. |
| 6,601,153 B1 | 7/2003 | Engelbrecht et al. |
| 6,601,212 B1 | 7/2003 | Guha et al. |
| 6,603,854 B1 | 8/2003 | Judkins et al. |
| 6,603,968 B2 | 8/2003 | Anvekar et al. |
| 6,606,744 B1 | 8/2003 | Mikurak |
| 6,615,038 B1 | 9/2003 | Moles et al. |
| 6,615,240 B1 | 9/2003 | Sullivan et al. |
| 6,615,404 B1 | 9/2003 | Garfunkel et al. |
| 6,615,405 B1 | 9/2003 | Goldman et al. |
| 6,622,017 B1 | 9/2003 | Hoffman |
| 6,625,451 B1 | 9/2003 | La Medica et al. |
| 6,625,641 B1 | 9/2003 | Hare et al. |
| 6,636,958 B2 | 10/2003 | Abboud et al. |
| 6,640,334 B1 | 10/2003 | Rasmussen |
| 6,643,506 B1 | 11/2003 | Criss et al. |
| 6,643,697 B1 | 11/2003 | Eves |
| 6,647,260 B2 | 11/2003 | Dusse et al. |
| 6,647,480 B1 | 11/2003 | Bolan et al. |
| 6,651,249 B2 | 11/2003 | Waldin et al. |
| 6,658,090 B1 | 12/2003 | Pehkonen et al. |
| 6,659,345 B2 | 12/2003 | Sukeda et al. |
| 6,665,376 B1 | 12/2003 | Brown |
| 6,665,861 B1 | 12/2003 | Francis et al. |
| 6,668,049 B1 | 12/2003 | Koch et al. |
| 6,668,336 B1 | 12/2003 | Lasser |
| 6,671,265 B1 | 12/2003 | Hwang et al. |
| 6,671,703 B2 | 12/2003 | Thompson et al. |
| 6,671,818 B1 | 12/2003 | Mikurak |
| 6,675,201 B1 | 1/2004 | Parkkinen |
| 6,675,382 B1 | 1/2004 | Foster |
| 6,683,993 B1 | 1/2004 | Mead |
| 6,684,396 B1 | 1/2004 | Brittain et al. |
| 6,687,341 B1 | 2/2004 | Koch et al. |
| 6,687,901 B1 | 2/2004 | Imamatsu |
| 6,690,390 B1 | 2/2004 | Walters et al. |
| 6,690,788 B1 | 2/2004 | Bauer et al. |
| 6,694,314 B1 | 2/2004 | Sullivan et al. |
| 6,694,336 B1 | 2/2004 | Multer et al. |
| 6,697,808 B1 | 2/2004 | Hurwood et al. |
| 6,697,969 B1 | 2/2004 | Merriam |
| 6,698,013 B1 | 2/2004 | Bertero et al. |
| 6,701,521 B1 | 3/2004 | McIlroy et al. |
| 6,704,303 B1 | 3/2004 | Bowman-Amuah |
| 6,704,410 B1 | 3/2004 | McFarlane et al. |
| 6,704,864 B1 | 3/2004 | Philyaw |
| 6,711,520 B2 | 3/2004 | Arnaout et al. |
| 6,714,642 B2 | 3/2004 | Dhir et al. |
| 6,721,713 B1 | 4/2004 | Guheen et al. |
| 6,721,946 B1 | 4/2004 | Fogarty et al. |
| 6,725,048 B2 | 4/2004 | Mao et al. |
| 6,725,056 B1 | 4/2004 | Moles et al. |
| 6,725,268 B1 | 4/2004 | Jackel et al. |
| 6,725,392 B1 | 4/2004 | Frey et al. |
| 6,728,531 B1 | 4/2004 | Lee et al. |
| 6,728,950 B2 | 4/2004 | Davis et al. |
| 6,730,027 B2 | 5/2004 | Iliff |
| 6,731,932 B1 | 5/2004 | Rune et al. |
| 6,735,434 B2 | 5/2004 | Criss et al. |
| 6,738,803 B1 | 5/2004 | Dodrill et al. |
| 6,741,848 B2 | 5/2004 | Timonen et al. |
| 6,741,934 B2 | 5/2004 | Chen et al. |
| 6,741,980 B1 | 5/2004 | Langseth et al. |
| 6,742,025 B2 | 5/2004 | Jennery et al. |
| 6,748,209 B2 | 6/2004 | Lipsit |
| 6,754,181 B1 | 6/2004 | Elliott et al. |
| 6,754,714 B1 | 6/2004 | Chebrolu |
| 6,754,722 B2 | 6/2004 | Herzi |
| 6,754,723 B2 | 6/2004 | Kato |
| 6,754,894 B1 | 6/2004 | Costello et al. |
| 6,754,895 B1 | 6/2004 | Bartel et al. |
| 6,754,896 B2 | 6/2004 | Mishra et al. |
| 6,757,263 B1 | 6/2004 | Olds |
| 6,757,893 B1 | 6/2004 | Haikin |
| 6,760,730 B1 | 7/2004 | Kataoka |
| 6,760,908 B2 | 7/2004 | Ren |
| 6,763,104 B1 | 7/2004 | Judkins et al. |
| 6,763,403 B2 | 7/2004 | Cheng et al. |
| 6,772,338 B1 | 8/2004 | Hull |
| 6,775,267 B1 | 8/2004 | Kung et al. |
| 6,775,423 B2 | 8/2004 | Kulkarni et al. |
| 6,779,177 B1 | 8/2004 | Bahrs et al. |
| 6,785,834 B2 | 8/2004 | Chefalas et al. |
| 6,789,110 B1 | 9/2004 | Short et al. |
| 6,789,158 B2 | 9/2004 | Takahashi |
| 6,789,215 B1 | 9/2004 | Rupp et al. |
| 6,789,255 B1 | 9/2004 | Pedrizetti et al. |
| 6,791,877 B2 | 9/2004 | Miura et al. |
| 6,798,876 B1 | 9/2004 | Bala |
| 6,799,155 B1 | 9/2004 | Lindemann et al. |
| 6,802,061 B1 | 10/2004 | Parthasarathy et al. |
| 6,807,558 B1 | 10/2004 | Hassett et al. |
| 6,807,574 B1 | 10/2004 | Partovi et al. |
| 6,813,571 B2 | 11/2004 | Lightbody et al. |
| 6,816,719 B1 | 11/2004 | Heinonen et al. |
| 6,820,214 B1 | 11/2004 | Cabrera et al. |
| 6,820,259 B1 | 11/2004 | Kawamata et al. |
| 6,823,432 B2 | 11/2004 | Chen et al. |
| 6,832,373 B2 | 12/2004 | O'Neill |
| 6,836,657 B2 | 12/2004 | Ji et al. |
| 6,836,859 B2 | 12/2004 | Berg et al. |
| 6,839,841 B1 | 1/2005 | Medvinsky et al. |
| 6,842,628 B1 | 1/2005 | Arnold et al. |
| 6,845,370 B2 | 1/2005 | Burkey et al. |
| 6,845,434 B2 | 1/2005 | Lin |
| 6,847,970 B2 * | 1/2005 | Kar et al. ............................. 1/1 |
| 6,850,533 B2 | 2/2005 | Gerszberg et al. |
| 6,850,614 B1 | 2/2005 | Collins |
| 6,856,676 B1 | 2/2005 | Pirot et al. |
| 6,865,387 B2 | 3/2005 | Bucknell et al. |
| 6,873,988 B2 | 3/2005 | Herrmann et al. |
| 6,879,685 B1 | 4/2005 | Peterson et al. |
| 6,880,051 B2 | 4/2005 | Timpanaro-Perrotta |
| 6,883,168 B1 | 4/2005 | James et al. |
| 6,885,862 B1 | 4/2005 | Pearson |
| 6,889,054 B2 | 5/2005 | Himmel et al. |
| 6,892,207 B2 | 5/2005 | McKay et al. |
| 6,895,387 B1 | 5/2005 | Roberts et al. |
| 6,904,405 B2 | 6/2005 | Suominen |
| 6,907,478 B2 | 6/2005 | Li et al. |
| 6,912,591 B2 | 6/2005 | Lash |
| 6,915,265 B1 | 7/2005 | Johnson |
| 6,915,325 B1 | 7/2005 | Lee et al. |
| 6,915,452 B2 | 7/2005 | Froehlich et al. |
| 6,918,112 B2 * | 7/2005 | Bourke-Dunphy et al. .. 717/177 |
| 6,922,722 B1 | 7/2005 | Mann et al. |

(56) References Cited

U.S. PATENT DOCUMENTS

| | | |
|---|---|---|
| 6,925,300 B2 | 8/2005 | Horne |
| 6,925,467 B2 | 8/2005 | Gu et al. |
| 6,928,108 B2 | 8/2005 | Nelson et al. |
| 6,928,468 B2 | 8/2005 | Leermakers |
| 6,934,028 B2 | 8/2005 | Ho et al. |
| 6,938,076 B2 | 8/2005 | Meyer et al. |
| 6,938,109 B1 | 8/2005 | Sliger et al. |
| 6,941,129 B2 | 9/2005 | Marce et al. |
| 6,941,136 B2 | 9/2005 | Study et al. |
| 6,941,453 B2 | 9/2005 | Rao |
| 6,944,621 B1 | 9/2005 | Collart |
| 6,948,099 B1 | 9/2005 | Tallam |
| 6,948,104 B2 | 9/2005 | Herley et al. |
| 6,950,660 B1 | 9/2005 | Hsu et al. |
| 6,952,823 B2 | 10/2005 | Kryloff et al. |
| 6,956,846 B2 | 10/2005 | Lewis et al. |
| 6,957,041 B2 | 10/2005 | Christensen et al. |
| 6,957,062 B2 | 10/2005 | Castrogiovanni et al. |
| 6,957,066 B1 | 10/2005 | Stammers et al. |
| 6,959,436 B2 | 10/2005 | Peng |
| 6,961,417 B2 | 11/2005 | Koch |
| 6,966,058 B2 | 11/2005 | Earl et al. |
| 6,968,179 B1 | 11/2005 | De Vries |
| 6,968,184 B2 | 11/2005 | Criss et al. |
| 6,968,543 B2 | 11/2005 | Takahara et al. |
| 6,970,181 B1 | 11/2005 | Fadel |
| 6,970,189 B1 | 11/2005 | Bernstein et al. |
| 6,970,917 B1 | 11/2005 | Kushwaha et al. |
| 6,976,058 B1 | 12/2005 | Brown et al. |
| 6,976,251 B2 | 12/2005 | Meyerson |
| 6,978,453 B2 | 12/2005 | Rao et al. |
| 6,979,253 B2 | 12/2005 | Thyssen |
| 6,981,020 B2 | 12/2005 | Miloslavsky et al. |
| 6,983,458 B1 | 1/2006 | Honda |
| 6,986,133 B2 | 1/2006 | O'Brien et al. |
| 6,988,182 B2 | 1/2006 | Teachman et al. |
| 6,990,656 B2 | 1/2006 | Ersek et al. |
| 6,990,659 B1 | 1/2006 | Imai |
| 6,990,660 B2 | 1/2006 | Moshir et al. |
| 6,996,603 B1 | 2/2006 | Srinivasan |
| 6,996,818 B2 | 2/2006 | Jacobi et al. |
| 6,999,976 B2 | 2/2006 | Abdallah et al. |
| 6,999,990 B1 | 2/2006 | Sullivan et al. |
| 7,002,919 B1 | 2/2006 | El-Sayed |
| 7,003,534 B2 | 2/2006 | Peng |
| 7,007,049 B2 | 2/2006 | Peng |
| 7,007,083 B1 | 2/2006 | Chesley |
| 7,010,303 B2 | 3/2006 | Lewis et al. |
| 7,024,557 B1 | 4/2006 | Moles et al. |
| 7,027,586 B2 | 4/2006 | Bushey et al. |
| 7,031,972 B2 | 4/2006 | Ren et al. |
| 7,032,033 B1 | 4/2006 | Ledoux et al. |
| 7,039,594 B1 | 5/2006 | Gersting |
| 7,039,796 B2 | 5/2006 | Ballard |
| 7,047,448 B2 | 5/2006 | Rao et al. |
| 7,050,566 B2 | 5/2006 | Becerra et al. |
| 7,055,098 B2 | 5/2006 | Hull et al. |
| 7,055,148 B2 | 5/2006 | Marsh et al. |
| 7,058,849 B2 | 6/2006 | Erstad |
| 7,058,860 B2 | 6/2006 | Miller et al. |
| 7,058,941 B1 | 6/2006 | Venkatesan |
| 7,058,978 B2 | 6/2006 | Feuerstein et al. |
| 7,061,891 B1 | 6/2006 | Kilfoyle et al. |
| 7,062,031 B2 | 6/2006 | Becerra et al. |
| 7,065,347 B1 | 6/2006 | Vikse et al. |
| 7,069,452 B1 | 6/2006 | Hind et al. |
| 7,069,545 B2 | 6/2006 | Wang et al. |
| 7,069,578 B1 | 6/2006 | Prus et al. |
| 7,073,017 B2 | 7/2006 | Yamamoto |
| 7,073,172 B2 | 7/2006 | Chamberlain |
| 7,076,051 B2 | 7/2006 | Brown et al. |
| 7,080,371 B1 | 7/2006 | Arnaiz et al. |
| 7,080,372 B1 | 7/2006 | Cole |
| 7,082,549 B2 | 7/2006 | Rao et al. |
| 7,086,049 B2 | 8/2006 | Goodman |
| 7,089,036 B2 | 8/2006 | Prise |
| 7,089,259 B1 | 8/2006 | Kouznetsov et al. |
| 7,089,549 B2 | 8/2006 | Venkiteswaran |
| 7,089,550 B2 | 8/2006 | Bakke et al. |
| 7,092,734 B2 | 8/2006 | Herle et al. |
| 7,093,244 B2 | 8/2006 | Lajoie et al. |
| 7,096,311 B2 | 8/2006 | Chiang |
| 7,099,896 B2 | 8/2006 | Fields et al. |
| 7,100,083 B2 | 8/2006 | Little et al. |
| 7,103,172 B2 | 9/2006 | Brown et al. |
| 7,103,779 B2 | 9/2006 | Kiehtreiber et al. |
| 7,106,843 B1 | 9/2006 | Gainsboro et al. |
| 7,107,329 B1 | 9/2006 | Schroder et al. |
| 7,110,525 B1 | 9/2006 | Heller et al. |
| 7,111,201 B2 | 9/2006 | Largman et al. |
| 7,111,292 B2 | 9/2006 | Bonnett et al. |
| 7,117,172 B1 | 10/2006 | Black |
| 7,117,195 B2 | 10/2006 | Chantrain et al. |
| 7,120,909 B1 | 10/2006 | Shibuya |
| 7,127,250 B2 | 10/2006 | Gallagher et al. |
| 7,130,807 B1 | 10/2006 | Mikurak |
| 7,130,896 B2 | 10/2006 | Engel et al. |
| 7,134,050 B2 | 11/2006 | Wenzel |
| 7,136,857 B2 | 11/2006 | Chen et al. |
| 7,137,034 B2 | 11/2006 | Largman et al. |
| 7,143,115 B2 | 11/2006 | Jones et al. |
| 7,143,153 B1 | 11/2006 | Black et al. |
| 7,143,405 B2 | 11/2006 | Liu et al. |
| 7,145,898 B1 | 12/2006 | Elliott |
| 7,146,002 B1 | 12/2006 | Smith et al. |
| 7,146,609 B2 | 12/2006 | Thurston et al. |
| 7,149,508 B2 | 12/2006 | Herle |
| 7,150,015 B2 | 12/2006 | Pace et al. |
| 7,165,109 B2 | 1/2007 | Chiloyan et al. |
| 7,165,173 B1 | 1/2007 | Herle |
| 7,171,660 B2 | 1/2007 | McCaleb et al. |
| 7,178,141 B2 | 2/2007 | Piazza |
| 7,181,731 B2 | 2/2007 | Pace et al. |
| 7,188,214 B1 | 3/2007 | Kasriel et al. |
| 7,194,728 B1 | 3/2007 | Sirota et al. |
| 7,200,390 B1 | 4/2007 | Henager et al. |
| 7,203,723 B2 | 4/2007 | Ogawa |
| 7,206,576 B2 | 4/2007 | Jain et al. |
| 7,210,010 B2 | 4/2007 | Ogle |
| 7,215,961 B2 | 5/2007 | Gallagher et al. |
| 7,216,343 B2 | 5/2007 | Das et al. |
| 7,222,340 B2 | 5/2007 | Willis, II |
| 7,230,951 B2 | 6/2007 | Mizell et al. |
| 7,231,411 B1 | 6/2007 | Lu |
| 7,240,102 B1 | 7/2007 | Kouznetsov et al. |
| 7,240,356 B2 | 7/2007 | Iki et al. |
| 7,242,929 B2 | 7/2007 | Draluk et al. |
| 7,247,671 B2 | 7/2007 | Overbeek et al. |
| 7,251,697 B2 | 7/2007 | Piotrowski |
| 7,263,379 B1 | 8/2007 | Parkulo et al. |
| 7,266,371 B1 | 9/2007 | Amin et al. |
| 7,269,821 B2 | 9/2007 | Sahinoja et al. |
| 7,272,711 B2 | 9/2007 | Suda et al. |
| 7,274,911 B2 | 9/2007 | Li |
| 7,275,243 B2 | 9/2007 | Gibbons et al. |
| 7,277,529 B1 | 10/2007 | Wuthnow et al. |
| 7,287,068 B1 | 10/2007 | Eriksson et al. |
| 7,292,846 B2 | 11/2007 | Mittal |
| 7,293,115 B2 | 11/2007 | DaCosta et al. |
| 7,310,720 B2 | 12/2007 | Cornett |
| 7,310,801 B2 | 12/2007 | Burkhardt et al. |
| 7,313,791 B1 | 12/2007 | Chen et al. |
| 7,324,514 B1 | 1/2008 | Haq et al. |
| 7,324,815 B2 | 1/2008 | Ross et al. |
| 7,325,233 B2 | 1/2008 | Kuck et al. |
| 7,346,683 B2 | 3/2008 | Inoue |
| 7,349,695 B2 | 3/2008 | Oommen et al. |
| 7,350,205 B2 | 3/2008 | Ji |
| 7,353,533 B2 | 4/2008 | Wright et al. |
| 7,367,027 B1 | 4/2008 | Chen et al. |
| 7,369,851 B2 | 5/2008 | Okonnen et al. |
| 7,373,109 B2 | 5/2008 | Pohja et al. |
| 7,376,711 B2 | 5/2008 | Du et al. |
| 7,376,944 B2 | 5/2008 | Crisan et al. |

(56) References Cited

U.S. PATENT DOCUMENTS

| | | | |
|---|---|---|---|
| 7,386,846 B2 | 6/2008 | Rajaram | |
| 7,405,537 B2 | 7/2008 | Hoffman et al. | |
| 7,409,685 B2 | 8/2008 | Chen et al. | |
| 7,415,706 B1 | 8/2008 | Raju et al. | |
| 7,433,936 B2 | 10/2008 | Zhu et al. | |
| 7,461,294 B2 | 12/2008 | Sano | |
| 7,469,306 B2 | 12/2008 | Ng | |
| 7,478,385 B2 * | 1/2009 | Sierer et al. | 717/174 |
| 7,480,907 B1 | 1/2009 | Marolia et al. | |
| 7,493,128 B2 | 2/2009 | Tang et al. | |
| 7,500,143 B2 | 3/2009 | Buia et al. | |
| 7,509,496 B2 | 3/2009 | Skog et al. | |
| 7,509,652 B2 | 3/2009 | Niemi | |
| 7,518,504 B2 | 4/2009 | Peeters | |
| 7,523,155 B2 | 4/2009 | Hayes, Jr. | |
| 7,526,563 B2 | 4/2009 | Ingimundarson et al. | |
| 7,555,750 B1 | 6/2009 | Lilley | |
| 7,577,722 B1 | 8/2009 | Khandekar et al. | |
| 7,584,466 B1 | 9/2009 | Rao | |
| 7,644,404 B2 | 1/2010 | Rao et al. | |
| 7,657,884 B2 | 2/2010 | Okonnen et al. | |
| 7,657,886 B1 | 2/2010 | Chen et al. | |
| 7,664,923 B2 | 2/2010 | Kim et al. | |
| 7,673,300 B2 | 3/2010 | Herle et al. | |
| 7,673,325 B2 | 3/2010 | Vincent et al. | |
| 7,680,828 B2 | 3/2010 | Gorelik | |
| 7,689,981 B1 | 3/2010 | Gustafson | |
| 7,698,698 B2 | 4/2010 | Skan | |
| 7,707,570 B2 | 4/2010 | Yoshimura et al. | |
| 7,711,782 B2 | 5/2010 | Kim et al. | |
| 7,725,889 B2 | 5/2010 | Gustafson et al. | |
| 7,739,679 B2 | 6/2010 | Qumei | |
| 7,784,065 B2 | 8/2010 | Polivy et al. | |
| 7,797,693 B1 | 9/2010 | Gustafson et al. | |
| 7,797,695 B2 | 9/2010 | Motta | |
| 7,810,088 B2 | 10/2010 | Herle et al. | |
| 7,818,556 B2 | 10/2010 | Iima et al. | |
| 7,823,148 B2 * | 10/2010 | Deshpande et al. | 717/174 |
| 7,823,155 B2 | 10/2010 | Misra et al. | |
| 7,844,964 B2 | 11/2010 | Marolia | |
| 7,873,714 B2 | 1/2011 | Kaappa et al. | |
| 7,889,869 B2 | 2/2011 | Ypya et al. | |
| 8,063,929 B2 | 11/2011 | Kurtz et al. | |
| 8,099,078 B2 | 1/2012 | Lazaridis | |
| 2001/0008024 A1 | 7/2001 | Inaba | |
| 2001/0018673 A1 | 8/2001 | Goldband et al. | |
| 2001/0029178 A1 | 10/2001 | Criss et al. | |
| 2001/0041556 A1 | 11/2001 | Laursen et al. | |
| 2001/0042112 A1 | 11/2001 | Slivka et al. | |
| 2001/0044934 A1 | 11/2001 | Hirai et al. | |
| 2001/0047363 A1 | 11/2001 | Peng | |
| 2001/0047441 A1 | 11/2001 | Robertson | |
| 2001/0048728 A1 | 12/2001 | Peng | |
| 2001/0049263 A1 | 12/2001 | Zhang | |
| 2001/0052052 A1 | 12/2001 | Peng | |
| 2001/0052066 A1 | 12/2001 | Lee et al. | |
| 2001/0053688 A1 | 12/2001 | Rignell et al. | |
| 2001/0055414 A1 | 12/2001 | Thieme | |
| 2001/0056348 A1 | 12/2001 | Hyde-Thomson et al. | |
| 2002/0010702 A1 | 1/2002 | Ajtai et al. | |
| 2002/0013831 A1 | 1/2002 | Astala et al. | |
| 2002/0023258 A1 | 2/2002 | Elwahab et al. | |
| 2002/0028673 A1 | 3/2002 | Chang et al. | |
| 2002/0030634 A1 | 3/2002 | Noda et al. | |
| 2002/0039394 A1 | 4/2002 | Buchwald et al. | |
| 2002/0046400 A1 | 4/2002 | Burch | |
| 2002/0052938 A1 | 5/2002 | Kanemitsu | |
| 2002/0053044 A1 | 5/2002 | Gold et al. | |
| 2002/0059526 A1 | 5/2002 | Dillon et al. | |
| 2002/0065950 A1 | 5/2002 | Katz et al. | |
| 2002/0069259 A1 | 6/2002 | Kushwaha et al. | |
| 2002/0073304 A1 | 6/2002 | Marsh et al. | |
| 2002/0073309 A1 | 6/2002 | Kurn et al. | |
| 2002/0075824 A1 | 6/2002 | Willekes | |
| 2002/0077094 A1 | 6/2002 | Leppanen | |
| 2002/0078142 A1 | 6/2002 | Moore et al. | |
| 2002/0078185 A1 | 6/2002 | Swerup et al. | |
| 2002/0078209 A1 | 6/2002 | Peng | |
| 2062/0072359 | 6/2002 | Moles et al. | |
| 2002/0085704 A1 | 7/2002 | Shires | |
| 2002/0087668 A1 | 7/2002 | San Martin et al. | |
| 2002/0090934 A1 | 7/2002 | Mitchelmore | |
| 2002/0091568 A1 | 7/2002 | Kraft et al. | |
| 2002/0091807 A1 | 7/2002 | Goodman | |
| 2002/0091815 A1 | 7/2002 | Anderson et al. | |
| 2002/0092008 A1 | 7/2002 | Kehne et al. | |
| 2002/0092010 A1 | 7/2002 | Fiske | |
| 2002/0092011 A1 | 7/2002 | Liu et al. | |
| 2002/0095501 A1 | 7/2002 | Chiloyan et al. | |
| 2002/0095615 A1 | 7/2002 | Hastings et al. | |
| 2002/0099726 A1 | 7/2002 | Crudele et al. | |
| 2002/0099950 A1 | 7/2002 | Smith | |
| 2002/0100028 A1 | 7/2002 | Kosaka et al. | |
| 2002/0100036 A1 | 7/2002 | Mishir et al. | |
| 2002/0107795 A1 | 8/2002 | Minear et al. | |
| 2002/0112046 A1 | 8/2002 | Kushwaha et al. | |
| 2002/0112047 A1 | 8/2002 | Kushwaha et al. | |
| 2002/0114384 A1 | 8/2002 | Nelson et al. | |
| 2002/0116261 A1 | 8/2002 | Moskowitz et al. | |
| 2002/0116665 A1 | 8/2002 | Pickover et al. | |
| 2002/0120776 A1 | 8/2002 | Eggebratten et al. | |
| 2002/0120810 A1 | 8/2002 | Brouwer | |
| 2002/0123335 A1 | 9/2002 | Luna et al. | |
| 2002/0123359 A1 | 9/2002 | Wei et al. | |
| 2002/0123934 A1 | 9/2002 | Tanaka et al. | |
| 2002/0124007 A1 | 9/2002 | Zhao | |
| 2002/0124209 A1 | 9/2002 | Faust et al. | |
| 2002/0129355 A1 | 9/2002 | Velten et al. | |
| 2002/0131404 A1 | 9/2002 | Mehta et al. | |
| 2002/0138567 A1 | 9/2002 | Ogawa | |
| 2002/0144005 A1 | 10/2002 | Mae et al. | |
| 2002/0144254 A1 | 10/2002 | Owada | |
| 2002/0152005 A1 | 10/2002 | Bagnordi | |
| 2002/0156863 A1 | 10/2002 | Peng | |
| 2002/0157089 A1 | 10/2002 | Patel et al. | |
| 2002/0157090 A1 | 10/2002 | Anton, Jr. | |
| 2002/0159479 A1 | 10/2002 | Watanuki et al. | |
| 2002/0161658 A1 | 10/2002 | Sussman | |
| 2002/0162098 A1 | 10/2002 | Suzuki | |
| 2002/0166001 A1 | 11/2002 | Cheng et al. | |
| 2002/0166027 A1 | 11/2002 | Shirasawa et al. | |
| 2002/0170052 A1 | 11/2002 | Radatti | |
| 2002/0174338 A1 | 11/2002 | Tomita et al. | |
| 2002/0174422 A1 | 11/2002 | Kelley et al. | |
| 2002/0178241 A1 | 11/2002 | Eriksson | |
| 2002/0184208 A1 | 12/2002 | Kato | |
| 2002/0184619 A1 | 12/2002 | Meyerson | |
| 2002/0188886 A1 | 12/2002 | Liu et al. | |
| 2002/0193100 A1 | 12/2002 | Riffe et al. | |
| 2002/0194532 A1 | 12/2002 | Nagasawa | |
| 2002/0197991 A1 | 12/2002 | Anvekar et al. | |
| 2002/0198971 A1 | 12/2002 | Resnick et al. | |
| 2002/0198976 A1 | 12/2002 | Davenport | |
| 2003/0005108 A1 | 1/2003 | Bartley et al. | |
| 2003/0005362 A1 | 1/2003 | Miller et al. | |
| 2003/0005426 A1 | 1/2003 | Scholtens et al. | |
| 2003/0009752 A1 | 1/2003 | Gupta | |
| 2003/0009753 A1 | 1/2003 | Brodersen et al. | |
| 2003/0013434 A1 | 1/2003 | Rosenberg et al. | |
| 2003/0018524 A1 | 1/2003 | Fishman et al. | |
| 2003/0018764 A1 | 1/2003 | Shell et al. | |
| 2003/0018810 A1 | 1/2003 | Karagiannis et al. | |
| 2003/0018889 A1 | 1/2003 | Burnett et al. | |
| 2003/0022657 A1 | 1/2003 | Herschberg et al. | |
| 2003/0022663 A1 | 1/2003 | Rajaram et al. | |
| 2003/0023573 A1 | 1/2003 | Chan et al. | |
| 2003/0023849 A1 | 1/2003 | Martin, Jr. | |
| 2003/0023964 A1 | 1/2003 | Rajaram et al. | |
| 2003/0027563 A1 | 2/2003 | Herle et al. | |
| 2003/0027581 A1 | 2/2003 | Jokinen et al. | |
| 2003/0031306 A1 | 2/2003 | Pederson et al. | |
| 2003/0033358 A1 | 2/2003 | Tran et al. | |
| 2003/0033525 A1 | 2/2003 | Rajaram | |
| 2003/0033599 A1 | 2/2003 | Rajaram et al. | |

(56) References Cited

U.S. PATENT DOCUMENTS

| | | |
|---|---|---|
| 2003/0036919 A1 | 2/2003 | Felt et al. |
| 2003/0037075 A1 | 2/2003 | Hannigan et al. |
| 2003/0041125 A1 | 2/2003 | Salomon |
| 2003/0041127 A1 | 2/2003 | Turnbull |
| 2003/0043180 A1 | 3/2003 | Gusler et al. |
| 2003/0044086 A1 | 3/2003 | Jia et al. |
| 2003/0046485 A1 | 3/2003 | Zitlaw |
| 2003/0046524 A1 | 3/2003 | Zimmer et al. |
| 2003/0046680 A1 | 3/2003 | Gentry |
| 2003/0054811 A1 | 3/2003 | Han et al. |
| 2003/0055919 A1 | 3/2003 | Fong et al. |
| 2003/0055931 A1 | 3/2003 | Cravo De Almeida et al. |
| 2003/0061323 A1 | 3/2003 | East et al. |
| 2003/0061384 A1 | 3/2003 | Nakatani |
| 2003/0065738 A1 | 4/2003 | Yang et al. |
| 2003/0066062 A1 | 4/2003 | Brannock et al. |
| 2003/0068162 A1 | 4/2003 | Tsai et al. |
| 2003/0074658 A1 | 4/2003 | Kim |
| 2003/0074672 A1 | 4/2003 | Daniels |
| 2003/0081557 A1 | 5/2003 | Mettala et al. |
| 2003/0081786 A1 | 5/2003 | Nakano et al. |
| 2003/0084138 A1 | 5/2003 | Tavis et al. |
| 2003/0084177 A1 | 5/2003 | Mulligan |
| 2003/0084283 A1 | 5/2003 | Pixton |
| 2003/0084434 A1 | 5/2003 | Ren et al. |
| 2003/0084435 A1 | 5/2003 | Messer et al. |
| 2003/0088868 A1 | 5/2003 | Chang et al. |
| 2003/0092438 A1 | 5/2003 | Moore et al. |
| 2003/0093545 A1 | 5/2003 | Liu et al. |
| 2003/0095648 A1 | 5/2003 | Kaib et al. |
| 2003/0097431 A1 | 5/2003 | Dill |
| 2003/0100303 A1 | 5/2003 | Armbruster et al. |
| 2003/0101246 A1 | 5/2003 | Lahti |
| 2003/0101446 A1 | 5/2003 | McManus et al. |
| 2003/0103484 A1 | 6/2003 | Oommen et al. |
| 2003/0110412 A1 | 6/2003 | Neville |
| 2003/0110484 A1 | 6/2003 | Famolari |
| 2003/0112752 A1 | 6/2003 | Irifune et al. |
| 2003/0117956 A1 | 6/2003 | Lee |
| 2003/0121032 A1 | 6/2003 | Cho et al. |
| 2003/0131087 A1 | 7/2003 | Shippy et al. |
| 2003/0131226 A1 | 7/2003 | Spencer et al. |
| 2003/0133552 A1 | 7/2003 | Pillai et al. |
| 2003/0143991 A1 | 7/2003 | Minear et al. |
| 2003/0149735 A1 | 8/2003 | Stark et al. |
| 2003/0154471 A1 | 8/2003 | Teachman et al. |
| 2003/0156719 A1 | 8/2003 | Cronce |
| 2003/0158973 A1 | 8/2003 | Tsukada |
| 2003/0162533 A1 | 8/2003 | Moles et al. |
| 2003/0163508 A1 | 8/2003 | Goodman |
| 2003/0163551 A1 | 8/2003 | Riordan |
| 2003/0163805 A1 | 8/2003 | Hata et al. |
| 2003/0172094 A1 | 9/2003 | Lauria et al. |
| 2003/0172138 A1 | 9/2003 | McCormack et al. |
| 2003/0172175 A1 | 9/2003 | McCormack et al. |
| 2003/0177255 A1 | 9/2003 | Yun |
| 2003/0177485 A1 | 9/2003 | Waldin et al. |
| 2003/0182414 A1 | 9/2003 | O'Neill |
| 2003/0186689 A1 | 10/2003 | Herle et al. |
| 2003/0186695 A1 | 10/2003 | Bridges et al. |
| 2003/0186722 A1 | 10/2003 | Weiner |
| 2003/0188120 A1 | 10/2003 | Maeda |
| 2003/0188156 A1 | 10/2003 | Yasala et al. |
| 2003/0191955 A1 | 10/2003 | Wagner et al. |
| 2003/0194033 A1 | 10/2003 | Tidemann et al. |
| 2003/0195110 A1 | 10/2003 | Moody et al. |
| 2003/0195753 A1 | 10/2003 | Homuth |
| 2003/0195951 A1 | 10/2003 | Wittel et al. |
| 2003/0196110 A1 | 10/2003 | Lampson et al. |
| 2003/0198282 A1 | 10/2003 | Tujkovic et al. |
| 2003/0204640 A1 | 10/2003 | Sahinoja et al. |
| 2003/0212742 A1 | 11/2003 | Hochmuth et al. |
| 2003/0214919 A1 | 11/2003 | Kilfoyle et al. |
| 2003/0217193 A1 | 11/2003 | Thurston et al. |
| 2003/0217358 A1 | 11/2003 | Thurston et al. |
| 2003/0221190 A1* | 11/2003 | Deshpande et al. .......... 717/171 |
| 2003/0224761 A1 | 12/2003 | Goto |
| 2003/0226030 A1 | 12/2003 | Hurst et al. |
| 2003/0226137 A1 | 12/2003 | Nagao |
| 2003/0233649 A1 | 12/2003 | Reimert |
| 2004/0002943 A1 | 1/2004 | Merrill et al. |
| 2004/0003266 A1 | 1/2004 | Moshir et al. |
| 2004/0005906 A1 | 1/2004 | Okumura et al. |
| 2004/0006723 A1 | 1/2004 | Erstad |
| 2004/0006760 A1 | 1/2004 | Gove et al. |
| 2004/0008113 A1 | 1/2004 | Pradhan et al. |
| 2004/0015857 A1 | 1/2004 | Cornelius et al. |
| 2004/0015940 A1 | 1/2004 | Heisey et al. |
| 2004/0015952 A1 | 1/2004 | Lajoie et al. |
| 2004/0017831 A1 | 1/2004 | Shen et al. |
| 2004/0018831 A1 | 1/2004 | Majmundar et al. |
| 2004/0026008 A1 | 2/2004 | Delisle |
| 2004/0031027 A1 | 2/2004 | Hiltgen |
| 2004/0031029 A1 | 2/2004 | Lee et al. |
| 2004/0031030 A1 | 2/2004 | Kidder et al. |
| 2004/0031031 A1 | 2/2004 | Rudelic |
| 2004/0034765 A1 | 2/2004 | James |
| 2004/0034850 A1 | 2/2004 | Burkhardt et al. |
| 2004/0034853 A1 | 2/2004 | Gibbons et al. |
| 2004/0038692 A1 | 2/2004 | Muzaffar |
| 2004/0039801 A9 | 2/2004 | Srinivasan et al. |
| 2004/0040020 A1 | 2/2004 | Yang |
| 2004/0041800 A1 | 3/2004 | Daniels |
| 2004/0043788 A1 | 3/2004 | Mittal |
| 2004/0049394 A1 | 3/2004 | Burger et al. |
| 2004/0049609 A1 | 3/2004 | Simonson et al. |
| 2004/0054764 A1* | 3/2004 | Aderton et al. ................ 709/223 |
| 2004/0054995 A1 | 3/2004 | Lee |
| 2004/0058651 A1 | 3/2004 | Ross et al. |
| 2004/0058652 A1 | 3/2004 | McGregor et al. |
| 2004/0059725 A1 | 3/2004 | Sharangpani et al. |
| 2004/0062130 A1 | 4/2004 | Chiang |
| 2004/0068363 A1 | 4/2004 | Goto |
| 2004/0068721 A1 | 4/2004 | O'Neill et al. |
| 2004/0068724 A1 | 4/2004 | Gardner et al. |
| 2004/0072578 A1 | 4/2004 | Keutmann et al. |
| 2004/0073901 A1 | 4/2004 | Imamatsu |
| 2004/0073912 A1 | 4/2004 | Meza |
| 2004/0078427 A1 | 4/2004 | Gil et al. |
| 2004/0078455 A1 | 4/2004 | Eide et al. |
| 2004/0082346 A1 | 4/2004 | Skytt et al. |
| 2004/0083469 A1 | 4/2004 | Chen et al. |
| 2004/0083472 A1 | 4/2004 | Rao et al. |
| 2004/0088281 A1 | 5/2004 | Matsuishi |
| 2004/0088473 A1 | 5/2004 | Ogle |
| 2004/0088694 A1 | 5/2004 | Ho |
| 2004/0092255 A1 | 5/2004 | Ji et al. |
| 2004/0093342 A1 | 5/2004 | Arbo et al. |
| 2004/0093421 A1 | 5/2004 | Peng et al. |
| 2004/0093523 A1 | 5/2004 | Matsuzaki et al. |
| 2004/0093557 A1 | 5/2004 | Kawatani |
| 2004/0093597 A1 | 5/2004 | Rao et al. |
| 2004/0095457 A1 | 5/2004 | Pokomy et al. |
| 2004/0098413 A1 | 5/2004 | Peng |
| 2004/0098421 A1 | 5/2004 | Peng |
| 2004/0098427 A1 | 5/2004 | Peng |
| 2004/0098715 A1 | 5/2004 | Aghera et al. |
| 2004/0103214 A1 | 5/2004 | Adwankar et al. |
| 2004/0103340 A1 | 5/2004 | Sundareson et al. |
| 2004/0103347 A1 | 5/2004 | Sneed et al. |
| 2004/0107416 A1 | 6/2004 | Buban et al. |
| 2004/0110497 A1 | 6/2004 | Little |
| 2004/0111582 A1 | 6/2004 | Maeda et al. |
| 2004/0111702 A1 | 6/2004 | Chan |
| 2004/0111723 A1 | 6/2004 | Moles et al. |
| 2004/0117322 A1 | 6/2004 | Bjorksten et al. |
| 2004/0117760 A1 | 6/2004 | McFarling |
| 2004/0117785 A1 | 6/2004 | Kincaid |
| 2004/0123153 A1 | 6/2004 | Wright et al. |
| 2004/0123188 A1 | 6/2004 | Srinivasan et al. |
| 2004/0123270 A1 | 6/2004 | Zhuang et al. |
| 2004/0123282 A1 | 6/2004 | Rao |
| 2004/0126803 A1 | 7/2004 | Cash et al. |
| 2004/0133887 A1 | 7/2004 | Herle et al. |

(56) References Cited

U.S. PATENT DOCUMENTS

| | | |
|---|---|---|
| 2004/0143573 A1 | 7/2004 | Burkey et al. |
| 2004/0143828 A1 | 7/2004 | Liu et al. |
| 2004/0143836 A1 | 7/2004 | McCormack et al. |
| 2004/0148379 A1 | 7/2004 | Ogura |
| 2004/0150519 A1 | 8/2004 | Husain et al. |
| 2004/0152455 A1 | 8/2004 | Herle et al. |
| 2004/0153327 A1 | 8/2004 | Liu et al. |
| 2004/0153356 A1 | 8/2004 | Lockwood et al. |
| 2004/0153549 A1 | 8/2004 | Naito et al. |
| 2004/0158583 A1 | 8/2004 | Kaappa |
| 2004/0158817 A1 | 8/2004 | Okachi et al. |
| 2004/0158829 A1* | 8/2004 | Beresin et al. ............ 717/178 |
| 2004/0166839 A1 | 8/2004 | Okkonen et al. |
| 2004/0168165 A1 | 8/2004 | Kokkinen |
| 2004/0174264 A1 | 9/2004 | Reisman et al. |
| 2004/0180676 A1 | 9/2004 | Haumont et al. |
| 2004/0190693 A1 | 9/2004 | Beiermeister |
| 2004/0192280 A1 | 9/2004 | Dalton et al. |
| 2004/0192299 A1 | 9/2004 | Wilson et al. |
| 2004/0192306 A1 | 9/2004 | Elkarat et al. |
| 2004/0194081 A1 | 9/2004 | Qumei et al. |
| 2004/0198447 A1 | 10/2004 | Larsson |
| 2004/0203593 A1 | 10/2004 | Whelan et al. |
| 2004/0203655 A1 | 10/2004 | Sinnarajah et al. |
| 2004/0204117 A1 | 10/2004 | Weiner |
| 2004/0205709 A1 | 10/2004 | Hiltgen et al. |
| 2004/0208182 A1 | 10/2004 | Boles et al. |
| 2004/0210608 A1 | 10/2004 | Lee et al. |
| 2004/0215702 A1 | 10/2004 | Hamasaki et al. |
| 2004/0215755 A1 | 10/2004 | O'Neill |
| 2004/0215830 A1 | 10/2004 | Shenfield |
| 2004/0218034 A1 | 11/2004 | Wang et al. |
| 2004/0224679 A1 | 11/2004 | Okoro et al. |
| 2004/0226008 A1 | 11/2004 | Jacobi et al. |
| 2004/0229684 A1 | 11/2004 | Blackburn et al. |
| 2004/0230963 A1 | 11/2004 | Rothman et al. |
| 2004/0230965 A1 | 11/2004 | Okkonen |
| 2004/0237079 A1 | 11/2004 | Cox et al. |
| 2004/0237081 A1 | 11/2004 | Homiller |
| 2004/0237083 A1 | 11/2004 | Alcazar et al. |
| 2004/0239975 A1 | 12/2004 | Kawaura et al. |
| 2004/0242286 A1 | 12/2004 | Benco et al. |
| 2004/0243991 A1 | 12/2004 | Gustafson et al. |
| 2004/0243992 A1 | 12/2004 | Gustafson et al. |
| 2004/0243993 A1 | 12/2004 | Okkonen et al. |
| 2004/0244008 A1 | 12/2004 | Lee |
| 2004/0250245 A1 | 12/2004 | Rao et al. |
| 2004/0250294 A1 | 12/2004 | Kim |
| 2004/0255191 A1 | 12/2004 | Fox et al. |
| 2004/0255291 A1* | 12/2004 | Sierer et al. ............ 717/174 |
| 2004/0257208 A1 | 12/2004 | Huang et al. |
| 2004/0260734 A1 | 12/2004 | Ren et al. |
| 2004/0261072 A1 | 12/2004 | Herle et al. |
| 2004/0261073 A1 | 12/2004 | Herle et al. |
| 2004/0267481 A1 | 12/2004 | Resnick et al. |
| 2004/0267833 A1 | 12/2004 | Meller et al. |
| 2004/0268041 A1 | 12/2004 | Smith |
| 2005/0005268 A1 | 1/2005 | Zilavy et al. |
| 2005/0010552 A1 | 1/2005 | Kaappa et al. |
| 2005/0010576 A1 | 1/2005 | Ren et al. |
| 2005/0010585 A1 | 1/2005 | Sahinoja et al. |
| 2005/0022175 A1 | 1/2005 | Sliger et al. |
| 2005/0027867 A1 | 2/2005 | Mueller et al. |
| 2005/0033774 A1 | 2/2005 | Brentano et al. |
| 2005/0033829 A1 | 2/2005 | Oommen |
| 2005/0037762 A1 | 2/2005 | Gurbani et al. |
| 2005/0038916 A1 | 2/2005 | Nguyen |
| 2005/0038955 A1 | 2/2005 | Chen |
| 2005/0039178 A1 | 2/2005 | Marolia et al. |
| 2005/0050538 A1 | 3/2005 | Kawamata et al. |
| 2005/0055397 A1 | 3/2005 | Zhu et al. |
| 2005/0055453 A1 | 3/2005 | Zhu |
| 2005/0055595 A1 | 3/2005 | Frazer et al. |
| 2005/0055684 A1 | 3/2005 | Rao et al. |
| 2005/0060361 A1 | 3/2005 | Chatrath et al. |
| 2005/0060699 A1 | 3/2005 | Kim et al. |
| 2005/0060711 A1 | 3/2005 | Ericsson et al. |
| 2005/0063242 A1 | 3/2005 | Ren |
| 2005/0066019 A1 | 3/2005 | Egan et al. |
| 2005/0071385 A1 | 3/2005 | Rao |
| 2005/0073438 A1 | 4/2005 | Rodgers et al. |
| 2005/0079863 A1 | 4/2005 | Macaluso |
| 2005/0084079 A1 | 4/2005 | Lang |
| 2005/0086328 A1 | 4/2005 | Landram et al. |
| 2005/0091367 A1 | 4/2005 | Pyhalammi et al. |
| 2005/0091501 A1 | 4/2005 | Osthoff et al. |
| 2005/0096025 A1 | 5/2005 | Qumei et al. |
| 2005/0097544 A1 | 5/2005 | Kim |
| 2005/0102615 A1 | 5/2005 | Roman et al. |
| 2005/0102660 A1 | 5/2005 | Chen et al. |
| 2005/0114493 A1 | 5/2005 | Mandato et al. |
| 2005/0114504 A1 | 5/2005 | Marolia et al. |
| 2005/0114852 A1 | 5/2005 | Chen et al. |
| 2005/0132179 A1 | 6/2005 | Glaum et al. |
| 2005/0132349 A1 | 6/2005 | Roberts et al. |
| 2005/0132351 A1 | 6/2005 | Randall et al. |
| 2005/0135286 A1 | 6/2005 | Nurminen et al. |
| 2005/0136942 A1 | 6/2005 | Timiri et al. |
| 2005/0138232 A1 | 6/2005 | Tamura et al. |
| 2005/0144609 A1 | 6/2005 | Rothman et al. |
| 2005/0144612 A1 | 6/2005 | Wang et al. |
| 2005/0148323 A1 | 7/2005 | Little et al. |
| 2005/0148359 A1 | 7/2005 | Joeressen |
| 2005/0149335 A1 | 7/2005 | Mesbah et al. |
| 2005/0153741 A1 | 7/2005 | Chen et al. |
| 2005/0160195 A1 | 7/2005 | Bruner et al. |
| 2005/0165706 A1 | 7/2005 | Giacchetti |
| 2005/0170863 A1 | 8/2005 | Shostak |
| 2005/0172117 A1 | 8/2005 | Aura |
| 2005/0172141 A1 | 8/2005 | Gayde et al. |
| 2005/0182697 A1 | 8/2005 | Rao |
| 2005/0198062 A1 | 9/2005 | Shapiro |
| 2005/0198379 A1 | 9/2005 | Panasyuk et al. |
| 2005/0204068 A1 | 9/2005 | Zhu et al. |
| 2005/0204353 A1 | 9/2005 | Ji |
| 2005/0210458 A1 | 9/2005 | Moriyama et al. |
| 2005/0216718 A1 | 9/2005 | Rao |
| 2005/0216902 A1 | 9/2005 | Schaefer |
| 2005/0216903 A1 | 9/2005 | Schaefer |
| 2005/0220079 A1 | 10/2005 | Asokan |
| 2005/0227677 A1 | 10/2005 | Kallio |
| 2005/0227683 A1 | 10/2005 | Draluk et al. |
| 2005/0228847 A1 | 10/2005 | Hayes, Jr. |
| 2005/0228874 A1 | 10/2005 | Edgett et al. |
| 2005/0233733 A1 | 10/2005 | Roundtree et al. |
| 2005/0234967 A1 | 10/2005 | Draluk et al. |
| 2005/0234997 A1 | 10/2005 | Gu et al. |
| 2005/0239447 A1 | 10/2005 | Holzman et al. |
| 2005/0246703 A1 | 11/2005 | Ahonen |
| 2005/0251848 A1 | 11/2005 | Al-Janabi |
| 2005/0257214 A1 | 11/2005 | Moshir et al. |
| 2005/0264404 A1 | 12/2005 | Franczyk et al. |
| 2005/0268296 A1 | 12/2005 | Marolia et al. |
| 2005/0272455 A1 | 12/2005 | Oommen |
| 2005/0278399 A1 | 12/2005 | Herle et al. |
| 2005/0278715 A1 | 12/2005 | Herle et al. |
| 2005/0282533 A1 | 12/2005 | Draluk et al. |
| 2005/0289533 A1 | 12/2005 | Wang et al. |
| 2006/0007901 A1 | 1/2006 | Roskowski et al. |
| 2006/0010437 A1 | 1/2006 | Marolia |
| 2006/0015626 A1 | 1/2006 | Hallamaa et al. |
| 2006/0015860 A1 | 1/2006 | Liu et al. |
| 2006/0020947 A1 | 1/2006 | Hallamaa et al. |
| 2006/0026228 A1 | 2/2006 | Kim |
| 2006/0031449 A1 | 2/2006 | Hallamaa et al. |
| 2006/0036493 A1 | 2/2006 | Aufricht et al. |
| 2006/0036874 A1 | 2/2006 | Cockerille et al. |
| 2006/0036941 A1 | 2/2006 | Neil |
| 2006/0039313 A1 | 2/2006 | Chou et al. |
| 2006/0039561 A1 | 2/2006 | Ypya et al. |
| 2006/0052089 A1 | 3/2006 | Khurana et al. |
| 2006/0053066 A1 | 3/2006 | Sherr et al. |
| 2006/0059481 A1 | 3/2006 | Smith et al. |
| 2006/0068786 A1 | 3/2006 | Florence |

(56) References Cited

U.S. PATENT DOCUMENTS

| | | |
|---|---|---|
| 2006/0072847 A1 | 4/2006 | Chor et al. |
| 2006/0079224 A1 | 4/2006 | Welnick et al. |
| 2006/0080635 A1 | 4/2006 | Anwar et al. |
| 2006/0080650 A1 | 4/2006 | Winters et al. |
| 2006/0080659 A1 | 4/2006 | Ganji |
| 2006/0080681 A1 | 4/2006 | Anwar et al. |
| 2006/0087982 A1 | 4/2006 | Kuure et al. |
| 2006/0089999 A1 | 4/2006 | Xiang et al. |
| 2006/0100928 A1 | 5/2006 | Walczak et al. |
| 2006/0101040 A1 | 5/2006 | Ren et al. |
| 2006/0106806 A1 | 5/2006 | Sperling et al. |
| 2006/0106888 A1 | 5/2006 | Iida et al. |
| 2006/0129414 A1 | 6/2006 | Hallamaa et al. |
| 2006/0130046 A1 | 6/2006 | O'Neill |
| 2006/0158510 A1 | 7/2006 | Lia et al. |
| 2006/0160533 A1 | 7/2006 | Chou et al. |
| 2006/0161599 A1 | 7/2006 | Rosen |
| 2006/0172742 A1 | 8/2006 | Chou et al. |
| 2006/0173976 A1 | 8/2006 | Vincent et al. |
| 2006/0174242 A1 | 8/2006 | Zhu et al. |
| 2006/0176397 A1 | 8/2006 | Panabaker |
| 2006/0181553 A1 | 8/2006 | Choe et al. |
| 2006/0190608 A1 | 8/2006 | Sahinoja et al. |
| 2006/0190939 A1 | 8/2006 | Chen et al. |
| 2006/0193337 A1 | 8/2006 | Paila et al. |
| 2006/0200658 A1 | 9/2006 | Penkethman |
| 2006/0200814 A1 | 9/2006 | Kontinen et al. |
| 2006/0203722 A1 | 9/2006 | Oommen |
| 2006/0203738 A1 | 9/2006 | Fok et al. |
| 2006/0212561 A1 | 9/2006 | Feng |
| 2006/0212937 A1 | 9/2006 | Natarajan |
| 2006/0217111 A1 | 9/2006 | Marolia et al. |
| 2006/0223528 A1 | 10/2006 | Smith |
| 2006/0224712 A1 | 10/2006 | Aho |
| 2006/0236325 A1 | 10/2006 | Rao et al. |
| 2006/0242305 A1 | 10/2006 | Alnas |
| 2006/0246922 A1 | 11/2006 | Gasbarro et al. |
| 2006/0248172 A1 | 11/2006 | Zurawka et al. |
| 2006/0258344 A1 | 11/2006 | Chen |
| 2006/0271659 A1 | 11/2006 | Mittal et al. |
| 2006/0277590 A1 | 12/2006 | Limont et al. |
| 2006/0282834 A1 | 12/2006 | Cheng et al. |
| 2007/0014243 A1 | 1/2007 | Meyer et al. |
| 2007/0028226 A1 | 2/2007 | Chen et al. |
| 2007/0036294 A1 | 2/2007 | Chaudhuri et al. |
| 2007/0041545 A1 | 2/2007 | Gainsboro |
| 2007/0043849 A1 | 2/2007 | Lill et al. |
| 2007/0049265 A1 | 3/2007 | Kaimal et al. |
| 2007/0067765 A1 | 3/2007 | Motta et al. |
| 2007/0089108 A1 | 4/2007 | Chen et al. |
| 2007/0093243 A1 | 4/2007 | Kapadekar et al. |
| 2007/0100585 A1 | 5/2007 | Dulberg et al. |
| 2007/0106806 A1 | 5/2007 | Tu et al. |
| 2007/0132774 A1 | 6/2007 | Fan et al. |
| 2007/0133484 A1 | 6/2007 | Albal et al. |
| 2007/0150444 A1 | 6/2007 | Chesnais et al. |
| 2007/0150524 A1 | 6/2007 | Eker et al. |
| 2007/0169073 A1 | 7/2007 | O'Neill et al. |
| 2007/0169075 A1 | 7/2007 | Lill et al. |
| 2007/0169089 A1* | 7/2007 | Bantz et al. .................. 717/168 |
| 2007/0169099 A1 | 7/2007 | Rao et al. |
| 2007/0186108 A1 | 8/2007 | Passarella et al. |
| 2007/0190939 A1 | 8/2007 | Abel |
| 2007/0192158 A1 | 8/2007 | Kim |
| 2007/0192453 A1 | 8/2007 | Copeland et al. |
| 2007/0200713 A1 | 8/2007 | Weber et al. |
| 2007/0220504 A1 | 9/2007 | Eker |
| 2007/0226805 A1 | 9/2007 | Jeal et al. |
| 2007/0259633 A1 | 11/2007 | Rao |
| 2007/0277169 A1 | 11/2007 | Rao et al. |
| 2007/0282621 A1 | 12/2007 | Altman et al. |
| 2007/0283003 A1 | 12/2007 | Broyles et al. |
| 2007/0294684 A1 | 12/2007 | Kumashiro et al. |
| 2008/0032736 A1 | 2/2008 | Bari et al. |
| 2008/0043726 A1 | 2/2008 | Herrero-Veron et al. |
| 2008/0046583 A1 | 2/2008 | Rao |
| 2008/0062900 A1 | 3/2008 | Rao |
| 2008/0062926 A1 | 3/2008 | Oba |
| 2008/0108321 A1 | 5/2008 | Taaghol et al. |
| 2008/0114925 A1 | 5/2008 | Yang |
| 2008/0127320 A1 | 5/2008 | De Lutiis et al. |
| 2008/0144590 A1 | 6/2008 | Rantanen et al. |
| 2008/0154633 A1 | 6/2008 | Ishibashi et al. |
| 2008/0160983 A1 | 7/2008 | Poplett et al. |
| 2008/0184220 A1 | 7/2008 | Chen et al. |
| 2008/0196019 A1 | 8/2008 | Meller et al. |
| 2008/0205419 A1 | 8/2008 | Shin et al. |
| 2008/0208928 A1 | 8/2008 | Hernandez |
| 2008/0244049 A1 | 10/2008 | Normark et al. |
| 2008/0271023 A1 | 10/2008 | Bone et al. |
| 2009/0030965 A1 | 1/2009 | Hayes, Jr. |
| 2009/0064341 A1 | 3/2009 | Hartung et al. |
| 2009/0113386 A1 | 4/2009 | Eker et al. |
| 2009/0190757 A1 | 7/2009 | Chen et al. |
| 2009/0204845 A1 | 8/2009 | Herscovitz et al. |
| 2009/0219848 A1 | 9/2009 | Lohmar et al. |
| 2009/0328099 A1 | 12/2009 | Praden et al. |
| 2010/0185727 A1 | 7/2010 | Mittal |
| 2010/0275010 A1 | 10/2010 | Ghirardi |
| 2010/0279733 A1 | 11/2010 | Karsten et al. |
| 2010/0287308 A1 | 11/2010 | Robbin et al. |
| 2011/0022948 A1 | 1/2011 | Brown et al. |
| 2011/0209055 A1 | 8/2011 | Plestid et al. |

FOREIGN PATENT DOCUMENTS

| | | |
|---|---|---|
| CN | 1864429 | 11/2006 |
| CN | 1906574 | 1/2007 |
| CN | 101043372 | 9/2007 |
| CN | 101543016 | 9/2009 |
| CN | 101595469 | 12/2009 |
| CN | 101904105 | 12/2010 |
| DE | 10115729 | 10/2001 |
| DE | 112007002863 | 10/2009 |
| DE | 112008002767 | 10/2010 |
| EP | 0717353 | 6/1996 |
| EP | 0803812 | 10/1997 |
| EP | 0811942 | 12/1997 |
| EP | 1049346 | 11/2000 |
| EP | 1052571 | 11/2000 |
| EP | 1077407 | 2/2001 |
| EP | 1152338 | 11/2001 |
| EP | 1176840 | 1/2002 |
| EP | 1184785 | 3/2002 |
| EP | 1256865 | 11/2002 |
| EP | 1282989 A1 | 2/2003 |
| EP | 1333375 | 6/2003 |
| EP | 1331833 | 7/2003 |
| EP | 1584005 | 7/2004 |
| EP | 1597668 | 8/2004 |
| EP | 1654640 | 12/2004 |
| EP | 1639435 | 1/2005 |
| EP | 1652100 | 1/2005 |
| EP | 1652075 | 2/2005 |
| EP | 1513317 | 3/2005 |
| EP | 1515571 | 3/2005 |
| EP | 1519600 | 3/2005 |
| EP | 1660996 | 3/2005 |
| EP | 1665041 | 4/2005 |
| EP | 1668951 | 6/2005 |
| EP | 1563436 | 8/2005 |
| EP | 1584016 | 10/2005 |
| EP | 1691282 | 8/2006 |
| EP | 1705832 | 9/2006 |
| EP | 1732037 | 12/2006 |
| EP | 2024850 | 2/2009 |
| EP | 2025095 | 2/2009 |
| EP | 2047420 | 4/2009 |
| EP | 2087644 | 8/2009 |
| EP | 2104992 | 9/2009 |
| EP | 1614034 | 1/2012 |
| GB | 2426151 | 11/2006 |
| GB | 2458047 | 9/2009 |
| GB | 2468225 | 9/2010 |

(56) References Cited

FOREIGN PATENT DOCUMENTS

| | | |
|---|---|---|
| JP | 61173360 | 8/1986 |
| JP | 07160490 | 6/1995 |
| JP | 07219780 | 8/1995 |
| JP | 08202626 | 8/1996 |
| JP | 11003223 | 1/1999 |
| JP | 11161479 | 6/1999 |
| JP | 11272454 | 10/1999 |
| JP | 11345127 | 12/1999 |
| JP | 2001233353 | 2/2003 |
| KR | 19990050594 | 11/1999 |
| KR | 20010046714 | 6/2001 |
| KR | 20010076555 | 8/2001 |
| KR | 20010100328 | 11/2001 |
| KR | 20020034228 | 5/2002 |
| KR | 100506785 | 8/2005 |
| KR | 1020050088193 | 9/2005 |
| KR | 1020080008425 | 3/2006 |
| KR | 1020060064660 | 6/2006 |
| KR | 1020060064663 | 6/2006 |
| KR | 1020060089229 | 8/2006 |
| KR | 20090035044 | 4/2009 |
| KR | 100986487 | 10/2010 |
| KR | 101085987 | 11/2011 |
| TW | 090107418 | 1/2003 |
| WO | WO9632679 | 10/1996 |
| WO | WO9838823 | 9/1998 |
| WO | WO9856149 | 12/1998 |
| WO | WO9921382 | 4/1999 |
| WO | WO9957900 | 11/1999 |
| WO | WO0001187 | 1/2000 |
| WO | WO0002358 | 1/2000 |
| WO | WO0022860 | 4/2000 |
| WO | WO0106798 | 1/2001 |
| WO | WO0186985 | 11/2001 |
| WO | WO0223925 | 3/2002 |
| WO | WO0225438 | 3/2002 |
| WO | WO0241147 | 5/2002 |
| WO | WO0310656 | 2/2003 |
| WO | WO03012574 | 2/2003 |
| WO | WO03025742 | 3/2003 |
| WO | WO03034765 | 4/2003 |
| WO | WO03049381 | 6/2003 |
| WO | WO2004031889 | 4/2004 |
| WO | WO2004038546 | 5/2004 |
| WO | WO2004042538 | 5/2004 |
| WO | WO2004049104 | 6/2004 |
| WO | WO2004049115 | 6/2004 |
| WO | WO2004049314 | 6/2004 |
| WO | WO2004059956 | 7/2004 |
| WO | WO2004061551 | 7/2004 |
| WO | WO2004061615 | 7/2004 |
| WO | WO2004063899 | 7/2004 |
| WO | WO2004066091 | 8/2004 |
| WO | WO2004070571 | 8/2004 |
| WO | WO2004072773 | 8/2004 |
| WO | WO2004086196 | 10/2004 |
| WO | WO2004095457 | 11/2004 |
| WO | WO2004109510 | 12/2004 |
| WO | WO2005001665 | 1/2005 |
| WO | WO2005004395 | 1/2005 |
| WO | WO2005008940 | 1/2005 |
| WO | WO2005013123 | 2/2005 |
| WO | WO2005015343 | 2/2005 |
| WO | WO2005024628 | 3/2005 |
| WO | WO2005031570 | 4/2005 |
| WO | WO2005036916 | 4/2005 |
| WO | WO2005041459 | 5/2005 |
| WO | WO2005079334 | 9/2005 |
| WO | WO2006003254 | 1/2006 |
| WO | WO2007112108 | 10/2007 |
| WO | WO2007117514 | 10/2007 |
| WO | WO2007146710 | 12/2007 |
| WO | WO2008003081 | 1/2008 |
| WO | WO2008008880 | 1/2008 |
| WO | WO2008014454 | 1/2008 |
| WO | WO2008022195 | 2/2008 |
| WO | WO2008022198 | 2/2008 |
| WO | WO2008028072 | 3/2008 |
| WO | WO2008033962 | 3/2008 |
| WO | WO2008045700 | 4/2008 |
| WO | WO2008048905 | 4/2008 |
| WO | WO2008067446 | 6/2008 |
| WO | WO2009051760 | 4/2009 |

OTHER PUBLICATIONS

Douglas B. Terry et al., "Managing Update Conflicts in Bayou, a Weakly Connected Replicated Storage System," Proceedings of the 15th ACM Symposium on Operating Systems Principles, 1995, pp. 172-182, Available at: <dl.acm.org/citation.cfm?id=224070>.

Jonathan P. Munson and Prasun Dewan, "Sync: A Java Framework for Mobile Collaborative Applications," IEEE, Jun. 1997, pp. 59-66, Available at: <ieeexplore.ieee.org/stamp/stamp.jsp? tp=&arnumber=587549>.

Hewlett-Packard Development Company, L.P., Office Action, European Application No. 04754355.8, Date: Jul. 5, 2013, pp. 1-11.

Hewlett-Packard Development Company, L.P., Office Action, European Application No. 04782849.6, Date: Jul. 3, 2013, pp. 1-5.

Teck Chia et al., U.S. Appl. No. 10/943,455, Notice of Allowance, Date Mailed: May 28, 2013, pp. 1-69.

Tim Farnham et al., "IST-Trust: A Perspective on the Reconfiguration of Future Mobile Terminals using Software Download," The 11th IEEE International Symposium on Personal, Indoor and Mobile Radio Communications, 2000, pp. 1054-1059, Available at: <ieeexpiore.ieee.org/stamp/stamp.jsp?tp=&arnumber=881582>.

Communication pursuant to Article 94(3) EPC received in EP Application No. 01991949.7, mailed May 7, 2013, 8 pg.

Final Office Action received in U.S. Appl. No. 10/411,835, mailed May 2, 2013, 165 pg.

Bettini, L., "Software Update via Mobile Agent Based Programming," Proc. ACM SAC, Jan. 1, 2002, pp. 32-36.

Bitfone Corp., CA Office Action Jun. 8, 2007, CA App. No. 2,414,281, 4 p.

Bitfone Corp., CN Office Action Jun. 5, 2009, CN App. No. 200610067641.4, 12 p.

Bitfone Corp., CN Office Action Dec. 20, 2010, CN App. No. 200610067641.4, 3 p.

Bitfone Corp., EP Office Action Mar. 16, 2010, EP App. No. EP04777313.0, 8 p.

Bitfone Corp., EP Search Report Mar. 22, 2012, EP App. No. 06251423.7, 6 p.

Bitfone Corp., EP Office Action Mar. 25, 2010, EP App. No. 04785381.7, 5 p.

Bitfone Corp., EP Office Action May 11, 2012, EP App. No. 04777313.0, 9 p.

Bitfone Corp., EP Search Report Jan. 18, 2008, EP App No. 04759830.5, 5 p.

Bitfone Corp., EP Search Report Mar. 30, 2011, EP App. No. 06251423.7, 7 p.

Bitfone Corp., EP Search Report Jul. 1, 2011, EP App. No. 06251423.7, 11 p.

Bitfone Corp., EP Search Report Jul. 4, 2006, EP App. No. EP06250739.7, 7 p.

Bitfone Corp., EP Search Report Jul. 19, 2006, EP App. No. 06251512.7, 8 p.

Bitfone Corp., EP Search Report Nov. 26, 2009, EP App. No. EP04777313.0, 3 p.

Bitfone Corp., Int'l Prelim Rpt Jan. 9, 2006, PCT App. No. PCT/US2004/022598, 7 p.

Bitfone Corp., Int'l Prelim Rpt Jan. 30, 2006, PCT App. No. PCT/US2004/024876, 8 p.

Bitfone Corp., Int'l Prelim Rpt Mar. 6, 2006, PCT App. No. PCT/US2004/028433, 8 p.

Bitfone Corp., Int'l Prelim Rpt Mar. 13, 2006, PCT App. No. PCT/US2004/021037, 7 p.

Bitfone Corp., Int'l Prelim Rpt Mar. 27, 2006, PCT App. No. PCT/US2004/031547, 9 p.

(56) References Cited

OTHER PUBLICATIONS

Bitfone Corp., Int'l Prelim Rpt Aug. 5, 2005, PCT App No. PCT/US2004/002950, 6 p.
Bitfone Corp., Int'l Prelim Rpt Aug. 12, 2005, PCT App. No. PCT/US2004/002084, 4 p.
Bitfone Corp., Int'l Prelim Rpt Sep. 30, 2008, PCT App. No. PCT/US2007/007489, 4 p.
Bitfone Corp., Int'l Prelim Rpt Oct. 1, 2005, PCT App. No. PCT/US2004/008918, 4 p.
Bitfone Corp., Int'l Prelim Rpt Oct. 28, 2008, PCT App. No. PCT/US2004/000694, 4 p.
Bitfone Corp., Int'l Prelim Rpt Nov. 7, 2006, PCT App. No. PCT/US2005/004520, 4 p.
Bitfone Corp., Int'l Prelim Rpt Dec. 8, 2005, PCT App. No. PCT/US2004/017731, 8 p.
Bitfone Corp., Int'l Prelim Rpt Dec. 10, 2008, PCT App. No. PCT/US2007/070534, 9 p.
Bitfone Corp., Int'l Prelim Rpt, Apr. 3, 2006, PCT App. No. PCT/US2004/033071, 9 p.
Bitfone Corp., Int'l Search Report & Written Opinion Jan. 4, 2005, PCT App. No. PCT/US2004/002084, 8 p.
Bitfone Corp., Int'l Search Report & Written Opinion Jan. 14, 2005, PCT App. No. PCT/US2004/011219, 16 p.
Bitfone Corp., Int'l Search Report & Written Opinion Jul. 14, 2008, PCT App. No. PCT/US2004/001574, 16 p.
Bitfone Corp., Int'l Search Report Jan. 10, 2005, PCT App. No. PCT/US2003/033241, 3 p.
Bitfone Corp., Int'l Search Report Jan. 19, 2005, PCT App. No. PCT/US2004/024876, 2 p.
Bitfone Corp., Int'l Search Report Jan. 25, 2005, PCT App. No. PCT/US2003/037265, 3 p.
Bitfone Corp., Int'l Search Report Jan. 25, 2005, PCT App. No. PCT/US2004/033071, 4 p.
Bitfone Corp., Int'l Search Report Jan. 20, 2006, PCT App. No. PCT/US2004/021037, 3 p.
Bitfone Corp., Int'l Search Report Feb. 10, 2005, PCT App. No. PCT/US2004/031547, 4 p.
Bitfone Corp., Int'l Search Report Mar. 7, 2005, PCT App. No. PCT/US2004/002950, 4 p.
Bitfone Corp., Int'l Search Report Mar. 15, 2005, PCT App. No. PCT/US2004/008918, 3 p.
Bitfone Corp., Int'l Search Report Apr. 22, 2004, PCT App. No. PCT/US2003/027620, 4 p.
Bitfone Corp., Int'l Search Report Apr. 23, 2008, PCT App. No. PCT/US2007/007489, 3 p.
Bitfone Corp., Int'l Search Report May 25, 2005, PCT App. No. PCT/US2004/028433, 7 p.
Bitfone Corp., Int'l Search Report Jun. 22, 2005, PCT App. No. PCT/US2003/041555, 3 p.
Bitfone Corp., Int'l Search Report Jul. 20, 2005, PCT App. No. PCT/US2004/022598, 3 p.
Bitfone Corp., Int'l Search Report Jul. 27, 2005, PCT App No. PCT/US2003/035934, 3 p.
Bitfone Corp., Int'l Search Report Aug. 23, 2005, PCT App. No. PCT/US2004/017731, 6 p.
Bitfone Corp., Int'l Search Report Oct. 3, 2006, PCT App. No. PCT/US2005/004520, 3 p.
Bitfone Corp., Int'l Search Report Oct. 03, 2008, PCT App. No. PCT/US2004/000694, 3 p.
Bitfone Corp., Int'l Search Report Oct. 14, 2004, PCT App. No. PCT/US2003/035377, 4 p.
Bitfone Corp., Int'l Search Report Dec. 3, 2004, PCT App. No. PCT/US2003/036995, 4 p.
Bitfone Corp., Int'l Search Report, Jul. 20, 2006, PCT App. No. PCT/US2003/027727, 8 p.
Bitfone Corp., JP Final Office Action Jun. 5, 2006, Jap. App. No. 2002-543291, 10 p.
Bitfone Corp., JP Office Action Nov. 8, 2005, JP App. No. 2002-543291, 13 p.
Bitfone Corp., KR Office Action Feb. 15, 2011, KR App. No. KR-10-2006-7006350, 4 p.
Bitfone Corp., KR Office Action Apr. 10, 2008, KR App. No. KR10-2006-7004343, 7 p.
Bitfone Corp., KR Office Action May 21, 2008, KR App. No. KR10-2006-7004488, 8 p.
Bitfone Corp., KR Office Action Aug. 21, 2007, KR App. No. KR10-2006-7004343, 5 p.
Bitfone Corp., KR Office Action Aug. 21, 2007, KR App. No. KR10-2006-7004488, 5 p.
Bitfone Corp., Written Opinion Jan. 19, 2005, PCT App. No. PCT/US2004/017731, 7 p.
Bitfone Corp., Written Opinion Jan. 30, 2006, PCT App. No. PCT/US2004/021037, 6 p.
Bitfone Corp., Written Opinion Mar. 25, 2006, PCT App. No. PCT/US2004/031547, 8 p.
Bitfone Corp., Written Opinion Jul. 20, 2005, PCT App. No. PCT/US2004/022598, 6 p.
Bitfone Corp., Written Opinion Dec. 4, 2005, PCT App. No. PCT/US2004/017731, 7 p.
Burns et al., "In-Place Reconstruction of Version Differences," IEEE Transactions on Knowledge and Data Engineering, Vo. 15. No. 4, Jul./Aug. 2003, pp. 973-984.
Ciancarini et al., "Using a Coordination Language to Specify and Analyze Systems Containing Modile Components," ACM Transactions, vol. 9. No. 2, Apr. 2000, pp. 167-198.
Claise et al., "IPFIX Protocol Specification", IPFIX Working Group, Jun. 2003, retrieved from: http://tools.ietf.org/html/draft-ietf-ipfix-protocol-00.
CRC Press LLC., "Overview of Cryptography," Copyright 1997 CRC Press LLC, 48 p.
Fasbender et al., "Any Network, Any Terminal, Anywhere," IEEE Personal Communications, Apr. 1999, pp. 22-30, IEEE Press. 1999.
Hadjiefthymiades et al., "ESW4: Enhanced Scheme for WWW Computing in Wireless Communication Environments," ACM SIGCOMM Computer Communication Review, vol. 29, Issue 5, pp. 24-35, ACM Press, Oct. 1999.
Hoffmeyer et al., "Radio Software Download for Commercial Wireless Reconfigurable Devices," IEEE Communications Magazine, IEEE Service Center, New York NY, US. vol. 42, No. 3, Mar. 2004, pp. S26-S32.
HPC, Int'l Search Report Sep. 5, 2007, PCT App. No. PCT/US2007/008415, 3 p.
HPDC, CN Office Action Sep. 22, 2011, CN App. No. 200780044370.3, 9 p.
HPDC, EP Office Action Jan. 22, 2010, EP App. No. 04701739.7, 7 p.
HPDC, EP Office Action Feb. 4, 2011, EP App. No. 07843502.1, 4 p.
HPDC, EP Office Action Feb. 9, 2011, EP App. No. 04759830,5, 3 p.
HPDC, EP Office Action Mar. 4, 2011, EP App. No. 07813468.1, 9 p.
HPDC, EP Office Action Mar. 23, 2010, EP App. No. 04705590.0, 10 p.
HPDC, EP Office Action Apr. 3, 2009, EP App. No. 04779823.6, 7 p.
HPDC, EP Office Action Apr. 11, 2008, EP App. No. 04759830.5, 5 p.
HPDC, EP Office Action Apr. 23, 2009, EP App. No. 04701739.7, 7 p.
HPDC, EP Office Action May 4, 2011, EP App. No. 04759830.5, 3 p.
HPDC, EP Office Action May 11, 2010, EP App. No. 03759224.3, 6 p.
HPDC, EP Office Action Jun. 3, 2009, EP App. No. 01991949.7, 7p.
HPDC, EP Office Action Jun. 30, 2009, EP App. No. 07798184.3, 5 p.
HPDC, EP Office Action Jul. 27, 2011, EP App. No. 07844241.5, 6 p.
HPDC, EP Office Action Aug. 12, 2011, EP App. No. 04759830.5. 56 p.
HPDC, EP Office Action Aug. 30, 2011, EP App. No. 04779823.6, 6 p.
HPDC, EP Office Action Sep. 2, 2010, EP App. No. 04759830.5, 4 p.
HPDC, EP Office Action Sep. 7, 2009, EP App. No. 07844241.5, 3 p.
HPDC, EP Office Action Sep. 18, 2009, EP App. No. 07843502.1, 2 p.
HPDC. EP Office Action Oct. 15, 2009, EP App. No. 04785067.2, 6 p.

(56) References Cited

OTHER PUBLICATIONS

HPDC, EP Office Action Oct. 27, 2009, EP App. No. 04782849.6, 3 p.
HPDC, EP Office Action Nov. 10, 2009, EP App. No. 07798184.3, 4 p.
HPDC, EP Supp. Search Report Feb. 6, 2009, EP App. No. 04701739, 3 p.
HPDC, EP Search Report Feb. 23, 2010, EP App. No. 03789910.1, 5 p.
HPDC, EP Search Report Mar. 6, 2009, EP App. No. 01991949.7, 7 p.
HPDC, EP Search Report Jun. 3, 2009, EP App. No. 01991949.7, 7 p.
HPDc, EP Search Report Aug. 9, 2010, EP App. No. 03789910.1, 6 p.
HPDC, EP Search Report Oct. 19, 2009, EP App. No. 07813468.1, 10 p.
HPDC, EP Search Report Nov. 13, 2009, EP App. No. 04756990.0, 4 p.
HPDC, EP Search Report Nov. 24, 2008, EP App. No. 04779823.6, 3 p.
HPDC, EP Search Report Nov. 25, 2009, EP App. No. 04705590.0, 6 p.
HPDC, EP Supp. Search Report Feb. 6, 2009, EP App. No. 004701739.7, 3 p.
HPDC, EP Supp. Search Report Jan. 26, 2010, EP App. No. 03759224.3, 3 p.
HPDC, EP Supp. Search Report Dec. 22, 2009, EP App. No. 03789910.1, 7 p.
HPDC, GB Office Action Feb. 25, 2011, GB App. No. 0910190.8, 6 p.
HPDC, GB Office Action Jul. 25, 2011, GB App. No. 0910190.8, 1 p.
HPDC, GB Office Action Sep. 20, 2011, GB App. No. 1007372.4, 3 p.
HPDC, GB Office Action Dec. 22, 2011, GB App. No. 1007372.4, 2 p.
HPDC, Int'l Prelim Rpt Jan. 6, 2009, PCT App. No. PCT/US2007/072493, 8 p.
HPDC, Int'l Prelim Rpt Jan. 13, 2009, PCT App. No. PCT/US2007/073340, 8 p.
HPDC, Int'l Prelim Rpt Jan. 27, 2009, PCT App. No. PCT/US2007/074586, 5 p.
HPDC, Int'l Prelim Rpt Feb. 17, 2009, PCT App. No. PCT/US2007/076001, 7 p.
HPDC, Int'l Prelim Rpt Feb. 17, 2009, PCT App. No. PCT/US2007/076006, 7 p.
HPDC, Int'l Prelim Rpt Mar. 3, 2009, PCT App. No. PCT/US2007/077288, 7 p.
HPDC, Int'l Prelim Rpt Mar. 17, 2009, PCT App. No. PCT/US2007/078326, 7 p.
HPDC, Int'l Prelim Rpt Apr. 7, 2009, PCT App. No. PCT/US2007/079920, 8 p.
HPDC, Int'l Prelim Rpt Apr. 20, 2010, PCT App. No. PCT/US2008/011824, 5 p.
HPDC, Int'l Prelim Rpt Apr. 22, 2009, PCT App. No. PCT/US2007/081273, 8 p.
HPDC, Int'l Prelim Rpt Jun. 3, 2009, PCT App. No. PCT/US2007/085903, 6 p.
HPDC, Int'l Prelim Rpt Sep. 30, 2008, PCT App. No. PCT/US2007/008415, 7 p.
HPDC, Int'l Search Report Jan. 3, 2008, PCT App. No. US2007/073340, 5 p.
HPDC, Int'l Search Report Jan. 31, 2008, PCT App. No. PCT/US2007/076001, 4 p.
HPDC, Int'l Search Report Feb. 14, 2008, PCT App. No. PCT/US2007/072493, 5 p.
HPDC, Int'l Search Report Mar. 5, 2008, PCT App. No. PCT/US2007/078326, 5 p.
HPDC, Int'l Search Report Mar. 25, 2009, PCT App. No. PCT/US2008/011824, 3p.
HPDC, Int'l Search Report Mar. 27, 2008, PCT App. No. PCT/US2007/079920, 4 p.
HPDC, Int'l Search Report Apr. 10, 2004, PCT App No. PCT/US2007/070534, 7 p.
HPDC, Int'l Search Report Jun. 26, 2008, PCT App. No. PCT/US2007/076006, 5 p.
HPDC, Int'l Search Report Jul. 18, 2008, PCT App. No. PCT/US2007/077288, 5 p.
HPDC, Int'l Search Report Aug. 13, 2008, PCT App. No. PCT/US2007/085903, 3 p.
HPDC, Int'l Search Report Sep. 2, 2008, PCT App. No. PCT/US2007/081273, 5 p.
HPDC, Int'l Search Report Oct. 24, 2008, PCT App. No. PCT/US2007/074586, 3 p.
HPDC, JP Office Action Nov. 8, 2005, JP App. No. 2002-543291, 13 p.
HPDC, KR Office Action May 5, 2010, KR App. No. 10-2009-7005363, 3 p.
HPDC, KR Office Action Nov. 11, 2009, KR App. No. 10-2009-7005363, 2 p.
HPDC, Written Opinion Apr. 17, 2010, PCT App. No. PCT/US2008/011824, 4 p.
IBM, "System Firmware Update Method Before Rebooting the Operating System," Research Disclosure, Mason Publications, vol. 425, No. 86, Sep. 1, 1999, 2 p.
Jing et al., "Client Server Computing in Mobile Environments," ACM Computing Surveys, vol. 31, No. 2, Jun. 1999, pp. 117-157.
Jones, F., "Jambala-Intelligence beyond digital wireless," Ericsson Review No. 3, 1998, pp. 126-131.
Klein et al., "Compressed Delta Encoding for LZSS Encoded Files," 2007 Data Compression Conference (DCC'07) IEEE Computer Society, 10 p.
Koenig et al., "Re: ext2—available+used not equal to total," Dec. 31, 1998, accessed on Oct. 9, 2007 from <http://www.uwsg.iu.edu/hypermail/linux/kernel/9901.0/0270.html>, Linux Kernel Archive, 2 p.
Lindholm et al., "Fast and Simple XML Tree Dfferencing by Sequence Alignment," DocEng '06, Oct. 10-13, 2006, Amsterdam, The Netherlands, Copyright 2006 ACM, pp. 75-84.
Memorymanagement.Org, http://web.archive.org/web/20020313115607/http://www.memorymanagement.org/glossary, 3 p. 2003.
Meng et al., "Schema-Guided Wrapper Maintenance for Web-Data Extraction," WIDM'03, Nov. 7-8, 2003, pp. 1-8.
Meyers, W. J., "Design of a Microcode Link Editor," Proceedings of the 13th Annual Workshop on Microprogramming, pp. 165-170, 1980.
Microsoft, "Computer Dictionary," Microsoft Press, 2002, pp. 372, 373, 380, 423 and 565.
Oommen, P., "A Framework for Integrated Management of Mobile-Stations Over-the-Air," Integrated Network Management Proceedings, 2001 IEEE/IFIP International Symposium on May 14-18, 2001, pp. 247-256.
Oommen, P., "Over the Air Handset Management," Emerging Technologies Symposium; Broadband, Wireless Internet Access, 2000 IEEE Apr. 10-11, 2000, 4 p.
Open Mobile Alliance, "Device Management Protocol, Candidate," Ver 1.2, Jun. 2, 2006 (in 3-parts).
Open Mobile Alliance, "Generic Content Download Over the Air Specification," Version 1.0, Sep. 12, 2002, 42 p.
Pant et al., Software Reliability Predictions for Distributed Software, IEEE, 1998, pp. 11-21.
Park et al., "A Low-cost Memory Architecture with NAND XIP for Mobile Embedded Systems," CODES+ISSS'03, Oct. 1-3, 2003, pp. 138-143.
Pedram, M., "Power Optimization and Management in Embedded Systems," Jan. 2001, pp. 239-244.
Peymandoust et al., "Low Power Embedded Software Optimization Using Symbolic Algebra," Mar. 2002, pp. 1-7.
Raskar et al., "Image Fusion for Context Enhancement and Video Surrealism," Proceedings of the Third Int'l. Symposium on Non-Photorealistic Animation and Rendering (NPAR2004), Jun. 7-9, 2004, 9 p.

(56) References Cited

OTHER PUBLICATIONS

Satoh et al., Experiment of Component-Based Software Development on Multiple Distributed Object Environments, IEEE, 1998, 8 p.
Sevanto et al., "Introducing Quality-of-Service and Traffic Classes into Wireless Mobile Networks," WOWMOM 98 Dallas, Texas, USA, Copyright ACM 1998 pp. 21-30.
Symborski, C. W., "Updating Softwaare and Configuration Data in a Distributed Communications Nev.'Vork". 1988 Computer NetworKing Symposium, 8 p.
Varshney et al., "Emerging Mobile and Wireless Networks," Communications of the ACM Jun. 2000, vol. 43, No. 6, pp. 73-81.
W3C, XML Signature Syntax and Processing, (2nd edition), Jun. 10, 2008, 1 p., [Online] http://www.w3.org/TR/xmldsig-core/.
White, Ron, "How Computers Work," Millennium Ed., Que Corporation, Indianapolis, IN, 1999, 284 p.
Yergeau, F., "UTF-8, a transformation format of ISO 10646," Jan. 1998, Alis Technologies, 10 p.
Yoshimura et al., "Mobile Streaming Media CDN Enabled by Dynamic SMIL," WWW2003, May 7-11, 2002, Honolulu, Hawaii, ACM, pp. 651-661.
Wheatley, Office Action Dec. 27, 2011, U.S. Appl. No. 12/057,044, filed Mar. 27, 2008, 6 p.
Rao, Office Action Nov. 14, 2008, U.S. Appl. No. 11/057,361, filed Feb. 14, 2005, 8 p.
Insun, Office Action Feb. 3, 2010, U.S. Appl. No. 11/111,276, filed Apr. 21, 2005, 10 p.
Insun, Office Action Jul. 12, 2010, U.S. Appl. No. 11/111,276, filed Apr. 21, 2005, 11 p.
Iyad, Office Action Jan. 28, 2008, U.S. Appl. No. 11/100,305, filed Apr. 6, 2005, 20 p.
Iyad, Final Office Action Jul. 22, 2008, U.S. Appl. No. 11/100,305, filed Apr. 6, 2005, 11 p.
Iyad, Office Action Jan. 21, 2009, U.S. Appl. No. 11/100,305, filed Apr. 6, 2005, 7 p.
Iyad, Final Office Action Jul. 8, 2009, U.S. Appl. No. 11/100,305, filed Apr. 6, 2005, 25 p.
Shao-Chun, Office Action Dec. 11,2008, U.S. Appl. No. 11/120,556, filed May 3, 2005, 28 p.
Shao-Chun, Final Office Action May 25, 2009, U.S. Appl. No. 11/120,556, filed May 3, 2005, 30 p.
Shao-Chun, Office Action Oct. 28, 2009, U.S. Appl. No. 11/120,556, filed May 3, 2005, 31 p.
Shao-Chun, Final Office Action May 13, 2010, U.S. Appl. No. 11/120,556, filed May 3, 2005 32 p.
Shao-Chun, Office Action Nov. 29, 2010, U.S. Appl. No. 11/120,556, filed May 3, 2005, 26 p.
Shao-Chun, Office Action Oct. 29, 2008, U.S. Appl. No. 11/124,866, filed May 9, 2005, 13 p.
Shao-Chun, Office Action May 5, 2009, U.S. Appl. No. 11/124,866, filed May 9, 2005, 14 p.
Shao-Chun, Office Action Nov. 12, 2008, U.S. Appl. No. 11/144,537, filed Jun. 3, 2005, 16 p.
Shao-Chun, Final Office Action Apr. 29, 2009, U.S. Appl. No. 11/144,537, filed Jun. 3, 2005, 22 p.
Sunil, Office Action Aug. 20, 2008, U.S. Appl. No. 11/189,344, filed Jul. 26, 2005, 12 p.
Sunil, Final Office Action Feb. 19, 2009, U.S. Appl. No. 11/189,344, filed Jul. 26, 2005, 13 p.
Sunil, Office Action Aug. 19. 2009, U.S. Appl. No. 11/189,344, filed Jul. 25, 2005, 10 p.
Sunil, Office Action Sep. 4, 2008, U.S. Appl. No. 11/226,032, filed Sep. 14, 2005, 17 p.
Sunil, Final Office Action Jul. 6, 2009, U.S. Appl. No. 11/226,032, filed Sep. 14, 2005, 17 p.
Sunil, Office Action Dec. 14, 2009, U.S. Appl. No. 11/226,032, filed Sep. 14, 2005, 23 p.
Sunil, Final Office Action Apr. 29, 2010, U.S. Appl. No. 11/226,032, filed Sep. 9, 2005, 16 p.
Rao, Office Action Aug. 21, 2009, U.S. Appl. No. 11/247,463, filed Oct. 11, 2005, 18 p.
Rao, Final Office Action Jul. 13, 2010, U.S. Appl. No. 11/247,463, filed Oct. 11, 2005, 19 p.
Rao, Office Action Mar. 8, 2011, U.S. Appl. No. 11/247,463, filed Oct. 11, 2005, 20 p.
Rao, Final Office Action Aug. 30, 2011, U.S. Appl. No. 11/247,463, filed Oct. 11, 2005, 20 p.
Shao-Chun, Office Action Jul. 8, 2009, U.S. Appl. No. 11/316,291, filed Dec. 21, 2005, 18 p.
Shao-Chun, Final Office Action Dec. 2, 2009, U.S. Appl. No. 11/316,291, filed Dec. 21, 2005, 18 p.
Giovanni, Office Action Jul. 8, 2009, U.S. Appl. No. 11/316,292, filed Dec. 12, 2005, 8 p.
Giovanni, Office Action Jan. 25, 2010, U.S. Appl. No. 11/316,292, filed Dec. 21, 2005, 7 p.
Shao-Chun, Office Action May 27, 2009, U.S. Appl. No. 11/352,813, filed Feb. 13, 2006, 31 p.
Sunil, Office Action Jun. 10, 2008, U.S. Appl. No. 11/352,702, filed Feb. 13, 2006, 8 p.
Sunil, Final Office Action Mar. 30, 2009, U.S. Appl. No. 11/352,702, filed Feb. 13, 2006, 11 p.
Sunil, Office Action Sep. 28, 2009, U.S. Appl. No. 11/352,702, filed Feb. 13, 2006, 9 p.
Sunil, Final Office Action Mar. 16, 2010, U.S. Appl. No. 11/352,702, filed Feb. 13, 2006, 11 p.
Rao, Office Action Feb. 17, 2009, U.S. Appl. No. 11/374,481, filed Mar. 9, 2006, 17 p.
Rao, Final Office Action Jul. 21, 2009, U.S. Appl. No. 11/374,481, filed Mar. 9, 2006, 18 p.
Rao, Office Action Jan. 4, 2010, U.S. Appl. No. 11/374,481, filed Mar. 9, 2006, 10 p.
Jason, Office Action Oct. 16, 2008, U.S. Appl. No. 11/369,561, filed Mar. 7, 2006, 13 p.
Jason, Final Office Action May 8, 2009, U.S. Appl. No. 11/369,561, filed Mar. 7, 2006, 14 p.
Rao, Office Action Mar. 12, 2009, U.S. Appl. No. 11/385,162, filed Mar. 21, 2006, 6 p.
Rao, Office Action Sep. 25, 2009, U.S. Appl. No. 11/385,162, filed Mar. 21, 2006, 8 p.
Rao, Final Office Action May 4, 2010, U.S. Appl. No. 11/385,162, filed Mar. 21, 2006, 8 p.
Sunil, Office Action Nov. 13, 2008, U.S. Appl. No. 11/189,944, filed Jul. 26, 2005, 19 p.
Sunil, Final Office Action Apr. 27, 2009, U.S. Appl. No. 11/189,944, filed Jul. 26, 2005, 21 p.
Glenn, Office Action May 29, 2009, U.S. Appl. No. 11/478,108, filed Jun. 28, 2006, 19 p.
Glenn, Office Action Dec. 18, 2009, U.S. Appl. No. 11/478,108, filed Jun. 28, 2006, 17 p.
Glenn, Final Office Action Apr. 27, 2010, U.S. Appl. No. 11/478,108, filed Jun. 28, 2006, 17 p.
Glenn, Office Action Sep. 2, 2010, U.S. Appl. No. 11/478,108, filed Jun. 28, 2006, 21 p.
Glenn, Office Action Dec. 29, 2010, U.S. Appl. No. 11/478,108, filed Jun. 28, 2006, 16 p.
Rao, Office Action Apr. 6, 2010, U.S. Appl. No. 11/397,187, filed Apr. 4, 2006, 12 p.
Giovanni, Office Action May 26, 2010, U.S. Appl. No. 11/500,754, filed Aug. 7, 2006, 12 p.
Giovanni, Final Office Action Sep. 2, 2010, U.S. Appl. No. 11/500,754, filed Aug. 7, 2006, 17 p.
Uma, Office Action Oct. 6, 2009, U.S. Appl. No. 11/707,505, filed Feb. 16, 2007, 16 p.
Uma, Final Office Action Mar. 8, 2010, U.S. Appl. No. 11/707,505, filed Feb. 16, 2007 17 p.
Uma, Office Action Dec. 10, 2010, U.S. Appl. No. 11/707,505, filed Feb. 16, 2007 12 p.
Sunil, Office Action Oct. 7, 2010, U.S. Appl. No. 11/824,344, filed Jun. 29, 2007, 7 p.
Marko, Office Action Apr. 6, 2009, U.S. Appl. No. 11/732,267, filed Apr. 2, 2007, 23 p.
Marko, Final Office Action Oct. 19, 2009, U.S. Appl. No. 11/732,267, filed Apr. 2, 2007, 10 p.

(56) References Cited

OTHER PUBLICATIONS

Rao, Office Action Oct. 19, 2009, U.S. Appl. No. 11/799,586, filed May 5, 2007, 18 p.
Rao, Final Office Action Mar. 8, 2010, U.S. Appl. No. 11/799,586, filed May 2, 2007, 18 p.
Rao, Office Action Aug. 18, 2010, U.S. Appl. No. 11/799,586, filed May 2, 2007, 19 p.
Rao, Office Action Mar. 21, 2008, U.S. Appl. No. 11/728,517, filed Mar. 26,2007, 17 p.
Rao, Office Action Oct. 20, 2008, U.S. Appl. No. 11/728,517, filed Mar. 26, 2007, 21 p.
Rao, Office Action Apr. 13, 2009, U.S. Appl. No. 11/728,517, filed Mar. 26, 2007, 23 p.
Rao, Office Action Dec. 3, 2009, U.S. Appl. No. 11/728,517, filed Mar. 26, 2007, 19 p.
Rao, Final Office Action Jun. 24, 1970, U.S. Appl. No. 11/728,517, filed Mar. 26, 2007, 25 p.
Marolia, Office Action Jul. 28, 2009, U.S. Appl. No. 11/827,583, filed Jul. 12, 2007, 18 p.
Rao, Office Action Jun. 16, 2009, U.S. Appl. No. 11/839,143, filed Aug. 15, 2007, 11 p.
Rao, Final Office Action Jan. 8, 2010, U.S. Appl. No. 11/839,143, filed Aug. 15, 2007, 15 p.
Rao, Office Action Aug. 4, 2010, U.S. Appl. No. 11/839,143, filed Aug. 15, 2007, 16 p.
Rao, Final Office Action Oct. 5, 2011, U.S. Appl. No. 11/839,143, filed Aug. 15, 2007, 20 p.
Rao, Office Action May 13, 2011, U.S. Appl. No. 11/839,143, filed Aug. 15, 2007, 17 p.
Rao, Final Office Action Aug. 23, 2011, U.S. Appl. No. 11/839,143, filed Aug. 15, 2007, 17 p.
Rao, Office Action Sep. 17, 2009, U.S. Appl. No. 11/847,658, filed Aug. 30, 2007, 10 p.
Rao, Office Action Mar. 25, 2010, U.S. Appl. No. 11/847,658, filed Aug. 30, 2007, 11 p.
Rao, Office Action Aug. 25, 2010, U.S. Appl. No. 11/847,658, filed Aug. 30, 2007, 13 p.
Rao, Office Action Nov. 18, 2010, U.S. Appl. No. 11/847,658, filed Aug. 30, 2007, 11 p.
Rao, Office Action Aug. 24, 2010, U.S. Appl. No. 11/854,414, filed Sep. 12, 2007, 14 p.
Rao, Office Action Nov. 17, 2009, U.S. Appl. No. 11/947,322, filed Nov. 29, 2007, 15 p.
Rao, Final Office Action May 14, 2010, U.S. Appl. No. 11/947,322, filed Nov. 29, 2007, 22 p.
Rao, Office Action Dec. 27, 2010, U.S. Appl. No. 11/947,322, filed Nov. 29, 2007, 43 p.
Rao, Final Office Action May 26, 2011, U.S. Appl. No. 11/947,322, filed Nov. 29, 2007, 40 p.
Rao, Office Action Jan. 9, 2012, U.S. Appl. No. 11/947,322, filed Nov. 29, 2007, 40 p.
Brunet, Office Action Jan. 25, 2006, U.S. Appl. No. 10/822,092, filed Apr. 9, 2004, 14 p.
Brunet, Final Office Action Aug. 23, 2006, U.S. Appl. No. 10/822,092, filed Apr. 9, 2004, 13 p.
Brunet, Office Action Feb. 22, 2007, U.S. Appl. No. 10/822,092, filed Apr. 9, 2004, 19 p.
Brunet, Final Office Action Nov. 15, 2007, U.S. Appl. No. 10/822,092, filed Apr. 9, 2004, 22 p.
Brunet, Office Action Apr. 4, 2008, U.S. Appl. No. 10/822,092, filed Apr. 9, 2004, 27 p.
Brunet, Final Office Action Sep. 23, 2008, U.S. Appl. No. 10/822,092, filed Apr. 9, 2004, 28 p.
Brunet, Office Action Mar. 8, 2007, U.S. Appl. No. 10/889,693, filed Jul. 12, 2004, 17 p.
Brunet, Final Office Action Nov. 28, 2007, U.S. Appl. No. 10/889,693, filed Jul. 12, 2004, 19 p.
Brunet, Office Action Jun. 25, 2008, U.S. Appl. No. 10/889,693, filed Jul. 12, 2004, 69 p.
Brunet, Final Office Action Dec. 23, 2008, U.S. Appl. No. 10/889,693, filed Jul. 12, 2004, 23 p.
Brunet, Office Action Jun. 29, 2006, U.S. Appl. No. 10/999,606, filed Nov. 29, 2004, 9 p.
Brunet, Final Office Action Mar. 7, 2007, U.S. Appl. 10/999,606, filed Nov. 29, 2004, 10 p.
Brunet, Office Action Apr. 18, 2008, U.S. Appl. No. 10/999,606, filed Nov. 29, 2004, 6 p.
Brunet, Office Action Apr. 24, 2009, U.S. Appl. No. 10/999,606, filed Nov. 29, 2004, 12 p.
Brunet, Final Office Action Aug. 20, 2009, U.S. Appl. No. 10/999,606, filed Nov. 29, 2004, 16 p.
Brunet, Office Action Nov. 10, 2009, U.S. Appl. No. 10/999,606, filed Nov. 29, 2004, 16 p.
Brunet, Final Office Action Feb. 18, 2010, U.S. Appl. No. 10/999,606, filed Nov. 29, 2004, 16 p.
Shao-Chun, Office Action Jun. 6, 2007, U.S. Appl. No. 11/125,974, filed May 9, 2005, 9 p.
Shao-Chun, Office Action Jan. 17, 2008, U.S. Appl. No. 11/125,974, filed May 9, 2005, 9 p.
Shao-Chun, Final Office Action Aug. 18, 2008, U.S. Appl. No. 11/125,974, filed May 9, 2005, 13 p.
Jeffrey, Office Action Jul. 26, 2006, U.S. Appl. No. 11/247,459, filed Oct. 11, 2005, 9 p.
Jeffrey, Office Action May 15, 2007, U.S. Appl. No. 11/247,459, filed Oct. 11, 2005, 10 p.
Jeffrey, Office Action Oct. 31, 2007, U.S. Appl. No. 11/247,459, filed Oct. 11, 2005, 26 p.
O'Neill, Office Action Aug. 25, 2006, U.S. Appl. No. 10/311,462, filed May 13, 2003, 24 p.
O'Neill, Office Action Mar. 5, 2010, U.S. Appl. No. 10/311,462, filed May 13, 2003, 23 p.
O'Neill, Final Office Action Jul. 23, 2010, U.S. Appl. No. 10/311,462, filed May 13, 2003, 24 p.
O'Neill, Office Action Nov. 18, 2009, U.S. Appl. No. 11/335,312, filed Jan. 19, 2006, 12 p.
O'Neill, Office Action Mar. 12, 2004, U.S. Appl. No. 10/404,601, filed Apr. 1, 2003, 28 p.
Shao-Chun, Final Office Action Jul. 25, 2006, U.S. Appl. No. 10/411,784, filed Apr. 11, 2003, 22 p.
Shao-Chun, Office Action Mar. 27, 2007, U.S. Appl. No. 10/411,784, filed Apr. 11, 2003, 16 p.
Shao-Chun, Final Office Action Oct. 18, 2007, U.S. Appl. No. 10/411,784, filed Apr. 11, 2003, 15 p.
Rao, Examiner's Answer Dec. 6, 2011, U.S. Appl. No. 11/427,635, filed Jan. 24, 2005, 19 p.
Rao, Final Office Action Jun. 10, 2011, U.S. Appl. No. 11/427,635, filed Jan. 24, 2005, 18 p.
Rao, Office Action Dec. 27, 2010, U.S. Appl. No. 11/427,635, filed Jan. 24, 2005, 13 p.
Rao, Office Action Mar. 31, 2010, U.S. Appl. No. 11/427,635, filed Jan. 24, 2005, 14 p.
Rao, Office Action Oct. 15, 2009, U.S. Appl. No. 11/427,635, filed Jan. 24, 2005, 11 p.
Rao, Final Office Action Apr. 30, 2009, U.S. Appl. No. 11/427,635, filed Jan. 24, 2005, 13 p.
Rao, Office Action Nov. 26, 2008, U.S. Appl. No. 11/427,635, filed Jan. 24, 2005, 15 p.
Rao, Examiner's Answer Mar. 16, 2011, U.S. Appl. No. 11/043,813, filed Jan. 26, 2005, 16 p.
Rao, Final Office Action Aug. 20, 2010, U.S. Appl. No. 11/043,813, filed Jan. 26, 2005, 16 p.
Rao, Office Action Mar. 9, 2010, U.S. Appl. No. 11/043,813, filed Jan. 26, 2005, 14 p.
Rao, Final Office Action Nov. 13, 2009, U.S. Appl. No. 11/043,813, filed Jan. 26, 2005, 15 p.
Rao, Office Action Mar. 30, 2009, U.S. Appl. No. 11/043,813, filed Jan. 26, 2005, 11 p.
Rao, Office Action Oct. 3, 2008, U.S. Appl. No. 11/043,813, filed Jan. 26, 2005, 23 p.
Chen, Examiner's Answer Aug. 16, 2012, U.S. Appl. No. 11/099,870, filed Apr. 6, 2005, 12 p.

(56) References Cited

OTHER PUBLICATIONS

Chen, Final Office Action Dec. 23, 2011, U.S. Appl. No. 11/099,870, filed Apr. 6, 2005, 12 p.
Chen, Office Action Jul. 6, 2011, U.S. Appl. No. 11/099,870, filed Apr. 6, 2005, 13 p.
Chen, Final Office Action Nov. 26, 2010, U.S. Appl. No. 11/099,870, filed Apr. 6, 2005, 9 p.
Chen, Office Action Jun. 24, 2010, U.S. Appl. No. 11/099,870, filed Apr. 6, 2005, 7 p.
Chen, Office Action Nov. 30, 2009, U.S. Appl. No. 11/099,870, filed Apr. 6, 2005, 8 p.
Chen, Final Office Action Apr. 14, 2009, U.S. Appl. No. 11/099,870, filed Apr. 6, 2005, 19 p.
Chen, Office Action Sep. 24, 2008, U.S. Appl. No. 11/099,870, filed Apr. 6, 2005, 7 p.
Chen, Office Action Apr. 25, 2008, U.S. Appl. No. 11/099,870, filed Apr. 6, 2005, 5 p.
Chen, Final Office Action Oct. 11, 2007, U.S. Appl. No. 11/099,870, filed Apr. 6, 2005, 16 p.
Chen, Office Action Aug. 24, 2006, U.S. Appl. No. 11/099,870, filed Apr. 6, 2005, 15 p.
Zhu, Examiner's Answer Aug. 16, 2012, U.S. Appl. No. 11/386,560, filed Mar. 22, 2006, 9 p.
Zhu, Final Office Action Feb. 16, 2012, U.S. Appl. No. 11/386,560, filed Mar. 22, 2006, 23 p.
Zhu, Office Action Sep. 30, 2011, U.S. Appl. No. 11/386,560, filed Mar. 22, 2006, 19 p.
Zhu, Final Office Action Mar. 3, 2011, U.S. Appl. No. 11/386,560, filed Mar. 22, 2006, 24 p.
Zhu, Office Action Sep. 15, 2010, U.S. Appl. No. 11/386,560, filed Mar. 22, 2006, 21 p.
Zhu, Office Action Mar. 31, 2010, U.S. Appl. No. 11/386,560, filed Mar. 22, 2006, 17 p.
Chen, Decision on Appeal Jun. 29, 2012, U.S. Appl. No. 11/637,550, filed Dec. 12, 2006, 9 p.
Chen, Examiner's Answer Mar. 30, 2009, U.S. Appl. No. 11/637,550, filed Dec. 12, 2006, 18 p.
Chen, Final Office Action May 22, 2008, U.S. Appl. No. 11/637,550, filed Dec. 12, 2006, 18 p.
Chen, Office Action Oct. 5, 2007, U.S. Appl. No. 11/637,550, filed Dec. 12, 2006, 20 p.
Chen, Final Office Action Jul. 27, 2012, U.S. Appl. No. 12/057,067, filed Mar. 27, 2008, 20 p.
Chen, Office Action Feb. 2, 2012, U.S. Appl. No. 12/057,067, filed Mar. 27, 2008, 18 p.
Chen, Final Office Action Jul. 28, 2011, U.S. Appl. No. 12/057,067, filed Mar. 27, 2008, 17 p.
Chen, Office Action Feb. 16, 2011, U.S. Appl. No. 12/057,067, filed Mar. 27, 2008, 22 p.
O'Neill, Final Office Action Jul. 17, 2012, U.S. Appl. No. 10/411,835, filed Apr. 11, ,2003, 32 p.
O'Neill, Office Action Feb. 10, 2012, U.S. Appl. No. 10/411,835, filed Apr. 11, 2003, 26 p.
O'Neill, Advisory Action Jul. 29, 2011, U.S. Appl. No. 10/411,835, filed Apr. 11, 2003, 3 p.
O'Neill, Advisory Action Jun. 28, 2011, U.S. Appl. No. 10/411,835, filed Apr. 11, 2003, 3 p.
O'Neill, Final Office Action Apr. 11, 2011, U.S. Appl. No. 10/411,835, filed Apr. 11, 2003, 29 p.
O'Neill, Office Action Nov. 8, 2010, U.S. Appl. No. 10/411,835, filed Apr. 11, 2003, 26 p.
O'Neill, Office Action Aug. 26, 2009, U.S. Appl. No. 10/411,835, filed Apr. 11, 2003, 25 p.
Chen, Notice of Allowance Aug. 31, 2012, U.S. Appl. No. 10/412,045, filed Apr. 11, 2003, 10 p.
Chen, Final Office Action Jan. 25, 2012, U.S. Appl. No. 10/412,045, filed Apr. 11, 2003, 18 p.
Chen, Office Action Aug. 3, 2011, U.S. Appl. No. 10/412,045, filed Apr. 11, 2003, 18 p.
Chen, Final Office Action Apr. 19, 2010, U.S. Appl. No. 10/412,045, filed Apr. 11, 2003, 25 p.
Chen, Office Action Aug. 26, 2009, U.S. Appl. No. 10/412,045, filed Apr. 11, 2003, 17 p.
O'Neill, Office Action Jul. 23, 2012, U.S. Appl. No. 12/636,600, filed Dec. 11, 2009, 17 p.
Rao, Examiner's Answer May 26, 2011, U.S. Appl. No. 11/637,435, filed Dec. 12, 2006, 20 p.
Rao, Final Office Action Sep. 15, 2010, U.S. Appl. No. 11/637,435, filed Dec. 12, 2006, 15 p.
Rao, Office Action Sep. 10, 2009, U.S. Appl. No. 11/637,435, filed Dec. 12, 2006, 16 p.
Rao, Final Office Action Mar. 17, 2009, U.S. Appl. No. 11/637,435, filed Dec. 12, 2006, 15 p.
Rao, Office Action Sep. 22, 2008, U.S. Appl. No. 11/637,435, filed Dec. 12, 2006, 14 P.
Rao, Decision on Appeal Jun. 29, 2012, U.S. Appl. No. 10/706,362, filed Nov. 12, 2003, 6 p.
Rao, Examiner Answer Oct. 30, 2009, U.S. Appl. No. 10/706,362, filed Nov. 12, 2003, 24 p.
Rao, Final Office Action Apr. 15, 2009, U.S. Appl. No. 10/706,362, filed Nov. 12, 2003, 20 p.
Rao, Office Action Oct. 1, 2008, U.S. Appl. No. 10/706,362, filed Nov. 12, 2003, 19 p.
Rao, Office Action Jan. 9, 2008, U.S. Appl. No. 10/706,362, filed Nov. 12, 2003, 16 p.
Rao, Office Action Jul. 31, 2007, U.S. Appl. No. 10/706,362, filed Nov. 12, 2003, 17 p.
Rao, Office Action Dec. 5, 2006, U.S. Appl. No. 10/706,362, filed Nov. 12, 2003, 15 p.
McGhee, Decision on Appeal Jun. 6, 2012, U.S. Appl. No. 10/774,027, filed Feb. 6, 2004, 8 p.
McGhee, Examiner's Answer Oct. 30, 2009, U.S. Appl. No. 10/774,027, filed Feb. 6, 2004, 31 p.
McGhee, Final Office Action Apr. 24, 2009, U.S. Appl. No. 10/774,027, filed Feb. 6, 2004, 23 p.
McGhee, Office Action Oct. 15, 2008, U.S. Appl. No. 10/774,027, filed Feb. 6, 2004, 25 p.
McGhee, Office Action Mar. 4, 2008, U.S. Appl. No. 10/774,027, filed Feb. 6, 2004, 26 p.
Yang, Corrected Examiner's Answer Nov. 21, 2011, U.S. Appl. No. 12/030,757, filed Feb. 13, 2008, 2 p.
Yang, Examiner's Answer Nov. 10, 2011, U.S. Appl. No. 12/030,757, filed Feb. 13, 2008, 19 p.
Yang, Advisory Action Sep. 29, 2011, U.S. Appl. No. 12/030,757, filed Feb. 13, 2008, 3 p.
Yang, Final Office Action Jul. 14, 2011, U.S. Appl. No. 12/030,757, filed Feb. 13, 2008, 17 p.
Yang, Office Action Mar. 9, 2011, U.S. Appl. No. 12/030,757, filed Feb. 13, 2008, 33 p.
Rao, Final Office Action Nov. 20, 2012, U.S. Appl. No. 10/909,550, filed Aug. 2, 2004, 20 p.
Rao, Office Action Jun. 19, 2012, U.S. Appl. No. 10/909,550, filed Aug. 2, 2004, 24 p.
Rao, Advisory Action Oct. 8, 2010, U.S. Appl. No. 10/909,550, filed Aug. 2, 2004, 3 p.
Rao, Advisory Action Sep. 1, 2010, U.S. Appl. No. 10/909,550, filed Aug. 2, 2004, 3 p.
Rao, Final Office Action Jun. 3, 2010, U.S. Appl. No. 10/909,550, filed Aug. 2, 2004, 26 p.
Rao, Office Action Nov. 27, 2009, U.S. Appl. No. 10/909,550, filed Aug. 2, 2004, 17 p.
Rao, Office Action Jun. 23, 2009, U.S. Appl. No. 10/909,550, filed Aug. 2, 2004, 7 p.
Rao, Final Office Action Sep. 25, 2008, U.S. Appl. No. 10/909,550, filed Aug. 2, 2004, 19 p.
Rao, Office Action Apr. 23, 2008, U.S. Appl. No. 10/909,550, filed Aug. 2, 2004, 29 p.
Chia, Notice of Allowance May 31, 2012, U.S. Appl. No. 10/943,455, filed Sep. 17, 2004, 11 p.
Chia, Final Office Action Dec. 8, 2011, U.S. Appl. No. 10/943,455, filed Sep. 17, 2004, 23 p.

(56) References Cited

OTHER PUBLICATIONS

Chia, Office Action Jun. 22, 2010, U.S. Appl. No. 10/943,455, filed Sep. 17, 2004, 34 p.
Chia, Office Action Jan. 7, 2010, U.S. Appl. No. 10/943,455, filed Sep. 17, 2004, 21 p.
Chia, Office Action Jun. 11, 2009, U.S. Appl. No. 10/943,455, filed Sep. 17, 2004, 18 p.
Chia, Final Office Action Dec. 24, 2008, U.S. Appl. No. 10/943,455, filed Sep. 17, 2004, 17 p.
Chia, Office Action Mar. 21, 2008, U.S. Appl. No. 10/943,455, filed Sep. 17, 2004, 22 p.
Wang, Examiner's Answer Aug. 19, 2011, U.S. Appl. No. 11/183,199, filed Jul. 15, 2005, 23 p.
Wang, Advisory Action Feb. 23, 2011, U.S. Appl. No. 11/183,199, filed Jul. 15, 2005, 2 p.
Wang, Final Office Action Nov. 1, 2010, U.S. Appl. No. 11/183,199, filed Jul. 15, 2005, 19 p.
Wang, Office Action Apr. 28, 2010, U.S. Appl. No. 11/183,199, filed Jul. 15, 2005, 17 p.
Wang, Final Office Action Aug. 17, 2009, U.S. Appl. No. 11/183,199, filed Jul. 15, 2005, 16 p.
Wang, Office Action Feb. 13, 2009, U.S. Appl. No. 11/183,199, filed Jul. 15, 2005, 16 p.
Wang, Interview Summary Feb. 5, 2009, U.S. Appl. No. 11/183,199, filed Jul. 15, 2005, 2 p.
Wang, Final Office Action Oct. 28, 2008, U.S. Appl. No. 11/183,199, filed Jul. 15, 2005, 19 p.
Wang, Office Action Apr. 17, 2008, U.S. Appl. No. 11/183,199, filed Jul. 15, 2005, 41 p.
Wang, Final Office Action Oct. 9, 2007, U.S. Appl. No. 11/183,199, filed Jul. 15, 2005, 13 p.
Wang, Office Action Jan. 9, 2007, U.S. Appl. No. 11/183,199, filed Jul. 15, 2005, 15 p.
Randall, Examiner's Answer Jun. 9, 2010, U.S. Appl. No. 10/955,021, filed Sep. 30, 2004, 22 p.
Randall, Final Office Action Nov. 6, 2009, U.S. Appl. No. 10/955,021, filed Sep. 30, 2004, 25 p.
Randall, Office Action Apr. 1, 2009, U.S. Appl. No. 10/955,021, filed Sep. 30, 2004, 16 p.
Randall, Office Action Oct. 17, 2008, U.S. Appl. No. 10/955,021, filed Sep. 30, 2004, 16 p.
Randall, Office Action May 1, 2008, U.S. Appl. No. 10/955,021, filed Sep. 30, 2004, 18 p.
Daley, Corrected Examiner's Answer Nov. 1, 2011, U.S. Appl. No. 11/039,000, filed Jan. 18, 2005, 2 p.
Daley, Examiner's Answer Oct. 24, 2011, U.S. Appl. No. 11/039,000, filed Jan. 18, 2005, 20 p.
Daley, Final Office Action Feb. 17, 2011, U.S. Appl. No. 11/039,000, filed Jan. 18, 2005, 15 p.
Daley, Office Action Aug. 30, 2010, U.S. Appl. No. 11/039,000, filed Jan. 18, 2005, 15 p.
Daley, Final Office Action Nov. 27, 2009, U.S. Appl. No. 11/039,000, filed Jan. 18, 2005, 14 p.
Daley, Office Action May 28, 2009, U.S. Appl. No. 11/039,000, filed Jan. 18, 2005, 13 p.
Daley, Final Office Action Dec. 3, 2008, U.S. Appl. No. 11/039,000, filed Jan. 18, 2005, 15 p.
Daley, Office Action Jun. 5, 2008, U.S. Appl. No. 11/039,000, filed Jan. 18, 2005, 25 p.
Kapadekar, Examiner's Answer Mar. 2, 2011, U.S. Appl. No. 11/552,942, filed Oct. 25, 2006, 18 p.
Kapadekar, Final Office Action Jun. 11, 2010, U.S. Appl. No. 11/552,942, filed Oct. 25, 2006, 17 p.
Kapadekar, Office Action Oct. 30, 2009, U.S. Appl. No. 11/552,942, filed Oct. 25, 2006, 15 p.
Kapadekar, Final Office Action Jul. 24, 2009, U.S. Appl. No. 11/552,942, filed Oct. 25, 2006, 12 p.
Kapadekar, Office Action Jan. 14, 2009, U.S. Appl. No. 11/552,942, filed Oct. 25, 2006, 8 p.
Logan, Examiner's Answer Jul. 28, 2011, U.S. Appl. No. 11/500,734, filed Aug. 7, 2006, 2 p.
Logan, Examiner's Answer Jun. 28, 2011, U.S. Appl. No. 11/500,734, filed Aug. 7, 2006, 25 p.
Logan, Advisory Action Feb. 17, 2011, U.S. Appl. No. 11/500,734, filed Aug. 7, 2006, 2 p.
Logan, Office Action Sep. 29, 2010, U.S. Appl. No. 11/500,734, filed Aug. 7, 2006, 24 p.
Logan, Office Action Apr. 27, 2010, U.S. Appl. No. 11/500,734, filed Aug. 7, 2006, 23 p.
Logan, Final Office Action Dec. 14, 2009, U.S. Appl. No. 11/500,734, filed Aug. 7, 2006, 22 p.
Logan, Office Action Nov. 26, 2008, U.S. Appl. No. 11/500,734, filed Aug. 7, 2006, 20 p.
Rao, Examiner's Answer Jun. 28, 2011, U.S. Appl. No. 11/385,502, filed Mar. 21, 2006, 17 p.
Rao, Final Office Action Nov. 26, 2010, U.S. Appl. No. 11/385,502, filed Mar. 21, 2006, 11 p.
Rao, Office Action Jun. 25, 2010, U.S. Appl. No. 11/385,502, filed Mar. 21, 2006, 10 p.
Rao, Final Office Action Dec. 15, 2009, U.S. Appl. No. 11/385,502, filed Mar. 21, 2006, 10 p.
Rao, Office Action May 12, 2009, U.S. Appl. No. 11/385,502, filed Mar. 21, 2006, 9 p.
Motta, Final Office Action Nov. 19, 2012, U.S. Appl. No. 11/449,259, filed Jun. 7, 2006, 25 p.
Motta, Office Action Jul. 26, 2012, U.S. Appl. No. 11/449,259, filed Jun. 7, 2006, 20 p.
Motta, Decision on Appeal Jun. 20, 2012, U.S. Appl. No. 11/449,259, filed Jun. 7, 2006, 7 p.
Motta, Examiner's Answer Jul. 23, 2009, U.S. Appl. No. 11/449,259, filed Jun. 7, 2006, 28 p.
Motta, Interview Summary Feb. 12, 2009, U.S. Appl. No. 11/449,259, filed Jun. 7, 2006, 4 p.
Motta, Advisory Action Jan. 27, 2009, U.S. Appl. No. 11/449,259, filed Jun. 7, 2006, 3 p.
Motta, Final Office Action Nov. 13, 2008, U.S. Appl. No. 11/449,259, filed Jun. 7, 2006, 18 p.
Motta, Office Action Jul. 10, 2008, U.S. Appl. No. 11/449,259, filed Jun. 7, 2006, 22 p.
Motta, Examiner's Answer Nov. 25, 2011, U.S. Appl. No. 11/590,137, filed Oct. 30, 2006, 11 p.
Motta, Final Office Action Jul. 19, 2011, U.S. Appl. No. 11/590,137, filed Oct. 30, 2006, 11 p.
Motta, Office Action Mar. 11, 2011, U.S. Appl. No. 11/590,137, filed Oct. 30, 2006, 12 p.
Daley, Final Office Action Mar. 17, 2011, U.S. Appl. No. 11/676,997, filed Feb. 20, 2007, 34 p.
Daley, Office Action Aug. 17, 2010, U.S. Appl. No. 11/676,997, filed Feb. 20, 2007, 31 p.
Daley, Office Action Feb. 22, 2010, U.S. Appl. No. 11/676,997, filed Feb. 20, 2007, 27 p.
Motta, Interview Summary Apr. 12, 2012, U.S. Appl. No. 11/829,520, filed Jul. 27, 2007, 3 p.
Motta, Final Office Action Jan. 13, 2012, U.S. Appl. No. 11/829,520, filed Jul. 27, 2007, 27 p.
Motta, Interview Summary Nov. 29, 2011, U.S. Appl. No. 11/829,520, filed Jul. 27, 20/07, 3 p.
Motta, Office Action Sep. 1, 2011, U.S. Appl. No. 11/829,520, filed Jul. 27, 2007, 14 p.
Daley, Examiner's Answer Nov. 2, 2010, U.S. Appl. No. 11/839,396, filed Aug. 15, 2007, 15 p.
Daley, Final Office Action May 25, 2010, U.S. Appl. No. 11/839,396, filed Aug. 15, 2007, 16 p.
Daley, Interview Summary Feb. 25, 2010, U.S. Appl. No. 11/839,396, filed Aug. 15, 2007, 3 p.
Daley, Office Action Dec. 21, 2009, U.S. Appl. No. 11/839,396, filed Aug. 15, 2007, 14 p.
Daley, Office Action Jul. 29, 2009, U.S. Appl. No. 11/839,396, filed Aug. 15, 2007, 23 p.
Rao, Final Office Action Sep. 21, 2012, U.S. Appl. No. 11/867,370, filed Oct. 4, 2007, 14 p.

(56) References Cited

OTHER PUBLICATIONS

Rao, Office Action May 3, 2012, U.S. Appl. No. 11/867,370, filed Oct. 4, 2007, 13 p.
Rao, Final Office Action Dec. 22, 2010, U.S. Appl. No. 11/867,370, filed Oct. 4, 2007, 10 p.
Rao, Office Action Sep. 3, 2010, U.S. Appl. No. 11/867,370, filed Oct. 4, 2007, 11 p.
Rao, Examiner's Answer Apr. 12, 2012, U.S. Appl. No. 11/871,867, filed Oct, 12, 2007, 14 p.
Rao, Final Office Action Oct. 11, 2011, U.S. Appl. No. 11/871,867, filed Oct. 12, 2007, 14 p.
Rao, Interview Summary Aug. 5, 2011; U.S. Appl. No. 11/871,867, filed Oct. 12, 2007, 4 p.
Rao, Office Action Apr. 29, 2011, U.S. Appl. No. 11/871,867, filed Oct. 12, 2007, 13 p.
Rao, Final Office Action Sep. 30, 2010, U.S. Appl. No. 11/871,867, filed Oct. 12, 2007, 14 p.
Rao, Office Action Mar. 25, 2010, U.S. Appl. No. 11/871,867, filed Oct. 12, 2007, 11 p.
Rao, Office Action Aug. 10, 2009, U.S. Appl. No. 11/871,867, filed Oct. 12, 2007, 14 p.
Chowdhary, Decision on Appeal Nov. 1, 2012, U.S. Appl. No. 11/005,312, filed Dec. 6, 2004, 8 p.
Chowdhary, Order Apr. 27, 2009, U.S. Appl. No. 11/005,312, filed Dec. 6, 2004, 3 p.
Chowdhary, Examiner's Answer Aug. 2, 2008, U.S. Appl. No. 11/005,312, filed Dec. 6, 2004, 28 p.
Chowdhary, Office Action Sep. 5, 2006, Nov. 1, 2012, U.S. Appl. No. 11/005,312, filed Dec. 6, 2004, 29 p.
Chowdhary, Final Office Action Mar. 21, 2007, U.S. Appl. No. 11/005,312, filed Dec. 6, 2004, 27 p.
Chowdhary, Office Action Jan. 11, 2008, U.S. Appl. No. 11/005,312, filed Dec. 6, 2004, 24 p.
Rao, Final Office Action Oct. 16, 2012, U.S. Appl. No. 13/350,355, filed Jan. 13, 2012, 18 p.
Rao, Office Action May 16, 2012, U.S. Appl. No. 13/350,355, filed Jan. 13, 2012, 28 p.
Okkonen, Office Action Dec. 28, 2005, U.S. Appl. No. 10/417,285, filed Apr. 15, 2003, 21 p.
Okkonen, Final Office Action May 1, 2006, U.S. Appl. No. 10/417,285, filed Apr. 15, 2003, 41 p.
Okkonen, Office Action Jan. 29, 2007, U.S. Appl. No. 10/417,285, filed Apr. 15, 2003, 41 p.
Okkonen, Office Action Aug. 6, 2007, U.S. Appl. No. 10/417,285, filed Apr. 15, 2003, 6 p.
Okkonen, Office Action Dec. 9, 2009, U.S. Appl. No. 11/650,777, filed Jan. 8, 2007, 17 p.
Okkonen, Final Office Action May 13, 2010, U.S. Appl. No. 11/650,777, filed Jan. 8, 2007, 24 p.
O'Neill, Office Action Jun. 26, 2006, U.S. Appl. No. 10/631,567, filed Jul. 31, 2003, 18 p.
O'Neill, Final Office Action Apr. 10, 2007, U.S. Appl. No. 10/631,567, filed Jul. 31, 2003, 31 p.
O'Neill, Office Action Jan. 14, 2008, U.S. Appl. No. 10/631,567, filed Jul. 31, 2003, 41 p.
O'Neill, Office Action Jul. 9, 2008, U.S. Appl. No. 10/631,567, filed Jul. 31, 2003, 14 p.
O'Neill, Final Office Action Jan. 22, 2009, U.S. Appl. No. 10/631,567, filed Jul. 31, 2003, 14 p.
Chen, Office Action Jan. 8, 2007, U.S. Appl. No. 10/646,324, filed Aug. 22, 2003, 9 p.
Chen, Office Action May 13, 2011, U.S. Appl. No. 11/923,383, filed Oct. 24, 2007, 22 p.
Chen, Final Office Action Nov. 10, 2011, U.S. Appl. No. 11/923,383, filed Oct. 24, 2007, 27 p.
O'Neill, Office Action Oct. 23, 2006, U.S. Appl. No. 10/654,149, filed Sep. 3, 2003, 13 p.
O'Neill, Office Action May 31, 2007, U.S. Appl. No. 10/654,149, filed Sep. 3, 2003, 13 p.
O'Neill, Final Office Action Dec. 13, 2007, U.S. Appl. No. 10/654,149, filed Sep. 3, 2003, 15 p.
O'Neill, Office Action Dec. 4, 2008, U.S. Appl. No. 10/654,149, filed Sep. 3, 2003, 14 p.
O'Neill, Final Office Action May 26, 2009, U.S. Appl. No. 10/654,149, filed Sep. 3, 2003, 15 p.
Rao, Office Action Feb. 7, 2007, U.S. Appl. No. 10/654,412, filed Sep. 3, 2003, 9 p.
Rao, Final Office Action Aug. 24, 2007, U.S. Appl. No. 10/654,412, filed Sep. 3, 2003, 13 p.
Rao, Office Action Mar. 5, 2008, U.S. Appl. No. 10/654,412, filed Sep. 3, 2003, 15 p.
Chen, Office Action Nov. 20, 2006, U.S. Appl. No. 10/646,319, filed Aug. 22, 2003, 8 p.
Chen, Office Action Aug. 16, 2011, U.S. Appl. No. 12/032,809, filed Feb. 18, 2008, 20 p.
Chen, Final Office Action Jan. 19, 2012, U.S. Appl. No. 12/032,809, filed Feb. 18, 2008, 24 p.
Rao, Office Action Aug. 16, 2006, U.S. Appl. No. 10/695,713, filed Oct. 29, 2003, 12 p.
Rao, Final Office Action Dec. 20, 2006, U.S. Appl. No. 10/695,713, filed Oct. 29, 2003, 13 p.
Rao, Office Action Oct. 21, 2009, U.S. Appl. No. 11/688,820, filed Mar. 20, 2007, 10 p.
Rao, Final Office Action May 3, 2010, U.S. Appl. No. 11/688,820, filed Mar. 20, 2007, 14 p.
Rao, Office Action Dec. 30, 2004, U.S. Appl. No. 10/689,309, filed Oct. 20, 2003, 5 p.
Rao, Office Action Jun. 24, 2009, U.S. Appl. No. 11/251,046, filed Oct. 14, 2005, 8 p.
Lilley, Office Action Oct. 24, 2006, U.S. Appl. No. 10/681,861, filed Oct. 8, 2003, 24 p.
Lilley, Final Office Action Jul. 23, 2007, U.S. Appl. No. 10/681,861, filed Oct. 8, 2003, 18 p.
Lilley, Office Action Nov. 16, 2007, U.S. Appl. No. 10/681,861, filed Oct. 8, 2003, 18 p.
Lilley, Final Office Action Jun. 16, 2008, U.S. Appl. No. 10/681,861, filed Oct. 8, 2003, 24 p.
O'Neill, Office Action Mar. 22, 2007, U.S. Appl. No. 10/721,658, filed Nov. 25, 2003, 14 p.
O'Neill, Final Office Action Sep. 25, 2007, U.S. Appl. No. 10/721,658, filed Nov. 25, 2003, 9 p.
O'Neill, Final Office Action Feb. 20, 2008, U.S. Appl. No. 10/721,658, filed Nov. 25, 2003, 13 p.
Rao, Office Action Oct. 5, 2004, U.S. Appl. No. 10/701,848, filed Nov. 5, 2003, 12 p.
Rao, Final Office Action May 5, 2005, U.S. Appl. No. 10/701,848, filed Nov. 5, 2003, 14 p.
Rao, Office Action Nov. 23, 2005, U.S. Appl. No. 10/701,848, filed Nov. 5, 2003, 13 p.
Rao, Final Office Action Aug. 15, 2006, U.S. Appl. No. 10/701,848, filed Nov. 5, 2003, 16 p.
Rao, Office Action Nov. 14, 2006, U.S. Appl. No. 10/706,219, filed Nov. 12, 2003, 12 p.
Rao, Final Office Action May 2, 2007, U.S. Appl. No. 10/706,219, filed Nov. 12, 2003, 17 p.
Rao, Office Action Dec. 13, 2007, U.S. Appl. No. 10/706,219, filed Nov. 12, 2003, 13 p.
Rao, Office Action Jun. 25, 2008, U.S. Appl. No. 10/706,219, filed Nov. 12, 20/03, 10 p.
Rao, Final Office Action Jan. 6, 2009, U.S. Appl. No. 10/706,219, filed Nov. 12, 2003, 16 p.
Rao, Office Action Jul. 22, 2009, U.S. Appl. No. 10/706,219, filed Nov. 12, 2003, 6 p.
Rao, Office Action Mar. 26, 2009, U.S. Appl. No. 11/401,708, filed Apr. 11, 2006, 20 p.
Rao, Office Action Aug. 9, 2005, U.S. Appl. No. 10/695,524, filed Oct. 28, 2003, 19 p.
Chia, Office Action May 28, 2008, U.S. Appl. No. 10/719,114, filed Nov. 21, 2003, 10 p.
Chia, Final Office Action Dec. 2, 2008, U.S. Appl. No. 10/719,114, filed Nov. 21, 2003, 8 p.

(56) References Cited

OTHER PUBLICATIONS

Chia, Final Office Action May 4, 2009, U.S. Appl. No. 10/719,114, filed Nov. 21, 2003, 11 p.
Chia, Office Action Aug. 19, 2009, U.S. Appl. No. 10/719,114, filed Nov. 21, 2003, 8 p.
Chia, Final Office Action Mar. 17, 2010, U.S. Appl. No. 10/719,114, filed Nov. 21, 2003, 9 p.
Jacobi, Office Action Dec. 10, 2004, U.S. Appl. No. 10/697,458, filed Oct. 30, 2003, 16 p.
Jacobi, Final Office Action Jun. 14, 2005, U.S. Appl. No. 10/697,458, filed Oct. 30, 2003, 16 p.
Gustafson, Office Action Mar. 4, 2008, U.S. Appl. No. 10/761,735, filed Jan. 20, 2004, 25 p.
Gustafson, Office Action Sep. 8, 2008, U.S. Appl. No. 10/761,735, filed Jan. 20, 2004, 25 p.
Gustafson, Final Office Action Mar. 20, 2009, U.S. Appl. No. 10/761,735, filed Jan. 20, 2004, 27 p.
Rao, Office Action Sep. 25, 2008, U.S. Appl. No. 11/083,596, filed Mar. 18, 2005, 7 p.
Rao, Office Action Oct. 19, 2004, U.S. Appl. No. 10/765817, filed Jan. 27, 2004, 8 p.
Rao, Office Action Feb. 4, 2008, U.S. Appl. No. 10/782,083, filed Feb. 19, 2004, 21 p.
Rao, Final Office Action Jul. 15, 2008, U.S. Appl. No. 10/782,083, filed Feb. 19, 2004, 25 p.
Gustafson, Office Action Jul. 24, 2007, U.S. Appl. No. 10/790,340, filed Mar. 1, 2004, 21 p.
Gustafson, Office Action Jun. 12, 2008, U.S. Appl. No. 10/790,340, filed Mar. 1, 2004, 20 p.
Gustafson, Office Action Dec. 23, 2008, U.S. Appl. No. 10/790,340, filed Mar. 1, 2004, 21 p.
Gustafson, Final Office Action Jul. 6, 2009, U.S. Appl. No. 10/790,340, filed Mar. 1, 2004, 21 p.
Lilley, Final Office Action Jul. 25, 2007, U.S. Appl. No. 10/646,975, filed Aug. 22, 2003, 13 p.
Lilley, Office Action Oct. 31, 2007, U.S. Appl. No. 10/646,975, filed Aug. 22, 2003, 15 p.
Lilley, Final Office Action Apr. 16, 2008, U.S. Appl. No. 10/646,975, filed Aug. 22, 2003, 14 p.
Rao, Office Action Jun. 30, 2006, U.S. Appl. No. 10/797,176, filed Mar. 10, 2004, 15 p.
Rao, Final Office Action Jul. 17, 2007, U.S. Appl. No. 10/797,176, filed Mar. 10, 2004, 26 p.
Rao, Final Office Action Oct. 31, 2007, U.S. Appl. No. 10/797,176, filed Mar. 10, 2004, 29 p.
Rao, Office Action Apr. 14, 2008, U.S. Appl. No. 10/797,176, filed Mar. 10, 2004, 31p.
Rao, Office Action Oct. 16, 2008, U.S. Appl. No. 10/797,176, filed Mar. 10, 2004, 33 p.
Rao, Final Office Action Nov. 25, 2009, U.S. Appl. No. 10/797,176, filed Mar. 10, 2004, 41 p.
Rao, Final Office Action Aug. 19, 2010, U.S. Appl. No. 10/797,176, filed Mar. 10, 2004, 5 p.
Okkonnen, Office Action Feb. 28, 2005, U.S. Appl. No. 10/807,694, filed Mar. 24, 2004, 18 p.
Okkonnen, Final Office Action Aug. 10, 2005, U.S. Appl. No. 10/807,694, filed Mar. 24, 2004, 17 p.
Okkonen, Office Action Mar. 14, 2006, U.S. Appl. No. 10/807,694, filed Mar. 24, 2004, 21 p.
Okkonen, Office Action Oct. 24, 2006, U.S. Appl. No. 10/807,694, filed Mar. 24, 2004, 16 p.
Okkonen, Office Action Jul. 10, 2007, U.S. Appl. No. 10/807,694, filed Mar. 24, 2004, 19 p.
Okkonen, Final Office Action Dec. 18, 2007, U.S. Appl. No. 10/807,694, filed Mar. 64, 2004, 22 p.
Okkonen, Office Action May 12, 2008, U.S. Appl. No. 10/807,694, filed Mar. 24, 2004, 22 p.
Okkonen, Final Office Action Nov. 20, 2008, U.S. Appl. No. 10/807,694, filed Mar. 24, 2004, 22 p.
Okkonen, Office Action Jun. 25, 2009, U.S. Appl. No. 10/807,694, filed Mar. 24, 2004, 34 p.
McGhee, Office Action Sep. 27, 2006, U.S. Appl. No. 10/797,825, filed Mar. 10, 2004, 7 p.
McGhee, Final Office Action Jun. 25, 2007, U.S. Appl. No. 10/797,825, filed Mar. 10, 2004, 6 p.
Yang, Office Action Jan. 28, 2008, U.S. Appl. No. 10/802,191, filed Mar. 17, 2004, 18 p.
Yang, Final Office Action Jun. 6, 2008, U.S. Appl. No. 10/802,191, filed Mar. 17, 2004, 19 p.
Yang, Office Action Sep. 5, 2008, U.S. Appl. No. 10/802,191, filed Mar. 17, 2004, 16 p.
Qumei, Final Office Action Nov. 23, 2007, U.S. Appl. No. 10/813,212, filed Mar. 30, 2004, 11 p.
Yang, Office Action Sep. 21, 2006, U.S. Appl. No. 10/635,991, filed Aug. 7, 2003, 10 p.
Yang, Office Action Jun. 2, 2010, U.S. Appl. No. 12/014,549, filed Jan. 15, 2008, 8 p.
Yang, Final Office Action Sep. 16, 2010, U.S. Appl. No. 12/014,549, filed Jan. 15, 2008, 7 p.
Yang, Office Action Nov. 2, 2006, U.S. Appl. No. 10/887,490, filed Jul. 8, 2004, 12 p.
Yang, Final Office Action Apr. 17, 2007, U.S. Appl. No. 10/887,490, filed Jul. 8, 2004, 13 p.
Marolia, Final Office Action Jan. 30, 2008, U.S. Appl. No. 10/852,396, filed May 24, 2004, 17 p.
Marolia, Office Action May 28, 2008, U.S. Appl. No. 10/852,396, filed May 24, 2004, 20 p.
Marolia, Office Action Dec. 8, 2008, U.S. Appl. No. 10/852,396, filed May 24, 2004, 19 p.
Marolia, Final Office Action Jun. 17, 2009, U.S. Appl. No. 10/852,396, filed May 24, 2004, 24 p.
Marolia, Office Action Dec. 14, 2009, U.S. Appl. No. 10/852,396, filed May 24, 2004, 19 p.
Marolia, Office Action Jun. 3, 2005, U.S. Appl. No. 10/888,841, filed Jul. 9, 2004, 8 p.
Marolia, Final Office Action Dec. 6, 2005, U.S. Appl. No. 10/888,841, filed Jul. 9, 2004, 10 p.
Marolia, Office Action May 4, 2006, U.S. Appl. No. 10/888,841, filed Jul. 9, 2004, 13 p.
Marolia, Final Office Action Jan. 12, 2007, U.S. Appl. No. 10/888,841, filed Jul. 9, 2004, 15 p.
Marolia, Office Action Jun. 18, 2007, U.S. Appl. No. 10/888,841, filed Jul. 9, 2004, 16 p.
Marolia, Final Office Action Nov. 27, 2007, U.S. Appl. No. 10/888,841, filed Jul. 9, 2004, 17 p.
Marolia, Office Action Apr. 28, 2009, U.S. Appl. No. 10/888,841, filed Jul. 9, 2004, 15 p.
Qumei, Office Action Apr. 21, 2008, U.S. Appl. No. 10/864,095, filed Jun. 9, 2004, 15 p.
Marolia, Office Action Dec. 11, 2007, U.S. Appl. No. 10/879,869, filed Jun. 28, 2004, 10 p.
Marolia, Final Office Action May 30, 2008, U.S.Appl. No. 10/879,869, filed Jun. 28, 2004, 15 p.
Marolia, Office Action Aug. 18, 2008, U.S. Appl. No. 10/879,869, filed Jun. 28, 2004, 17 p.
Marolia, Final Office Action Jan. 28, 2009, U.S. Appl. No. 10/879,869, filed Jun. 28, 2004, 18 p.
Rao, Office Action Jul. 25, 2007, U.S. Appl. No. 10/860,964, filed Jun. 4, 2004, 22 p.
Rao, Final Office Action Jan. 7, 2008, U.S. Appl. No. 10/860,964, filed Jun. 4, 2004, 26 p.
Rao, Office Action Apr. 30, 2008, U.S. Appl. No. 10/860,964, filed Jun. 4, 2004, 23 p.
Rao, Final Office Action Oct. 28, 2008, U.S. Appl. No. 10/860,964, filed Jun. 4, 2004, 29 p.
Yang, Office Action Jun. 27, 2007, U.S. Appl. No. 10/860,978, filed Jun. 4, 2004, 14 p.
Yang, Final Office Action Dec. 7, 2007, U.S. Appl. No. 10/860,978, filed Jun. 4, 2004, 16 p.
Yang, Office Action Jun. 20, 2008, U.S. Appl. No. 10/860,978, filed Jun. 4, 2004, 13 p.

(56) References Cited

OTHER PUBLICATIONS

Yang, Office Action Dec. 23, 2008, U.S. Appl. 10/860,978, filed Jun. 4, 2004, 13 p.
Yang, Final Office Action Jun. 19, 2009, U.S. Appl. No. 10/860,978, filed Jun. 4, 2004, 16 p.
Rao, Office Action Aug. 24, 2007, U.S. Appl. No. 10/868,050, filed Jun. 15, 2004, 15 p.
Rao, Office Action Feb. 4, 2008, U.S. Appl. No. 10/868,050, filed Jun. 15, 2004, 16 p.
Rao, Final Office Action Aug. 6, 2008, U.S. Appl. No. 10/868,050, filed Jun. 15, 2004, 18 p.
Rao, Office Action Apr. 15, 2008, U.S. Appl. No. 10/899,513, filed Jul. 26, 2004, 14 p.
Rao, Final Office Action Oct. 24, 2008, U.S. Appl. No. 10/899,513, filed Jul. 26, 2004, 16 p.
Rao, Office Action Jul. 11, 2007, U.S. Appl. No. 10/902,452, filed Jul. 29, 2004, 13 p.
Rao, Final Office Action Dec. 20, 2007, U.S. Appl. No. 10/902,452, filed Jul. 29, 2004, 10 p.
Rao, Final Office Action Jun. 23, 2008, U.S. Appl. No. 10/902,425, filed Jul. 29, 2004, 14 p.
Rao, Office Action Jan. 5, 2009, U.S. Appl. No. 10/902,452, filed Jul. 29, 2004, 16 p.
Rao, Final Office Action Jul. 20, 2009, U.S.Appl. No. 10/902,452, filed Jul. 29, 2004, 16 p.
Rao, Office Action May 13, 2010, U.S. Appl. No. 10/902,452, filed Jul. 29, 2004, 16 p.
Qumei, Office Action Jul. 12, 2007, U.S. Appl. No. 10/909,519, filed Aug. 2, 2004, 17 p.
Qumei, Final Office Action Dec. 20, 2007, U.S. Appl. No. 10/909,519, filed Aug. 2, 2004, 11 p.
Qumei, Office Action May 29, 2008, U.S. Appl. No. 10/909,519, filed Aug. 2, 2004, 21 p.
Qumei, Final Office Action Nov. 17, 2008, U.S. Appl. No. 10/909,519, filed Aug. 2, 2004, 24 p.
Qumei, Office Action Apr. 28, 2009, U.S. Appl. No. 10/909,519, filed Aug. 2, 2004, 23 p.
Chen, Office Action May 14, 2008, U.S. Appl. No. 10/932,175, filed Sep. 1, 2004, 18 p.
Chen, Final Office Action Feb. 6, 2009, U.S. Appl. No. 10/932,175, filed Sep. 1, 2004, 15 p.
Chen, Office Action Mar. 1, 2010, U.S. Appl. No. 10/932,175, filed Sep. 1, 2004, 16 p.
Chen, Final Office Action Sep. 21, 2010, U.S. Appl. No. 10/932,175, filed Sep. 1, 2004, 17 p.
Okkonen, Office Action Jan. 5, 2007, U.S. Appl. No. 10/945,466, filed Sep. 20, 2004, 5 p.
Okkonen, Office Action Aug. 10, 2007, U.S. Appl. No. 10/945,466, filed Sep. 20, 2004, 5 p.
Okkonen, Final Office Action Jan. 9, 2008, U.S. Appl. No. 10/945,466, filed Sep. 20, 2004, 7 p.
Okkonen, Office Action May 12, 2008, U.S. Appl. No. 10/945,466, filed Sep. 20, 2004, 6 p.
Okkonen, Office Action Nov. 12, 2008, U.S. Appl. No. 10/945,466, filed Sep. 20, 2004, 5 p.
Okkonen, Office Action Apr. 14, 2009, U.S. Appl. No. 10/945,466, filed Sep. 20, 2004, 5 p.
Rao, Office Action Aug. 27, 2007, U.S. Appl. No. 10/950,764, filed Sep. 27, 2004, 14 p.
Rao, Final Office Action Mar. 4, 2008, U.S. Appl. No. 10/950,746, filed Sep. 27, 2004, 17 p.
Rao, Office Action Nov. 3, 2008, U.S. Appl. No. 10/950,764, filed Sep. 27, 2004, 12 p.
Rao, Final Office Action Jun. 30, 2009, U.S. Appl. No. 10/950,764, filed Sep. 27, 2004, 15 p.
Chen, Office Action Jan. 29, 2008, U.S. Appl. No. 10/958,148, filed Oct. 4, 2004, 16 p.
Chen, Final Office Action Aug. 20, 2008, U.S. Appl. No. 10/958,148, filed Oct. 4, 2004, 19 p.
Chen, Office Action Apr. 14, 2009, U.S. Appl. No. 10/958,148, filed Oct. 4, 2004, 11 p.
Chen, Final Office Action Nov. 25, 2009, U.S. Appl. No. 10/958,148, filed Oct. 4, 2004, 12 p.
Chen, Office Action Apr. 1, 2010, U.S. Appl. No. 10/958,148, filed Oct. 4, 2004, 13 p.
Gustafson, Office Action Sep. 11, 2007, U.S. Appl. No. 11/010,913, filed Dec. 13, 2004, 27 p.
Gustafson, Office Action Feb. 1, 2008, U.S. Appl. No. 11/010,913, filed Dec. 13, 2004, 29 p.
Gustafson, Final Office Action Feb. 18, 2010, U.S. Appl. No. 11/010,913, filed Dec. 13, 2004, 31 p.
Ren, Office Action Jan. 22, 2008, U.S. Appl. No. 10/989,628, filed Nov. 16, 2004, 8 p.
Ren, Office Action Aug. 18, 2008, U.S. Appl. No. 10/989,628, filed Nov. 16, 2004, 7 p.
Ren, Final Office Action Nov. 24, 2009, U.S. Appl. No. 10/989,628, filed Nov. 16, 2004, 9 p.
Slyz, Office Action Mar. 1, 2010, U.S. Appl. No. 11/874,102, filed Oct. 17, 2007, 13 p.
Qumei, Office Action Apr. 9, 2007, U.S. Appl. No. 10/698,665, filed Oct. 30, 2003, 22 p.
Qumei, Office Action Jul. 29, 2010, U.S. Appl. No. 11/852,933, filed Sep. 10, 2007, 14 p.
Qumei, Final Office Action Feb. 17, 2011, U.S. Appl. No. 11/852,933, filed Sep. 10, 2007, 19 p.
Chen, Office Action Apr. 19, 2007, U.S. Appl. No. 10/903,394, filed Jul. 30, 2004, 31 p.
Chen, Final Office Action Oct. 18, 2007, U.S. Appl. No. 10/903,394, filed Jul. 30, 2004, 34 p.
Chen, Office Action May 13, 2008, U.S. Appl. No. 10/903,394, filed Jul. 30, 2004, 14 p.
Chen, Office Action Nov. 26, 2008, U.S. Appl. No. 10/903,394, filed Jul. 30, 2004, 14 p.
Chen, Final Office Action Apr. 21, 2009, U.S. Appl. No. 10/903,394, filed Jul. 30, 2004, 21 p.
Chen, Office Action Oct. 30, 2009, U.S. Appl. No. 10/903,394, filed Jul. 30, 2004, 19 p.
Chen, Final Office Action Apr. 29, 2010, U.S. Appl. No. 10/903,394, filed Jul. 30, 2004, 24 p.
Rao, Office Action Feb. 4, 2008, U.S. Appl. No. 11/047,212, filed Jan. 31, 2005, 9 p.
Rao, Final Office Action Sep. 3, 2008, U.S. Appl. No. 11/047,212, filed Jan. 31, 2005, 8 p.
Rao, Office Action Feb. 2, 2009, U.S. Appl. No. 11/047,212, filed Jan. 31, 2005, 8 p.
Rao, Final Office Action Sep. 25, 2009, U.S. Appl. No. 11/047,212, filed Jan. 31, 2005, 9 p.
Rao, Office Action Jan. 22, 2010, U.S. Appl. No. 11/047,212, filed Jan. 31, 2005, 9 p.
Rao, Final Office Action Jun. 10, 2010, U.S. Appl. No. 11/047,212, filed Jan. 31, 2005, 11 p.
Rao, Office Action Jan. 14, 2011, U.S. Appl. No. 11/047,212, filed Jan. 31, 2005, 9 p.
Kokkinen, Office Action Feb. 23, 2007, U.S. Appl. No. 10/688,640, filed Oct. 17, 2003, 23 p.
Kokkinen, Office Action Aug. 21, 2007, U.S. Appl. No. 10/688,640, filed Oct. 17, 2003, 23 p.
Kokkinen, Office Action Jul. 18, 2008, U.S. Appl. No. 10/688,640, filed Oct. 17, 2003, 28 p.
Kokkinen, Office Action Dec. 30, 2008, U.S. Appl. No. 10/688,640, filed Oct. 17, 2003, 29 p.
Kokkinen, Office Action Jul. 21, 2009, U.S. Appl. NO. 10/688,640, filed Oct. 17, 2003, 30 p.
Kokkinen, Office Action Feb. 24, 2010, U.S. Appl. No. 10/688,640, filed Oct. 17, 2003, 33 p.
Kokkinen, Office Action Aug. 6, 2010, U.S. Appl. No. 10/688,640, filed Oct. 17, 2003, 26 p.
Okkonen, Office Action Apr. 19, 2007, U.S. Appl. No. 10/788,768, filed Feb. 27, 2004, 14 p.
Okkonen, Final Office Action Oct. 2, 2007, U.S. Appl. No. 10/788,768, filed Feb. 27, 2004, 18 p.

(56) References Cited

OTHER PUBLICATIONS

Okkonen, Office Action Mar. 20, 2008, U.S. Appl. No. 10/788,768, filed Feb. 27, 2004, 16 p.
Okkonen, Office Action Oct. 2, 2008, U.S. Appl. No. 10/788,768, filed Feb. 27, 2004, 17 p.
Okkonen, Final Office Action Apr. 14, 2009, U.S. Appl. No. 10/788,768, filed Feb. 27, 2004, 18 p.
Qumei, Final Office Action Sep. 7, 2007, U.S. Appl. No. 10/770,983, filed Feb. 3, 2004, 15 p.
Qumei, Office Action Jan. 25, 2008, U.S. Appl. No. 10/770,983, filed Feb. 3, 2004, 18 p.
Qumei, Office Action Jul. 3, 2008, U.S. Appl. No. 10/770,983, filed Feb. 3, 2004, 22 p.
Qumei, Office Action Dec. 19, 2008, U.S. Appl. No. 10/770,983, filed Feb. 3, 2004, 19 p.
Qumei, Final Office Action Jun. 11, 2009, U.S. Appl. No. 10/770,983, filed Feb. 3, 2004, 21 p.
Hamasaki, Office Action Jan. 9, 2008, U.S. Appl. No. 10/748,053, filed Dec. 30, 2003, 18 p.
Hamasaki, Final Office Action Aug. 20, 2008, U.S. Appl. No. 10/748,053, filed Dec. 30, 2003, 21 p.
Hamasaki, Office Action Feb. 27, 2009, U.S. Appl. No. 10/748,053, filed Dec. 30, 2003, 19 p.
Hamasaki, Final Office Action Sep. 11, 2009, U.S. Appl. No. 10/748,053, filed Dec. 30, 2003, 19 p.
Hamasaki, Final Office Action May 17, 2010, U.S. Appl. No 10/748,053, filed Dec. 30, 2003, 21 p.
Rao, Office Action Feb. 6, 2009, U.S. Appl. No. 10/754,378, filed Jan. 9, 2004, 14 p.
Rao, Final Office Action Jul. 13, 2009, U.S. Appl. No. 10/754,378, filed Jan. 9, 2004, 25 p.
Rao, Office Action May 17, 2010, U.S. Appl. No. 10/754,378, filed Jan. 9, 2004, 43 p.
Marolia, Office Action Oct. 17, 2006, U.S. Appl. No. 10/754,313, filed Jan. 9, 2004, 16 p.
Marolia, Office Action Feb. 20, 2008, U.S. Appl. No. 10/754,313, filed Jan. 9, 2004, 11 p.
Gustafson, Office Action Jan. 4, 2007, U.S. Appl. No. 10/756,103, filed Jan. 13, 2004, 10 p.
Gustafson, Office Action Aug. 10, 2007, U.S. Appl. No. 10/756,103, filed Jan. 13, 2004, 11 p.
Gustafson, Office Action Jan. 22, 2008, U.S. Appl. No. 10/756,103, filed Jan. 13, 2004, 11 p.
Gustafson, Office Action Jul. 8, 2009, U.S. Appl. No. 10/756,103, filed Jan. 13, 2004, 21 p.
Gustafson, Final Office Action Dec. 18, 2009, U.S. Appl. No. 10/756,103, filed Jan. 13, 2004, 22 p.
Chen, Office Action Jul. 23, 2007, U.S. Appl. No. 10/646,230, filed Aug. 22, 2003, 14 p.
Chen, Final Office Action Dec. 28, 2007, U.S. Appl. No. 10/646,230, filed Aug. 22, 2003, 14 p.
Chen, Office Action Dec. 23, 2008, U.S. Appl. No. 10/646,230, filed Aug. 22, 2003, 25 p.
Chen, Final Office Action May 27, 2009, U.S. Appl. No. 10/646,230, filed Aug. 22, 2003, 28 p.
Chen, Office Action Dec. 2, 2009, U.S. Appl. No. 10/646,230, filed Aug. 22, 2003, 15 p.
Chen, Office Action May 27, 2010, U.S. Appl. No. 10/646,230, filed Aug. 22, 2003, 17 p.
Chen, Final Office Action Nov. 10, 2010, U.S. Appl. No. 10/646,230, filed Aug. 22, 2003, 17 p.
Chen, Office Action Aug. 23, 2011, U.S. Appl. No. 10/646,230, filed Aug. 22, 2003, 6 p.
Marolia, Office Action Aug. 17, 2007, U.S. Appl. No. 10/852,396, filed May 24, 2004, 17 p.
Qumei, Office Action Jun. 20, 2007, U.S. Appl. No. 10/813,212, filed Mar. 30, 2004, 10 p.
Chen, Office Action Jun. 12, 2008, U.S. Appl. No. 10/646,230, filed Aug. 22, 2003, 14 p.
Chen, Office Action Dec. 7, 2005, U.S. Appl. No. 10/411,784, filed Apr. 11, 2003, 15 p.
Chen, Final Office Action Nov. 6, 2007, U.S. Appl. No. 11/125,974, filed May 9, 2005, 10 p.
Gustafson, Office Action Jan. 22, 2009, U.S. Appl. No. 10/756,103, filed Jan. 13, 2004, 15.p.
Qumei, Office Action, Apr. 13, 2007, U.S. Appl. No. 10/770,983, filed Feb. 3, 2004, 11 .p.
Muller, N. J., "Focus on OpenView a guide to Hewlett- Packard's Network and Systems Management Platform," pp. 1-291, CBM Books, published 1995.
ILOG, "ILOG Delivers Enterprise-Wide Business Rule Management with ILOG Jrules 4.5," . Press Release, May 2003 [Online] <http://www.ilog.com/corporate/releases/us/030610_jrules45.cfm>.
ILOG, "ILOG Jrules—Complete business rule management," [Online] <http://www.ilog.com/products/jrules/datasheet> (May 2003).
Verbauwhede et al., "Low power DSP's for wireless communications (embedded tutorial session)", Aug. 2000, pp. 303-310. [Online] <http://delivery.acm.org/10.1145/350000/34464 7/p303-verbauwhede. pdf>.
"Over the Air User Initiated Provisioning Recommended Practice for the Mobile Information Device Profile", Version 1.0, May 7, 2001.
Oma, "SyncML Device Management Tree and Description, Version 1.1.2," Dec. 2, 2003, pp. 1-44.
Lucent Technologies, "Wireless Intelligent Network Over-the-Air Service Provisioning," Technical Brochure, [Online] <http://www.lucent.com/livelink/146175-Brochure.pdf>, 1997.
3GPP2 C:R1001-A 2.0: Administration of Parameter Value Assignments for cdma2000 Spread Spectrum Standards, Release A: Jul. 14, 2000.
Albright, Brian, "Managing the force: Planning makes the difference," Frontline Solutions, Jan. 2001, retrieved from scholar.google.com search Jun. 15, 2006.
Bailey, E. C., "Maximum RPM: Taking the Red Hat Package Manager to the Limit," Copyright 2000 by Red Hat, Inc., 14 p.
Baker et al., "Compressing Differences of Executable Code," Apr. 22, 1999.
Bokun et al. (Active Badges—The Next Generation, Linux Journa, Oct. 1998, Issue 54).
Brown, Michael et al., PGP in Constrined Wireless Devices, 1-23, 9th USENIX Security Symposium Paper 2000, retrieved Apr. 16, 2007.
Burns et al., "In-Place Reconstruction of Delta Compressed Files," Univ of California, Santa Cruz, darrell@cs.scsc.edu; 12 pgs, 1998.
Ortiz, C. Enrique, "Introduction to OTA Application Provisioning," Nov. 2002, [Online] http://developers.sun.com/techtopics/mobility/midparticles/ota/ retrieved on Mar. 29, 2007.
Microsoft, "Computer Dictionary," Microsoft Press Third Edition, pp. 88, 190, 1997.
Deitel & Deitel, "C How to Program," 1994, Prentice-Hall, Inc., Second Edition, Chapter 5.
Digital Cellular Telecomminications System (Phase 2+) AT Command Set for GSM Mobile Equipment (ME) (GSM 07.07 version 7.4.0 Release 1998), ETSI TS 100 916 V7.4.0 (1999-11), 126 p.
Engstrom, Don, "Two Clicks to a Rejuvenated Mac: A Review of UpdateAgent—CD Edition," Feb. 20, 2002, pp. 1-3.
Eppstein, D., "Fast Hierarchical Clustering and Other Applications of Dynamic Closest Pairs," Jan. 31, 2001, pp. 1-10. [Online] http://www.ics.uci.edu/-eppstein/projects/pairs/Papers/ Epp-SODA-98.pdf>.
Euroloader, "Technical Specification" Dec. 2001, ECCA Euroloader Specificaion, pp. 1-60.
Fowler et al., "Lossless Compression of Volumne Data," 1995, IEEE, pp. 43-50.
Funambol Inc., "Funambol DM Server Developer's Guide Version 3.0," Sep. 2006.
Guanluca, Moro, "On the Event Coordination in Multi-Component Systems," published 2002, pp. 315-322.
Hicks et al., Dynamic Software Updating, Jun. 2001. [Online] <citeseer.ist.psu.edu/336947.html>.
IEEE LAN MAN Standards Committee, "Draft Amendment to IEEE Standard for Local and Metropolitan Area Networks; Part 16: Air Interface for Fixed and Mobile Broadband Wireless Access Sys-

(56) References Cited

OTHER PUBLICATIONS tems—Amendment to IEE Standards for Local and Metorpolitian Area Networks—Management Plane Procedures and Services," IEEE Draft Standards, No. 802. 16g-04/03, Dec. 2004, pp. 1-8, XP002469853.

Jansen et al., "Approx 2000, LNCS 1913," pp. 84-95, 2000, Springer-Verlag, Berlin Heidelberg 2000.

Luculli, Gabriele, "Efficient and Effective Simulation of Memory Maps for System-on-Chip," 11th IEEE Int'l. Conference and Workshop on the Engineering of Computer Baseed Systems, May 24-27, 2004, pp. 242-247.

Open Mobile Alliance, "Firmware Update Management Object," 2006.

Open Mobile Alliance, "OMA Device Management Security," Jul. 2005, Candidate Version 1.2.

Open Mobile Alliance, "SyncML Device Management Bootstrap," 2003.

Open Mobile Alliance, "Firmware Update Management Object," OMA-DM-V0_14-2004Oct28-D.

Open Mobile Alliance, "OMA Device Management Tree and Description_ver 1.2," Jun. 15, 2005 (OMA-TS-DM-TND-V1_2-20050615-C).

Paila et al. "Flute-File Delivery Over Unidirectional Transport," Network Working Group Request for Comments; 3926 Category; Experimental; Oct. 2004.

"Part 16: Air Interface for Fixed Broadband Wireless Access Systems," Sep. 22, 2005, pp. 1-257, XP007904329.

"Problem Tracking Task Reference," Continuus Software Corporation, Whole Manual, Part No. PTTR-041-011, 1996.

Riel, "Object-Oriented Design Heuristics," Apr. 30, 1996, Addison-Wesley Professional, Section 10.1.

Rodriguez et al., "TCP/IP Tutorial and Technical Overview," Copyright 2002, pp. 489-490.

Shapira et al., "In Place Differential File Compression," The Author 2005; Published by Oxford University Press on behalf of The British Computer Society; Advance Access published on Aug 26, 2005; 15 p.

Starlin, Mark, UpdateAgent 8, Nov. 18, 2002, pp. 1-2.

Symbian, "Symbian OS powered Sony Ericsson P800 Smartphone to ship in Q32003" Mar. 2002 pp. 1-2.

Tansley, "Linux and Unix Shell Programming," Dec. 27, 1999, Addison-Wesley Professional, 2 p.

The Mac Observer, Update Agent Scouts Out an Update for Itself, May 9, 2000, pp. 1-3.

TIA/EIA/IS-683-A: Over-the-Air Service Provisioning of Mobile Stations in Spread Spectrum Systems: May 1998.

Veeraraghavan et al., "A distributed control strategy for wireless ATM networks," pp. 323.339, Wireless Networks 1995, retrieved from ACM database search Jun. 15, 2006.

Yang et al., "Reuse Linux Device Drivers in Embedded Systems," 1998 International Computer Symposium Workshop on Software Engineering and Database Systems Dec. 17-19, 1998.

Yau et al., "An approach to distributed component-based real-time application. software development," 1998, pp. 275-283.

* cited by examiner

USER EXPERIENCE AND DEPENDENCY MANAGEMENT IN A MOBILE DEVICE

The present application makes reference to, claims priority to, and claims benefit of U.S. Provisional Application Ser. No. 60/834,325 entitled "USER EXPERIENCE AND DEPENDENCY MANAGEMENT IN A MOBILE DEVICE", filed Jul. 27, 2006, the complete subject matter of which is hereby incorporated herein by reference, in its entirety.

The present application makes reference to U.S. Provisional Patent Application Ser. No. 60/249,606, entitled "System and Method for Updating and Distributing Information," filed Nov. 17, 2000, and International Patent Application Publication No. WO 02/41147 A1, entitled "System And Method For Updating And Distributing Information", filed Nov. 19, 2001, and having publication date Mar. 23, 2002, the complete subject matter of each of which is hereby incorporated herein by reference, in its entirety.

BACKGROUND OF THE INVENTION

Non-volatile memory is employed in a wide variety of electronic devices such as, for example, mobile handsets, cellular phones, personal digital assistants (PDA's), pagers and handheld personal computers. The non-volatile memory in these devices contain firmware, application software, data, and configuration information that makes the devices operational, and may be provided by the manufacturers of the electronic devices, by system operators of telecommunication carrier networks, or by third parties developers. If defects are found in such firmware/software, or if new features are to be added to such devices, the software and/or firmware in the affected electronic devices may need to be updated. Errors and/or interruptions that may occur during the updating of such operational code may leave the electronic device in a partly or completely non-functional state. To avoid this problem, present methods of updating such software and/or firmware involve returning the electronic device to the manufacturer, to the system operator, or to the third party, so that an update of memory contents may be performed using a direct connection to the electronic device. This is both costly and inconvenient to both the user of the electronic device, and to one performing the update.

Configuration parameters and other information for an electronic device may be stored in the non-volatile memory of such devices, and information about the device capabilities, the hardware, software and manufacturer of the device, and particulars for a given instance of the device in a network may be stored in databases used by, for example, device management and customer service operations. Such databases may be accessible to device management and customer service operations through database access mechanisms using, for example, structured query language (SQL) or similar database management tools.

Updates to firmware and/or software in an electronic device may be developed by a number of parties including, for example, the manufacturer of the electronic device, the provider of services of a communication network accessed by the electronic device, or a third party. Users may subscribe to multiple network-based information services, and may receive numerous messages at the electronic device concerning information available, scheduled events, news, and the like. The volume of such information may impair the user's ability to maximize enjoyment and usefulness such services.

Electronic devices such as, for example, cellular phones and wireless enabled personal digital assistants are highly capable. A particular user of such a device, however, is limited by the common functionality offered to all users of a particular make, model and/or version of device. Customization of device capabilities is complex or not unavailable, and users/subscribers may not be aware of, or may find it difficult to learn how to perform personalization of their mobile device. This is particularly true of mass market devices. Customers wishing to tailor the features and capabilities of a device to their needs and wants may seek help from, for example, a customer care representative of the device manufacturer or the provider of wireless network service, but may find that support is poor or non-existent. Point-of-sale centers for such devices also frequently do not provide personalization services. Customer care representatives may be unable to determine what can be personalized in the particular device of the user/subscriber and/or may be untrained and/or unable to help the user/subscriber with such services.

In many cases, personalization of electronic devices may involve firmware, software application, and/or configuration parameter updates. The vast majority of users/subscribers have no idea what is involved, and are not capable of determining the impact such updates on other software applications, on device firmware and/or features of the electronic device. In some cases, the electronic device of a user/subscriber may not be functioning properly, which can complicate any upgrade/customization effort. Firmware, application software, and/or configuration parameters may be out of date. Customer care representatives may be not know or be equipped to determine the effects of a particular update on each of the vast array of electronic devices in use, and may be of little help in furthering user progress in customizing the functionality and user interface of those electronic devices.

During an actual update to firmware, software applications, and/or configuration parameters in an electronic device, a user/subscriber may find themselves staring at the device, waiting for the update activity to complete. Many users/subscribers are anxious about personally performing an update, and may find this a stressful yet boring task. In some cases, no indication is provided on the electronic device to show the progress of such update activities, and the user/subscriber is left uneasily wondering whether the update is proceeding normally, or whether the update has gone awry and left the device non-functional. In general, the user/subscriber experience during firmware, software application, and device configuration updates is very poor.

Further limitations and disadvantages of conventional and traditional approaches will become apparent to one of skill in the art, through comparison of such systems with the present invention as set forth in the remainder of the present application with reference to the drawings.

DETAILED DESCRIPTION OF THE INVENTION

Aspects of the present invention relate generally to the personalization of mobile devices and, more specifically, to the installation and update of new applications on the mobile devices. While the following discussion focuses primarily on mobile electronic devices such as, for example, a mobile handset, a cellular phone, a personal digital assistant, a pager, and a handheld personal computer, this is by way of example and not by way of specific limitations of the present invention. The teaching contained herein may also be applicable to a variety of other electronic devices having a processor and memory containing software, firmware, configuration information, data files, and the like, for which updating of memory contents may be desirable.

Representative embodiments of the present invention may be employed during updates using wired or wireless communication links such as, for example, a public switched telephone network, a wired local or wide area network, an intranet, the Internet, and wireless cellular, paging, local area, personal area, and short range networks such as those referred to as WiFi, IEEE 802.11 a/b/g/n compatible networks, the short range wireless technology known as Bluetooth, and similar types of communication links.

In a representative embodiment of the present invention, information for updating memory in an electronic device such as those described above may be communicated using, for example, an update package comprising a set of instructions executable by firmware and/or software in the electronic device to transform or convert an existing version of software, firmware, and/or data in the electronic device into a new or updated version of the software, firmware, and/or data. Such an update package may also contain metadata related to the update.

Figure 1:
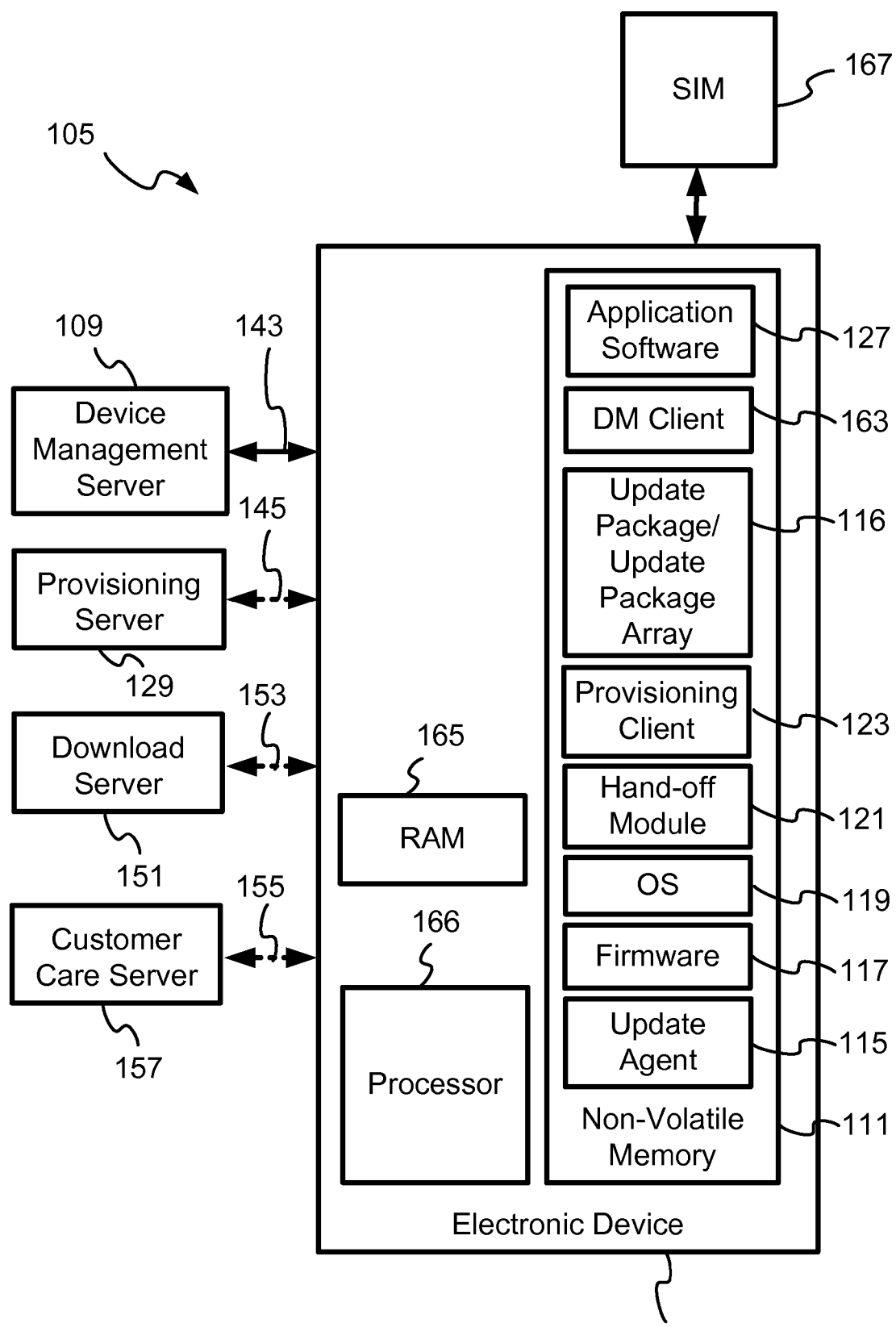
FIG. 1 is a perspective block diagram of an exemplary network that supports remote update of non-volatile memory of an electronic device such as, for example, a mobile handset or personal digital assistant, in accordance with a representative embodiment of the present invention.

FIG. 1 is a perspective block diagram of an exemplary network 105 that supports remote update of non-volatile memory of an electronic device 107 such as, for example, a mobile handset or personal digital assistant, in accordance with a representative embodiment of the present invention. The electronic device 107 may, for example, comprise a cellular phone, a personal digital assistant (PDA), a pager, a handheld personal computer (PC), and/or the like. The electronic device 107 may support a number of features and/or applications that may contain software/firmware errors that need to be corrected, or that may provide additional features/benefits by updating the software/firmware. The electronic device 107 may itself be used to request updates to software/firmware via a customer care server 157 either directly, using a browser in the electronic device 107, or via a customer service representative (CSR). A CSR may, for example, provide service to the customer using the electronic device 107 by retrieving, as necessary, one or more diagnostic management objects (MOs) stored in memory of the electronic device 107, and by transmitting to the electronic device 107 from a remote server, update information in the form of, for example, one or more update packages. Such update packages may, for example, comprise instructions to code in the electronic device 107 to convert or transform a first version of software/firmware to a second version of software/firmware, in the electronic device 107, in addition to metadata, and checksum information.

As shown in the illustration of FIG. 1, the network 105 in one representative embodiment of the present invention comprises the electronic device 107, a device management (DM) server 109, a provisioning server 129, a customer care server 157, and a download server 151. Although not illustrated in FIG. 1, a representative embodiment of the present invention may also comprise other application servers such as, for example, a diagnostics server, and a self-care website/portal. The electronic device 107 of FIG. 1 is able to communicate with the DM server 109, the download server 151, the customer care server 157, and the provisioning server 129 via communication paths 143, 153, 155 and 145, respectively. Although the communication paths 143, 153, 155, 145 are illustrated as being separate paths between the electronic device 107 and their respective servers, this is only for purpose of illustration, and is not a specific limitation of a representative embodiment of the present invention. The communication paths 143, 153, 155, 145 may be combined into one or more paths that may comprise wired or wireless communication paths such as, for example, a local area network, a public switched telephone network, a wireless personal, local or wide area network, and a cellular or paging network, to name only a few possibilities.

As illustrated in FIG. 1, an electronic device in accordance with one representative embodiment of the present invention comprises a processor 166, random access memory (RAM) 165, and non-volatile memory (NVM) 111. The NVM 111 may comprise, for example, NAND or NOR type flash memory or other suitable type of NVM. The NVM 111 may contain a number of software/firmware code components of the electronic device 107 including, for example, application software 127, a device management (DM) client 163, an update package/update package array 116, a provisioning client 123, a hand-off module 121, an operating system (OS) 119, firmware 117, and one or more update agent(s) 115. Additional software/firmware code components may also be present in the RAM 165 and NVM 111. The term "code" is used herein to represent one or more of executable instructions, operand data, configuration parameters, and other information stored in memory of the electronic device 107, and the term "update package catalog" is used interchangeably with the term "update package array" to refer to received update information that comprises multiple update packages. In some representative embodiments of the present invention, the electronic device 107 comprises interface circuitry (not shown) to enable operable connection of a subscriber identity module (SIM) card 167, that may be employed in accordance with aspects of the present invention described later in this document.

In a representative embodiment of the present invention, an electronic device such as, for example, the electronic device 107 of FIG. 1 employs an update package (e.g., the update package/update package array 116) delivered by a remote server such as, for example, the download server 151, to update firmware/software, data and configuration information in memory of the electronic device 107. Such an update package comprises update information including, for example, metadata describing an update, checksums, and instructions executable by one or more update agents such as, for example, the update agent 115 of FIG. 1. The update agent 115 in one representative embodiment of the present invention processes a set of executable instructions, which are used as a compact means to encode differences between existing/first and updated/second versions of firmware, software, data, and configuration parameters for the electronic device 107. In such an embodiment, the executable instructions are assembled into one or more update packages to be transmitted to an electronic device for use in updating memory of the electronic device. Update agent(s) in the electronic device process respective portions of the executable instructions from an update package to convert/transform corresponding portions of the existing/first version of code in memory of the electronic device 107 to portions of the updated/second version of code. The electronic device 107 may also receive provisioning information from, for example, the device management server 109, the customer care server 157, and/or the provisioning server 129 to fix configuration problems or reconfigure software and hardware.

In addition to those elements described above, in some representative embodiments of the present invention the electronic device 107 comprises a downloaded diagnostic client (not shown) that facilitates remote diagnosis, and/or a traps client (not shown) that facilitates the setting of traps and retrieving of collected information. In such embodiments, the DM client 163 of the electronic device 107 interacts with the DM server 109, the diagnostic client, and the traps client, to receive DM commands from the DM server 109 and to implement them in the electronic device 107. The download server 151 is employed to download firmware and software updates (e.g., update information in the form of, for example, update packages). In some representative embodiments of the present invention, the download server 151 is used to download new firmware/software such as, for example, the diagnostics client mentioned above, which is then installed and activated in the electronic device 107.

As described briefly above, an electronic device in accordance with some representative embodiments of the present invention (e.g., electronic device 107) receives update information (e.g., an update package) for processing by one or more update agents (e.g., update agent 115) to convert/transform software (e.g., application software 127) and/or firmware (e.g., firmware 117) to produce updated software/firmware in the electronic device. In some representative embodiments of the present invention, the update agent 115 comprises multiple update agents, each of the update agents appropriately arranged to process different types of update information for updating different types/formats of software, firmware, user data, and configuration parameters in the memory of the electronic device 107. In such embodiments, each of the update packages received are processed in the electronic device by an appropriate one of the update agent(s) 115 to update an associated type of information in the memory of the electronic device 107.

Some representative embodiments of the present invention employ an Open Mobile Alliance (OMA) device management (DM)-based applications server composed of two parts, an OMA DM-based application, and an OMA DM server such as, for example, the DM server 109 shown in FIG. 1. An OMA DM-based application is mainly focused on business processes, logic, and data. An OMA DM server, however, is mainly focused on the functionality required to support the OMA DM protocol by which the OMA DM-based application manipulates OMA DM-capable electronic devices such as, for example, the electronic device 107 of FIG. 1.

Figure 2:
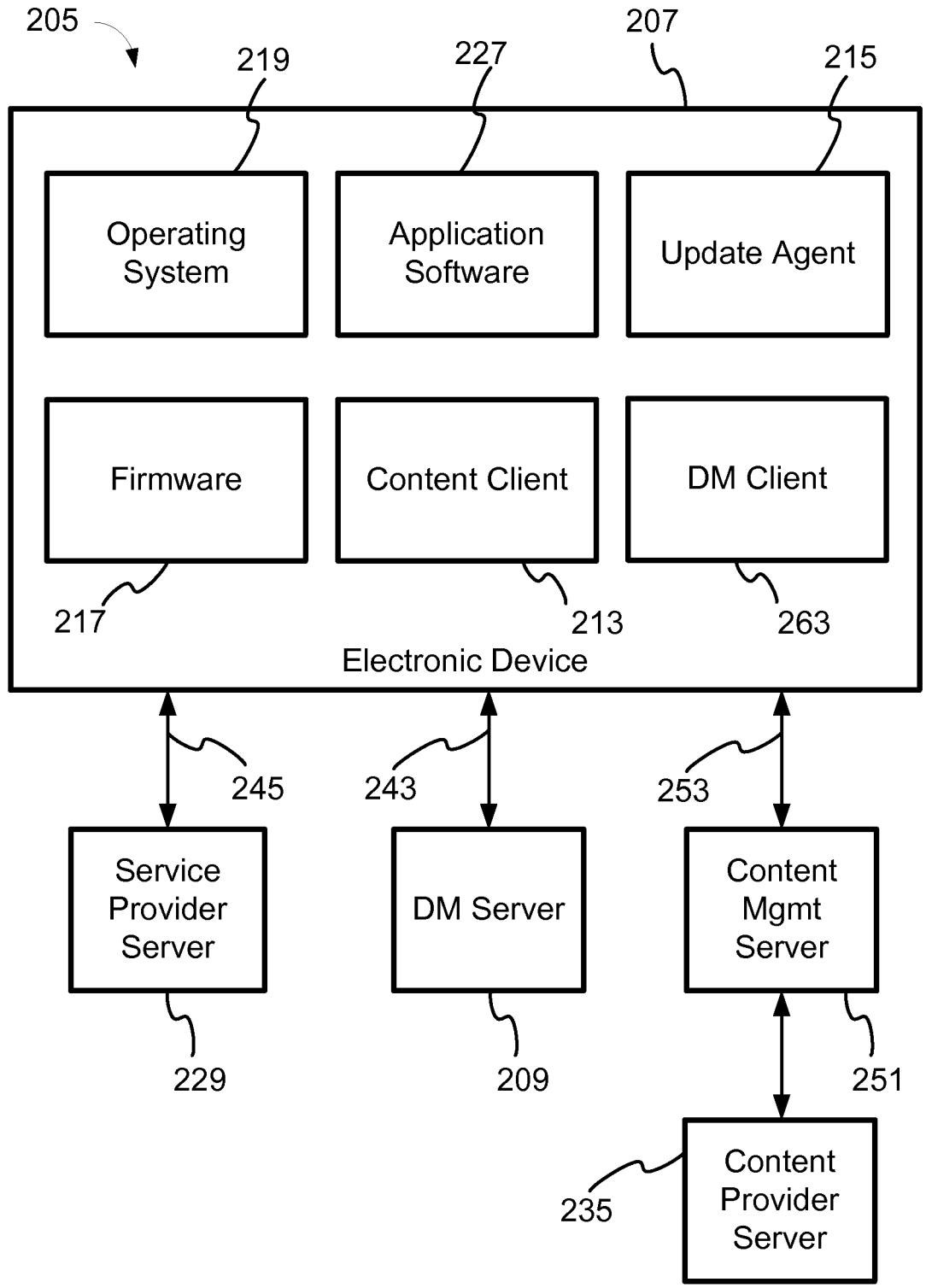
FIG. 2 is a perspective block diagram of a exemplary network that supports personalization of an electronic device that may correspond to, for example, the electronic device of FIG. 1, in accordance with a representative embodiment of the present invention.

FIG. 2 is a perspective block diagram of a exemplary network 205 that supports personalization of an electronic device 207 that may correspond to, for example, the electronic device 107 of FIG. 1, in accordance with a representative embodiment of the present invention. As is shown in the example of FIG. 2, the electronic device 207 in some representative embodiments of the present invention comprises a number of applications and/or features that a user of the device may desire to update or personalize at some point in the life of the electronic device 207. In one representative embodiment of the present invention, a request to begin personalization of the electronic device 207 is entered by a user/subscriber using the user interface of the electronic device 207 itself. In other representative embodiments, a request to begin personalization of the electronic device 207 may be entered using a personal computer and browser accessing an Internet web page-type user interface. Either user interface (e.g., that of the electronic device 207 or web-based) may be used to request personalization service via a content manager server such as, for example, the content manager server 251 shown in FIG. 2. In a representative embodiment of the present invention, the content manager server 251 provides a service to the user/subscriber/customer of the electronic device 207, by retrieving one or more elements of personalization content and forwarding it to the electronic device 207. In addition, the network 205 comprises a DM server 125 communicatively coupled to the electronic device 207 and a service provider server 229 also communicatively coupled to the electronic device 207. The electronic device 207 comprises a DM client 263, firmware 217, an operating system 219, an update agent 215, and an application software 227.

The network 205 helps to manage the user experience during a firmware/software update of the electronic device 207 by, for example, displaying information, advertisements, and promotions on the display of the electronic device 207, during the update process. In some representative embodiments of the present invention, the display of such advertising and informational content employs a server such as, for example, the DM server 209 or another server (e.g., content management server 251) in the network 205. For example, the DM server 209 may set up the display of advertisements and information by communicating with the electronic device 207 using a device management protocol such as, for example, an Open Mobile Alliance (OMA) device management (DM) protocols. The development of the OMA DM protocol has been under the guidance of the Open Mobile Alliance, Ltd. Arranging for display of advertising and informational content during updates of the electronic device 207 may take place, for example, during a device discovery session between a server such as the DM server 209 and the electronic device 207. In one representative embodiment of the present invention, once the update of the electronic device 207 starts, the update agent 215 in the electronic device 207 pulls display information, advertisements, and promotion material, for example, from downloaded content stored in the electronic device 207. In other representative embodiments, the advertising, promotional, and information content may be pushed to the electronic device 207. The exchange of such information between a remote server and the electronic device 207 may use one or both of the OMA DM and OMA Download protocols. This may include defining a new set of management objects in a device management tree in memory of the electronic device 207, which will be used to point client software in the electronic device 207 to correct download locations (e.g., universal resource locators (URLs)) of the content. In some representative embodiments of the present invention, multiple contents download locations are supported, and multiple content packages of advertising, promotional and information content are supported. In some representative embodiments of the present invention, the content and URLs used are dynamically selected during the session based upon segmentation of users as well as the electronic devices in use. An addressing method using fixed or dynamic locations that communicate the location of advertising, promotional, and information content allows for staging content on the electronic device 207 before commencing an update, and then displaying the content during the update activity.

In some representative embodiments of the present invention, the update agent 215 performs this display of advertising, promotional, and/or information content without the use of the capabilities of the operating system of the electronic device 207. In such an embodiment, the update agent 215, for example, displays content to the user. In some representative embodiments of the present invention, such downloaded content is contained in an update package used to contain update information for the update of the firmware, application software and/or configuration parameters. In other representative embodiments, the advertising, promotional, and/or information content may be separate from the update information used for updating firmware and/or software. This permits the advertising, promotional and/or information content to be tailored for individual users or groups of users of the electronic device 207, separately from update information for the electronic device 207. In one representative embodiment of the present invention, the advertising, promotional and/or information content to be displayed is selected by, for example, the DM server 209 and/or the content management server, based upon the nature of the personalization and/or update(s) being performed upon the electronic device 207. For example, a user that requests personalization of the electronic device 207 to include access to video or audio playback of media content may be presented with advertisements, and promotional, and/or information content related to various video and/or audio content available, the existence of groups of individuals having interest in certain video and/or audio content, advertisements for related services and/or related upgrades for their electronic device, and the like. In representative embodiments of the present invention, such advertising, promotional and/or information content is dynamically displayed, in a sequence and timing defined by the advertiser/content provider (e.g., from content provider server 235) and/or the provider of services/updates for the electronic device 207 (e.g., the service provider server 229 and/or the DM server 209). In this manner, an embodiment of the present invention enhances the user experience during updates of the electronic device 207, with the display/rendering of promotions, advertisements or other information.

As a part of providing updates to firmware, application software, and configuration parameters, the network 205 of some representative embodiments of the present invention handle dependency management while updating the electronic device 207. As used herein, the term "dependency management" is defined as the process of ensuring that all firmware, software, and configuration parameters needed for a given update to function in the electronic device 207 are identified, and that all are present in the electronic device 207, following completion of the installation of the update.

A representative embodiment of the present invention may be employed to handle dependency management in embedded devices an electronic device with an operating system such as, for example, the operating system 219 of the electronic device 207 of FIG. 2. In a representative embodiment of the present invention, a server such as the DM server 109, the content management server 251, or a download server (not shown) facilitates management of dependencies between elements of an update to the electronic device 207. An exemplary method for updating/installing firmware, application software and/or configuration information on the electronic device 207 that employs dependency management is described below.

Figure 3:
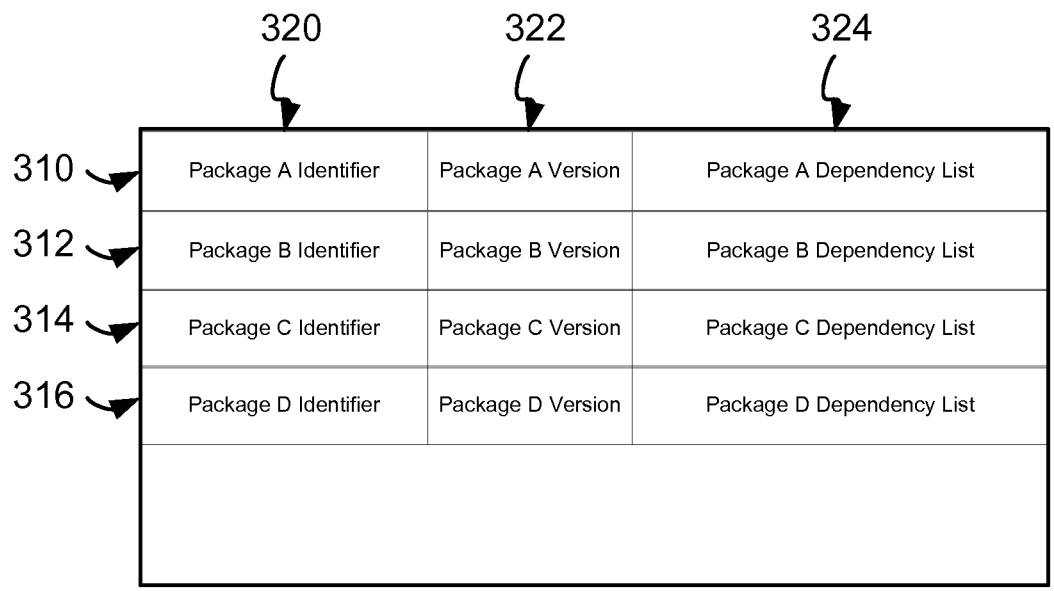
FIG. 3 shows a block diagram illustrating an exemplary dependency information table for use in dependency management, in accordance with a representative embodiment of the present invention.

FIG. 3 shows a block diagram illustrating an exemplary dependency information table 300 for use in dependency management, in accordance with a representative embodiment of the present invention. In one representative embodiment of the present invention, each electronic device (e.g., electronic device 207) has, for example, a table 300 containing multiple entries 310, 312, 314, 316 list each of the packages 320 (e.g., firmware/software components or applications) that are installed on the electronic device 207, the corresponding version numbers 322 of those packages, and a list of the dependencies 324 of the package (e.g., firmware/software components/configuration information needed for the use of the package). In one representative embodiment of the present invention, the information in the dependency information table 300 is set at the time of manufacturer, and is maintained by the electronic device over its life as it is updated. An inventory inquiry may be used by a server such as, for example, the DM server 209, to retrieve this information from the electronic device 207, if the server has need for this information. In another representative embodiment, such a dependency information table may be maintained by a remote server (e.g., DM Server 209, content management server 251, or service provider server 229), and provided to the electronic device 207 when needed. In some representative embodiments of the present invention, each electronic device 207 also has a list of standard sources from which new packages (e.g., firmware, application software, and configuration information) can be downloaded.

Figure 4:
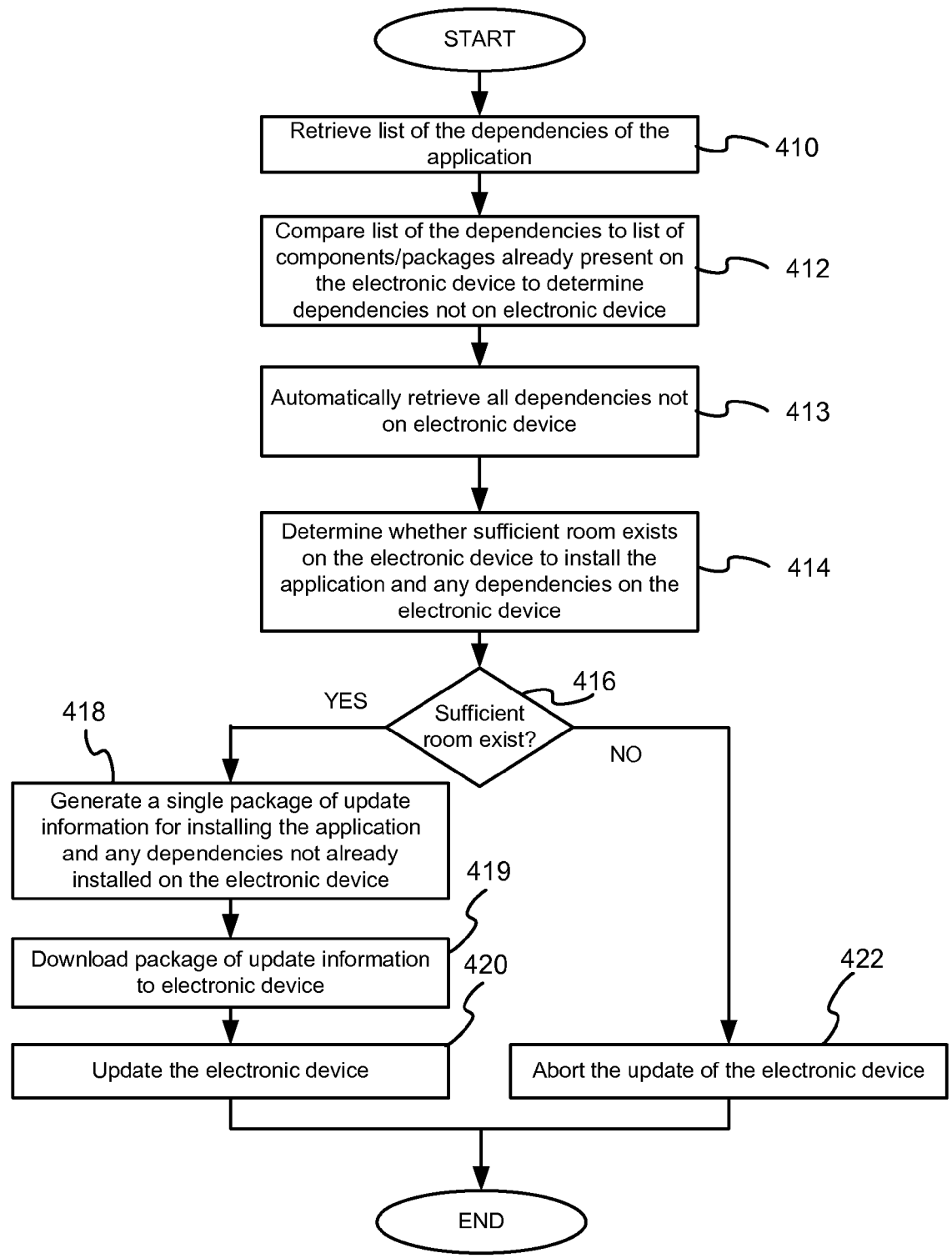
FIG. 4 is a flowchart illustrating an exemplary method of managing dependencies that exist between an update to firmware, application software, and/or configuration information and other firmware/software components in an electronic device such as, for example, the electronic device of FIG. 2, in accordance with a representative embodiment of the present invention.

FIG. 4 is a flowchart illustrating an exemplary method of managing dependencies that exist between an update to firmware, application software, and/or configuration information and other firmware/software components in an electronic device such as, for example, the electronic device 207 of FIG. 2, in accordance with a representative embodiment of the present invention. Appropriate changes to the method described below may be made without departing from the scope of a representative embodiment of the present invention, to accommodate the level of support provided by various operating systems that may be employed in the electronic device 207. The method of FIG. 4 begins at step 410, at which an electronic device such as, for example, the electronic device 207 requests that the provider of an application update such as, for example, the DM server 209, the service provider 123 or content management server 133 of FIG. 2, supply a list of dependencies of the application update. The list of dependencies also includes any dependencies that the dependencies may have. It should be noted that the use of a "list of dependencies" is for purposes of illustration, and that information identifying "higher-order" dependencies (i.e., dependencies of dependencies) need not be explicitly stored in a list, but may be determined when needed by analyzing a graph of the dependencies of the various firmware/software components/packages to be made functional in the electronic device 207. For example, if package A is dependent upon package B, and package B is dependent upon package C, then analysis of a list of firmware/software components/packages to produce a dependency graph would allow one to determine that package A depends upon package C. The provider supplying the application update may be on the list of standard sources of updates, mentioned above, or may be an independent provider of application updates for the electronic device 207.

Next, at block 412, the method of FIG. 4 determines which dependencies are not present on the electronic device 207, by comparing the list of dependencies of the application, to the list of software components/packages installed on the electronic device 207 (e.g., table 300 of FIG. 3). Next, the method (at block 413) automatically retrieves all dependencies not already on the electronic device 207. The method of FIG. 4 then calculates, at block 414, the memory space needed on the electronic device (e.g., electronic device 207) to install the application update and the dependencies of the application update that are not already installed on the electronic device 207. It should be noted that the amount of memory space temporarily needed to perform the update in the electronic device 207 may be different than the amount of space occupied by the application and its dependencies following completion of the update process. A representative embodiment of the present invention accurately calculates the memory space needed so that a determination may be made as to whether the update process can be completed, before the package of update information is sent to the electronic device 207, and before any updating of memory in the electronic device is attempted. This avoids possible failure of an update, and corruption of memory in the electronic device 207.

Next, at block 416, a determination is made whether there is sufficient memory on the electronic device 207 for the application update, all of its dependencies, and any dependencies of the dependencies. If it is determined that insufficient memory is available then, at block 422, the update of the electronic device is aborted. If, however, it is determined that sufficient memory is available then, at block 418, the method of FIG. 4 automatically generates a single package of update information for the application update, including any dependencies not already present on the electronic device 207 (e.g., from the list of standard sources or an independent source). Such an update package may be generated by determining differences between an image of memory of the electronic device 207 with the application update and any dependencies of the application update, and an image of memory containing the existing software/firmware present in the electronic device 207, for example. Such differences may be expressed as a set of instructions executable by the update agent 215 of FIG. 2. The execution of such instructions may use the existing contents of memory in the electronic device 207 to generate an updated version of memory containing the application and all dependencies. The method, at block 419, then downloads the update information to the electronic device 207 and, at block 420, an update agent in the electronic device processes the downloaded update information to perform the update of memory in the electronic device 207.

A representative embodiment of the present invention identifies and collects all dependencies needed for an update to the electronic device 207, without requiring the involvement of the user in retrieving and downloading the needed components. In this manner, the user of the electronic device 207 need not search for and retrieve software/firmware components needed for an update, but instead a representative embodiment of the present invention creates a single package of update information on-the-fly that provides the electronic device of the user with all needed software/firmware components, automatically. The generation and use of a single package of update information can be expected to result in a greater efficiency in terms of the size of the update information used compared to the size of the software/firmware being updated/installed. In a representative embodiment of the present invention, the update created for one user may also be saved and later distributed to one or more other users having the same electronic device 207, and desiring the same updates.

It should be noted that a representative embodiment of the present invention conserves memory in the electronic device 207 by maintaining a list of only those packages that are present on the electronic device 207. In addition, in some representative embodiments of the present invention, the list of dependencies of the update provided at block 410 by a remote server (e.g., DM server 209) includes only those packages that are known to be installed on the electronic device 207.

In addition, it should be noted that a representative embodiment of the present invention conserves memory in the electronic device 207 by employing updates that are differentially compressed. That is, the update information sent to the electronic device 207 represents the differences between the prior memory image and the updated memory image of the electronic device 207.

The update agent (e.g., update agent 215) in some representative embodiments of the present invention takes into account that the amount of memory used in the electronic device 207 during an update may be expected to be greater than that used when the update process is completed.

The above example demonstrates a representative embodiment of the present invention that may be employed in an electronic device having an operating system. Other representative embodiments of the present invention may be employed to support dependency management in embedded devices without an operating system. For example, the electronic device 207 may be configured without an operating system, and may instead have embedded firmware that provides a rudimentary file system. In such a situation, an application installed by a user is likely to make calls to functions in the existing firmware of the electronic device. If the firmware in the electronic device is updatable, this may present a problem, since entry points for functions used by an application may change from an existing version of the firmware to an updated version. This issue with dynamic library access may arise on all kinds of computers, and is not limited to just embedded devices such as the electronic device 207 of FIG. 2. Two possible solutions to this issue include 1) perform calls through a jump table in the existing firmware, or 2) store a table of relocation entries with each application.

In a representative embodiment of the present invention, a jump table used to perform calls into the existing firmware is updated when the firmware is updated. Each jump table entry provides an indirect entry point to a function within existing firmware. As long as the relative offsets of the function entry points within the jump table don't change, then applications accessing firmware through the jump table entry points do not need to change when firmware is updated.

Another representative embodiment of the present invention stores a table of relocation entries with each application. Each relocation entry is a location within an application that is to be patched when the firmware of the electronic device changes, and may include instructions for how to do the patching. Some representative embodiments of the present invention consume less space to represent such patches by, for example, storing just the locations of references that are not correctly disassembled by a reference disassembler application. This approach involves partially re-linking the application to the firmware, on the electronic device. Some representative embodiments of the present invention resolve such relocation entries at run time, if the application is loaded into RAM. The use of a table of relocation entries saves a level of indirection when compared to the use of a jump table, but may involve a larger number of changes (and, therefore, writes to flash non-volatile memory) if there are many applications to be updated as a result of an update to the firmware of the electronic device 207. Updates of the electronic device 207 that may employ such techniques of dependency management include, for example, games and sounds that can be downloaded into the electronic device 207.

In some representative embodiments of the present invention, the network 205 supports updating the electronic device 207 by providing support for an OS-independent file system update process. Such a process employs an OS-agnostic comprehensive procedure to create and update the electronic device 207 using appropriate update packages. The OS agnostic procedure is adapted to each operating system with minimum changes. The procedure identifies and formalizes the common operations performed during software installations like the creation or modification of:

Shared and non-shared program files
Folders/directories
Installation and updates logs and dependencies
Configuration file entries
Environment variables
Links or shortcuts In a representative embodiment of the present invention, the network 205 enables updates to the electronic device 207 by providing support for the update of mixed-mode mobile devices. An electronic device such as the electronic device 207 such as, for example, a mobile phone, may be referred to as a mixed-mode mobile device if it is capable of using a number of different communication technologies (e.g., wireless protocols) for exchanging digital information. For example, a mobile phone may be capable of using standard Global System for Mobile Communications (GSM) service (that may be expensive to use), or Institute of Electrical and Electronics Engineers, Inc. (IEEE)-802.11 (Wi-Fi) protocols (that may be inexpensive to use) for downloading/exchanging update information. Some representative embodiments of the present invention employ software/firmware on both the client and server side that coordinates the use of lower cost and more-expensive modes of communication to save the user money, while providing the same information to the electronic device 207 of the user.

In one representative embodiment of the present invention, an electronic device such as the electronic device 207, for example, downloads a rough/lower bit rate version of an MP3 audio file when a user is sitting in highway traffic and only has GSM connectivity. The user may, for example, be in a car riding on an interstate highway. Such an environment is not a good location in which to critically listen to music, so a rough/lower quality/lower bit rate version may be quite acceptable. However, in a representative embodiment of the present invention, when the user arrives at a location that has a higher bandwidth connectivity available (e.g., IEEE-802.11 (i.e., Wi-Fi) connectivity), the electronic device (e.g., a mobile phone) automatically downloads a better/higher quality/higher bit rate version for playback via the user's stereo in his/her home. In some representative embodiments of the present invention, such a download is a differential download that sends only the information required to complete the content of the higher bit rate version of the rougher/lower quality version previously downloaded at a lower bit rate. By employing such a "progressive download" approach, a representative embodiment of the present invention permits a user to have a usable copy of content appropriate for the user's willingness to pay and network environment, but to later acquire a higher-quality copy suitable for use in a different environment and at a different time, without the need to purchase/download two complete copies of the desired content. A representative embodiment may upgrade such lower-quality content automatically, when an appropriate communication network is detected to be available for use.

Another representative embodiment of the present invention may download information when a higher bandwidth/less expensive connection is available, in anticipation of later use of the information when such a high bandwidth/low cost link may not be available. For example, in one representative embodiment of the present invention, an electronic device such as, for example, the electronic device 207 of FIG. 2 would download web pages that the user usually reads before the user leaves home in the morning. Then, the electronic device may differentially update the downloaded web pages, while the user is on the train, using a different type of communication path. In a representative embodiment of the present invention, the initial download at home employs, for example, an inexpensive Wi-Fi connection to download the bulk of the information to the electronic device 207, while the later differential update on the train uses, for example, a more expensive cellular wireless connection (e.g., CDMA, GSM, etc.) to download a much smaller amount of information.

In yet another representative embodiment of the present invention, voicemail or email messages are preemptively downloaded when the user is in Wi-Fi range, even if the user hasn't yet made a request for such messages. The user of the electronic device may set one or more criteria that when met, cause the electronic device to perform exchanges of information of interest to the user. For example, the user may set the criteria to include a cost of transferring a unit of information, a time during which or before which an update should be completed. The user may set a preference for the type of communication path, or the reliability of the path to be used. The user may set how often differential updates should be performed, or the maximum age of information before a new update is attempted. And the user may request email/voicemail from particular sending parties be downloaded/retrieved ahead of all others, or at more frequent intervals. By downloading information to the electronic device 207 when the cost/bandwidth of an available communication service meets a user set criteria, a representative embodiment of the present invention allows a user to maximize the utility and adjust costs to meet the desires of the user.

The network 205 in a representative embodiment of the present invention supports differentially maintaining data in the electronic device 207. For example, a user-selected list of restaurants within a two-mile radius of a user's vehicle may be kept updated using differential updating/compression, depending on how fast the user is driving. Depending upon the type of information being exchanged, such a representative embodiment may employ a data format that is good for generic content such as, for example, media content, or other more efficient data formats for use with other types of digital content (e.g., speech, text, still images, graphics). In one representative embodiment of the present invention, compressed data stored in the electronic device 207 is updatable, and the data format used for the compressed data provides random access to the data.

As described above, a representative embodiment of the present invention supports dependency management for file system component updates and application updates in an electronic device such as the electronic device 207, via the network 205. In addition, during firmware or a component update process, a representative embodiment of the electronic device 207 may be configured to display advertisements, promotions, and information to the user to enhance the user experience.

Although a system and method according to the present invention has been described in connection with the preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of installing a software and/or firmware application in an electronic device of a user, the method comprising:
    enabling a set of user criteria that comprises a cost of transferring a unit of information;
    accessing a list of dependencies of the software and/or firmware application to be installed, wherein a dependency comprises a software and/or firmware component used by, but not part of, the software and/or firmware application to be installed;
    comparing the list of dependencies to a list of all software and/or firmware components already present in a memory of the electronic device;
    producing a dependency graph to determine a number of dependents of the list of dependencies;
    automatically retrieving all dependencies and dependents of the list of dependencies not already present in the memory of the electronic device;
    determining whether room is available in the memory of the electronic device for the software and/or firmware application, all dependencies, and dependents of the list of dependencies not already present in the memory of the electronic device;
    generating update information for installing the software and/or firmware application and all dependencies not already present in the memory of the electronic device;
    downloading the update information to the electronic device, via a communication network, if room is available in the memory of the electronic device and the set of user criteria are met; and
    processing the downloaded update information by the electronic device.

2. The method according to claim 1, wherein the electronic device is a mobile device.

3. The method according to claim 2, wherein the electronic device comprises one of a cellular phone, a personal digital assistant, and a pager.

4. The method according to claim 1, wherein the communication network is a wireless network.

5. The method according to claim 1, wherein the list of all software and/or firmware components already present in the memory of the electronic device is maintained by the electronic device.

6. The method according to claim 1, wherein the list of all software and/or firmware components already present in the memory of the electronic device is maintained by a server remote from the electronic device.

7. The method according to claim 1, wherein processing of the downloaded update information by the electronic device uses existing contents of the memory of the electronic device to produce the software and/or firmware application and all dependencies not already present in the memory of the electronic device.

8. A method of installing a software and/or firmware application in an electronic device of a user, the method comprising:
    enabling a set of user criteria that comprises a type of communication path;
    accessing a list of dependencies of the software and/or firmware application to be installed, wherein a dependency comprises a software and/or firmware component used by, but not part of, the software and/or firmware application to be installed;
    comparing the list of dependencies to a list of all software and/or firmware components already present in a memory of the electronic device;
    producing a dependency graph to determine a number of dependents of the list of dependencies;
    automatically retrieving all dependencies and dependents of the list of dependencies not already present in the memory of the electronic device;
    determining whether room is available in the memory of the electronic device for the software and/or firmware application, all dependencies, and dependents of the list of dependencies not already present in the memory of the electronic device;
    generating update information for installing the software and/or firmware application and all dependencies not already present in the memory of the electronic device;
    downloading the update information to the electronic device, via a communication network, if room is available in the memory of the electronic device and the set of user criteria are met; and
    processing the downloaded update information by the electronic device.

9. The method according to claim 8, wherein the electronic device is a mobile device.

10. The method according to claim 9, wherein the electronic device comprises one of a cellular phone, a personal digital assistant, and a pager.

11. The method according to claim 8, wherein the communication network is a wireless network.

12. The method according to claim 8, wherein processing of the update information by the electronic device uses existing contents of the memory of the electronic device to produce the software and/or firmware application and all dependencies not already present in the memory of the electronic device.

13. The method according to claim 8, wherein the list of all software and/or firmware components already present in the memory of the electronic device is maintained by a server remote from the electronic device.

14. A method of installing a software and/or firmware application in an electronic device of a user, the method comprising:
- enabling a set of user criteria that comprises how often differential updates are performed;
- accessing a list of dependencies of the software and/or firmware application to be installed, wherein a dependency comprises a software and/or firmware component used by, but not part of, the software and/or firmware application to be installed;
- comparing the list of dependencies to a list of all software and/or firmware components already present in a memory of the electronic device;
- producing a dependency graph to determine a number of dependents of the list of dependencies;
- automatically retrieving all dependencies and dependents of the list of dependencies not already present in the memory of the electronic device;
- determining whether room is available in the memory of the electronic device for the software and/or firmware application, all dependencies, and dependents of the list of dependencies not already present in the memory of the electronic device;
- generating update information for installing the software and/or firmware application and all dependencies not already present in the memory of the electronic device;
- downloading the update information to the electronic device, via a communication network, if room is available in the memory of the electronic device and the set of user criteria are met; and
- processing the downloaded update information b the electronic device.

15. The method according to claim 14, wherein the communication network is a wireless network.

16. The method according to claim 14, wherein processing of the downloaded update information by the electronic device uses existing contents of the memory of the electronic device to produce the software and/or firmware application and all dependencies not already present in the memory of the electronic device.

17. The method according to claim 14, wherein the list of all software and/or firmware components already present in the memory of the electronic device is maintained by a server remote from the electronic device.

18. The method according to claim 14, wherein the list of all software and/or firmware components already present in the memory of the electronic device is maintained by the electronic device.

* * * * *